United States Patent
Ono

(10) Patent No.: US 10,333,409 B2
(45) Date of Patent: Jun. 25, 2019

(54) POWER DELIVERY DEVICE, AC ADAPTER, AC CHARGER, ELECTRONIC APPARATUS AND POWER DELIVERY SYSTEM

(71) Applicant: ROHM CO., LTD., Ukyo-ku, Kyoto-shi, Kyoto (JP)

(72) Inventor: Akihiro Ono, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 15/809,166

(22) Filed: Nov. 10, 2017

(65) Prior Publication Data

US 2018/0076714 A1    Mar. 15, 2018

Related U.S. Application Data

(63) Continuation of application No. PCT/JP2016/062621, filed on Apr. 21, 2016.

(30) Foreign Application Priority Data

May 14, 2015 (JP) .................................. 2015-098802

(51) Int. Cl.
*H02M 3/335* (2006.01)
*H02J 7/04* (2006.01)
(Continued)

(52) U.S. Cl.
CPC .................. *H02M 3/28* (2013.01); *H02J 1/00* (2013.01); *H02J 7/022* (2013.01); *H02J 7/04* (2013.01);
(Continued)

(58) Field of Classification Search
CPC ......... H02M 3/33507; H02M 3/33553; H02M 3/33576; H02M 3/33584; H02M 3/33592;
(Continued)

(56) References Cited

U.S. PATENT DOCUMENTS 7,170,761 B2 * 1/2007 Yasumura ........... H02M 1/4241
                                                                363/17
8,699,243 B2 * 4/2014 Sims ................. H02M 3/33592
                                                              363/21.14
(Continued)

FOREIGN PATENT DOCUMENTS

CN    107408891 A    11/2017
JP    2011082802 A    4/2011
(Continued)

OTHER PUBLICATIONS

Bob Dunstan, "USB Power Delivery Specification Revision 1.0," released on Jul. 5, 2012, from internet http://www.usb.org/developers/docs/.

(Continued)

*Primary Examiner* — Gary L Laxton
*Assistant Examiner* — Sisay G Tiku
(74) *Attorney, Agent, or Firm* — Cantor Colburn LLP

(57) ABSTRACT

A PD device comprises: a DC/DC converter disposed between an input and a VBUS output; a primary-side controller configured to control an input current of the DC/DC converter; and a bidirectional insulation circuit coupled to a control input, the bidirectional insulation circuit configured to receive a control input signal of the control input, and then feed back the received control input signal to the primary-side controller. The primary-side controller varies an output voltage value and an available output current value of the DC/DC converter by controlling the input current of the DC/DC converter on the basis of the control input signal fed back from the bidirectional insulation circuit. There are provided a PD device in which mounting space is reduced, and thereby capable of achieving miniaturization and cost reduction, and capable of controlling the (Continued)

output voltage value and the available output current value (MAX value).

18 Claims, 53 Drawing Sheets

(51) Int. Cl.
  *H02J 7/06* (2006.01)
  *H02M 3/28* (2006.01)
  *H02J 1/00* (2006.01)
  *H04B 3/56* (2006.01)
  *H02J 7/02* (2016.01)

(52) U.S. Cl.
  CPC ... *H02M 3/33507* (2013.01); *H02M 3/33523* (2013.01); *H02M 3/33576* (2013.01); *H04B 3/56* (2013.01); *H02J 2001/002* (2013.01); *H02J 2001/008* (2013.01); *Y02B 40/90* (2013.01)

(58) Field of Classification Search
  CPC ............. H02M 3/28; H02M 3/33546; H02M 3/33523; H02M 7/04; H02M 7/06
  See application file for complete search history.

(56) References Cited

U.S. PATENT DOCUMENTS

| | | | |
|---|---|---|---|
| 9,853,556 B2* | 12/2017 | Lin | H02M 3/33576 |
| 9,893,546 B2* | 2/2018 | Saji | H02J 7/007 |
| 2008/0068871 A1 | 3/2008 | Kokubun et al. | |
| 2009/0015228 A1 | 1/2009 | Sato et al. | |
| 2011/0090717 A1* | 4/2011 | Lee | H02M 3/33584 363/21.02 |
| 2011/0305043 A1* | 12/2011 | Matsumoto | H02M 3/33592 363/21.01 |
| 2012/0294046 A1* | 11/2012 | Nate | H02M 1/4225 363/21.01 |
| 2014/0160804 A1* | 6/2014 | Sato | H02M 3/33507 363/21.01 |
| 2014/0198535 A1* | 7/2014 | Yang | H02M 3/33523 363/16 |
| 2014/0218988 A1* | 8/2014 | Hayashi | H02M 3/156 363/126 |
| 2014/0268911 A1* | 9/2014 | Telefus | H02M 3/33523 363/21.08 |
| 2014/0313793 A1* | 10/2014 | Ono | H02M 3/33523 363/21.15 |
| 2014/0313794 A1* | 10/2014 | Ono | H02M 3/33523 363/21.15 |
| 2014/0369084 A1* | 12/2014 | Freeman | H02M 3/33523 363/21.03 |
| 2014/0369085 A1* | 12/2014 | Motoki | G06F 1/266 363/21.12 |
| 2015/0229149 A1* | 8/2015 | Fahlenkamp | H02J 7/0044 320/114 |
| 2016/0141964 A1* | 5/2016 | Yu | H02M 3/33507 363/21.02 |
| 2017/0040820 A1* | 2/2017 | Ono | H02J 7/0052 |
| 2017/0353113 A1* | 12/2017 | Ono | H02M 3/33507 |
| 2018/0131283 A1 | 5/2018 | Ono | |

FOREIGN PATENT DOCUMENTS

| | | |
|---|---|---|
| JP | 2014138457 A | 7/2014 |
| JP | 2014166025 A | 9/2014 |
| KR | 20080025322 A | 3/2008 |
| WO | 2006101135 A1 | 9/2006 |

OTHER PUBLICATIONS

International Search Report for corresponding PCT/JP2016/062621; dated Jul. 19, 2016.
KIPO Notification of Reason for Refusal corresponding to Application No. 10-2017-7032464; dated Mar. 18, 2019.
SIPO First Office Action corresponding to Application No. 201680027032.8; dated Jan. 29, 2019.

* cited by examiner

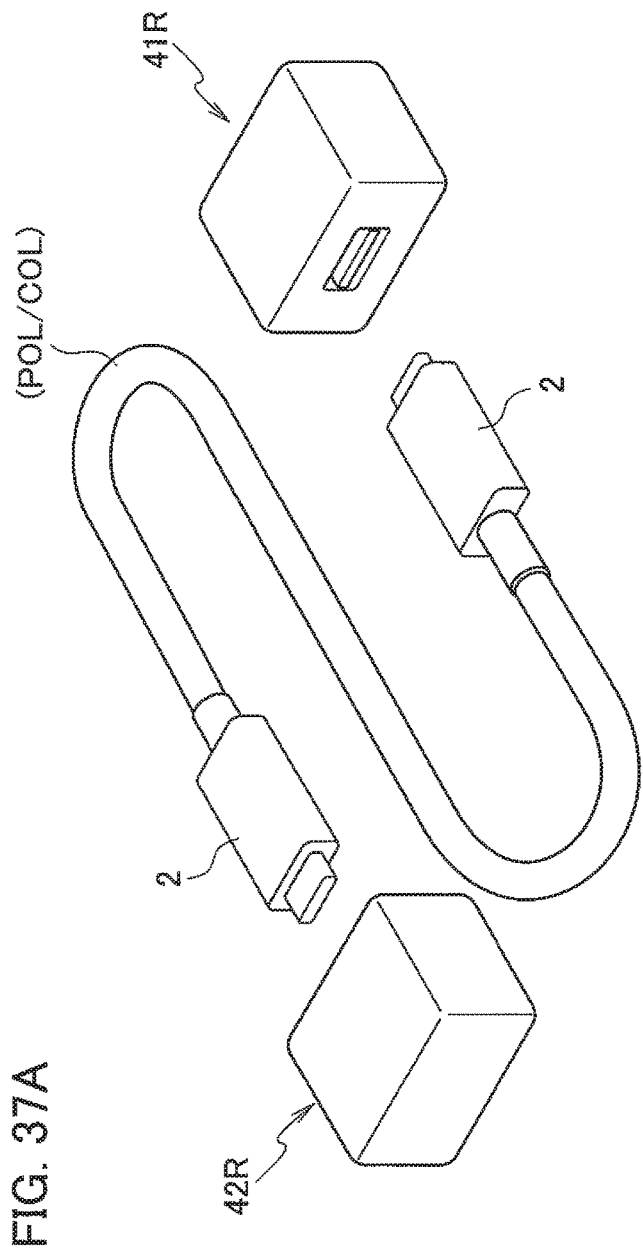

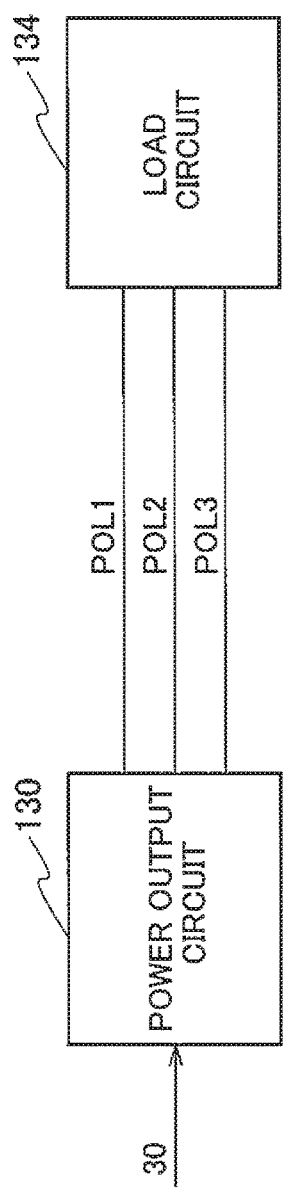
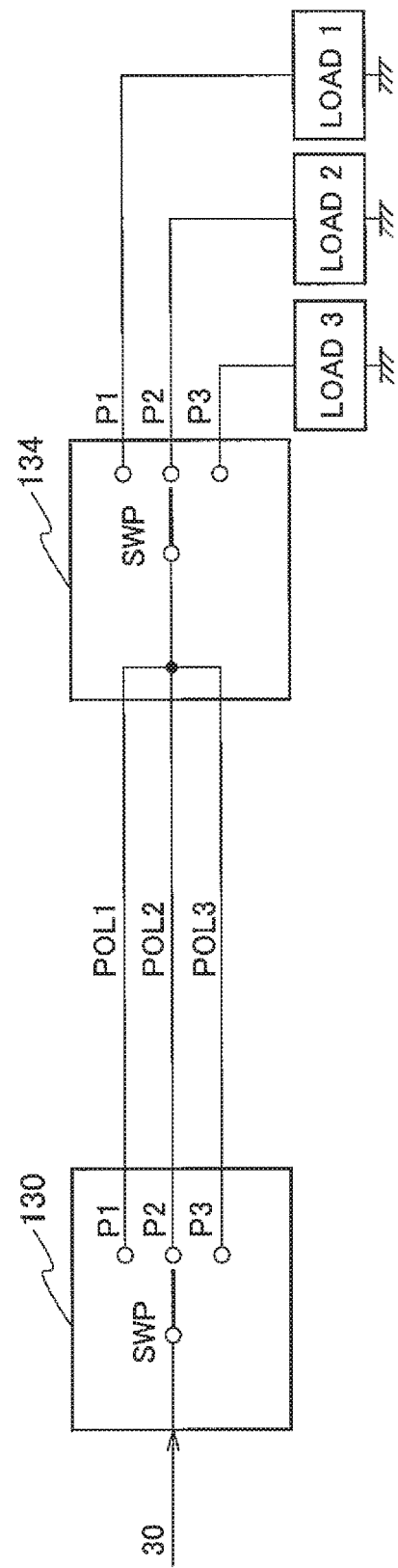
FIG. 38A
FIG. 38B

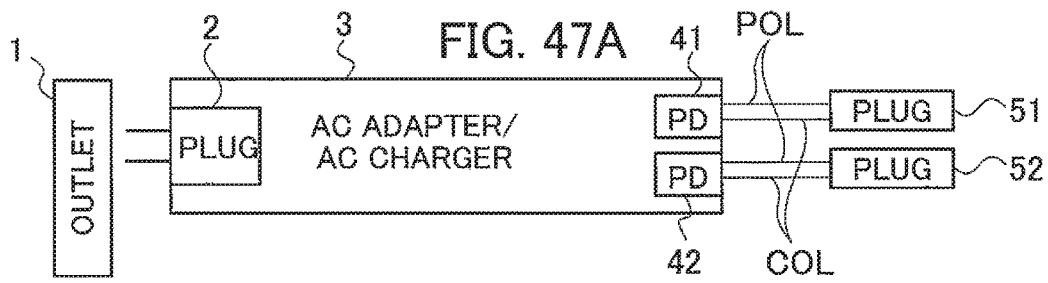
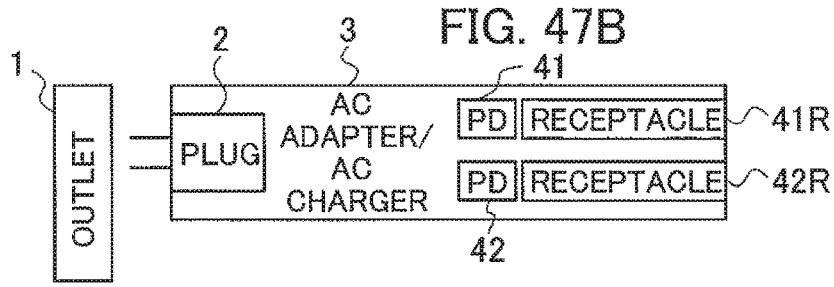
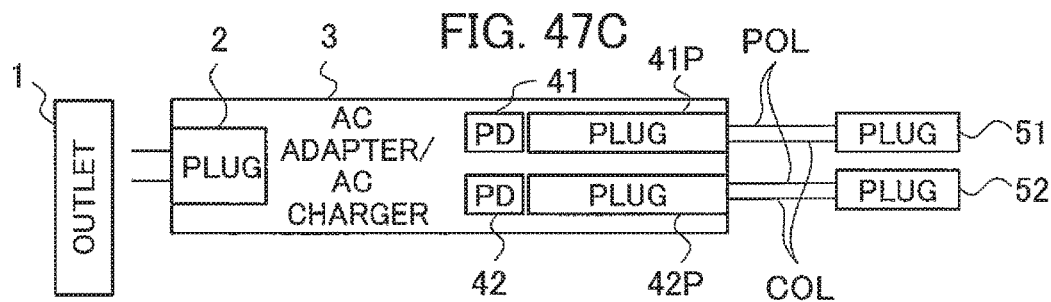
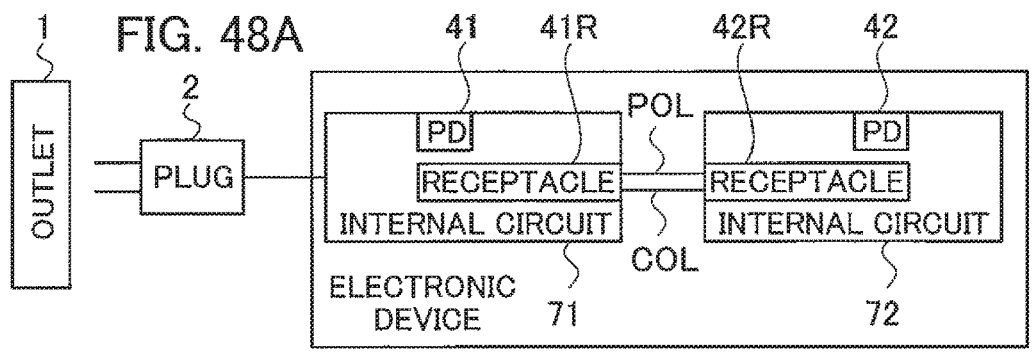
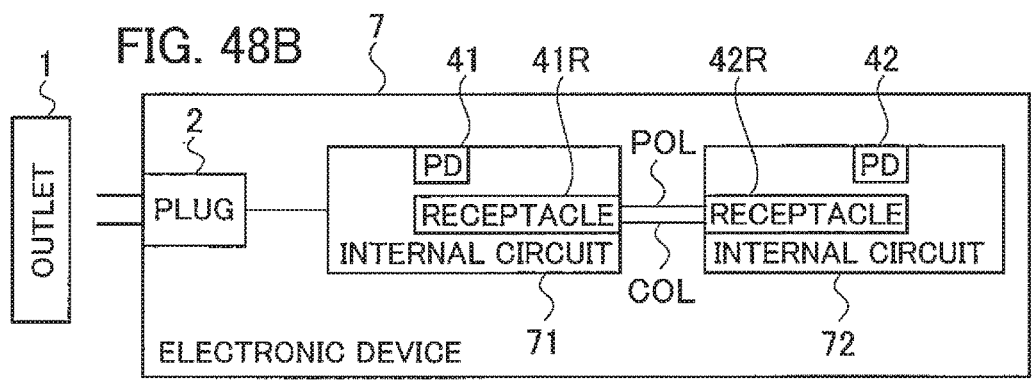

POWER DELIVERY DEVICE, AC ADAPTER, AC CHARGER, ELECTRONIC APPARATUS AND POWER DELIVERY SYSTEM

CROSS REFERENCE TO RELATED APPLICATIONS

This application is a continuation under 35 U.S.C. § 120 of PCT/JP2016/062621, filed on Apr. 21, 2016, which is incorporated herein reference and which claimed priority to Japanese Patent Application No. 2015-098802 filed on May 14, 2015. The present application likewise claims priority under 35 U.S.C. § 119 to Japanese Application No. 2015-098802, filed May 14, 2015, the entire contents of which is also incorporated herein by reference.

FIELD

Embodiments described herein relate to a Power Delivery device (PD device), an Alternating-Current (AC) adapter, an AC charger, an electronic apparatus, and a Power Delivery system (PD system).

BACKGROUND

Conventionally, there have been provided Direct Current (DC) outlets which can intercommunicate between terminal devices and power line carrier communication networks supporting telecommunications standards with a Power Delivery (PD).

There are Power over Ethernet (PoE) technology and Universal Serial Bus (USB) technology as a Power Delivery technology (PD technology) using data lines.

As the USB technologies, there are USB 2.0 Standard up to maximum supply power of 2.5 W, USB 3.1 Standard up to maximum supply power of 4.5 W, and Battery Charging (BC) Revision 1.2 up to maximum supply power of 7.5 W according to the Power Delivery level (PD level).

Moreover, a USB Power Delivery (USB PD) Specification is compatible with existing cables and existing connectors, and coexists also with the USB 2.0 Standard, the USB 3.1 Standard, and the USB-BC Revision 1.2. In such a specification, values of the charging current and voltage is selectable within a range of voltage 5V-12V-20V and a range of current 1.5 A-2 A-3 A-5 A, and the USB electric charging and power transmission can be achieved to be 10 W, 18 W, 36 W, 65 W, and the maximum of 100 W.

DC/DC converters have been used as a power source for achieving such a PD. There are a diode rectification system and a synchronous rectification method in the DC/DC converters.

SUMMARY

The embodiments provide a PD device, an AC adapter, an AC charger, an electronic apparatus, and a PD system, each in which mounting space is reduced, and thereby capable of achieving miniaturization and cost reduction, and capable of controlling an output voltage value and an available output current value (MAX value).

According to one aspect of the embodiments, there is provided a power delivery device comprising: a DC/DC converter disposed between an input and a VBUS output; a primary-side controller configured to control an input current of the DC/DC converter; a bidirectional insulation circuit coupled to a control input, the bidirectional insulation circuit configured to receive a control input signal of the control input, and then feed back the received control input signal to the primary-side controller; a switch disposed between an output of the DC/DC converter and the VBUS output, the switch SW configured to interrupt the output of the DC/DC converter; and a secondary-side controller connected to the bidirectional insulation circuit, the secondary-side controller configured to execute on/off control of the switch, wherein the primary-side controller varies an output voltage value and an available output current value of the DC/DC converter by controlling the input current on the basis of the control input signal fed back from the bidirectional insulation circuit.

According to another aspect of the embodiments, there is provided a power delivery device comprising: a DC/DC converter disposed between an input and a VBUS output; a primary-side controller configured to control an input current of the DC/DC converter; a bidirectional insulation circuit coupled to a control input, the bidirectional insulation circuit configured to receive a control input signal of the control input, and then feed back the received control input signal to the primary-side controller; a switch disposed between an output of the DC/DC converter and the VBUS output, the switch SW configured to interrupt the output of the DC/DC converter; a secondary-side controller connected to the bidirectional insulation circuit, the secondary-side controller configured to execute on/off control of the switch; and a monitor circuit configured to detect a primary-side signal of the DC/DC converter, wherein the primary-side controller varies an output voltage value and an available output current value of the DC/DC converter by controlling the secondary-side controller through the bidirectional insulation circuit on the basis of the signal detected by the monitor circuit.

According to a still another aspect of the embodiments, there is provided a power delivery device comprising: a DC/DC converter disposed between an input and a VBUS output; a primary-side controller configured to control an input current of the DC/DC converter; a bidirectional insulation circuit coupled to a control input, the bidirectional insulation circuit configured to receive a control input signal of the control input, and then feed back the received control input signal to the primary-side controller; a switch disposed between an output of the DC/DC converter and the VBUS output, the switch SW configured to interrupt the output of the DC/DC converter; a secondary-side controller connected to the bidirectional insulation circuit, the secondary-side controller configured to execute on/off control of the switch; and an error amplifier connected between the output of the DC/DC converter and the bidirectional insulation circuit, wherein the primary-side controller receives a feedback signal received through the bidirectional insulation circuit on the basis of the detected signal of the error amplifier, and varies an output voltage value and an available output current value of the DC/DC converter by controlling the secondary-side controller through the bidirectional insulation circuit on the basis of the feedback signal.

According to a further aspect of the embodiments, there is provided an AC adapter comprising the above-mentioned power delivery device.

According to a still further aspect of the embodiments, there is provided an AC charger comprising the above-mentioned power delivery device.

According to a yet further aspect of the embodiments, there is provided an electronic apparatus comprising the above-mentioned power delivery device.

According to a yet further aspect of the embodiments, there is provided a power delivery system comprising the above-mentioned power delivery device.

According to the embodiments, there can be provided the PD device, the AC adapter, the AC charger, the electronic apparatus, and the PD system, each in which mounting space is reduced, and thereby capable of achieving miniaturization and cost reduction, and capable of controlling the output voltage value and the available output current value (MAX value).

BRIEF DESCRIPTION OF DRAWINGS

FIG. 37A is a schematic configuration diagram showing an aspect of connecting between the PD devices according to the first embodiment through receptacles and a plug cable.

FIG. 37B is a diagram showing a connecting relationship between the two receptacles.

FIG. 38A is a schematic block configuration diagram for explaining a connecting relationship between a power output circuit applicable to the PD device according to the first embodiment, and a power input circuit.

FIG. 38B is a schematic circuit configuration diagram corresponding to the configuration shown in FIG. 38A.

FIG. 47A shows an example of respectively connecting a plurality of the PDs in the AC adapter/AC charger to a plurality of the external plugs, in an example of containing the plug capable of being connected to the outlet in the AC adapter/AC charger.

FIG. 47B shows an example of including a plurality of the receptacles in the AC adapter/AC charger, in the example of containing the plug capable of being connected to the outlet in the AC adapter/AC charger.

FIG. 47C shows an example of respectively connecting a plurality of the plugs contained in the AC adapter/AC charger to a plurality of the external plugs, in the example of containing the plug capable of being connected to the outlet in the AC adapter/AC charger.

FIG. 48A shows in particular an example of including a plurality of internal circuits containing the receptacle therein in an electronic apparatus, in an example of wire connection for connecting the electronic apparatus to the plug capable of being connected to the outlet using the cable.

FIG. 48B shows in particular an example of containing the plug connectable to the outlet in the electronic apparatus and including a plurality of internal circuits containing the receptacle therein in the electronic apparatus, in an example of wire connection for connecting the electronic apparatus to the plug capable of being connected to the outlet using the cable.

DESCRIPTION OF EMBODIMENTS

Figure 1:
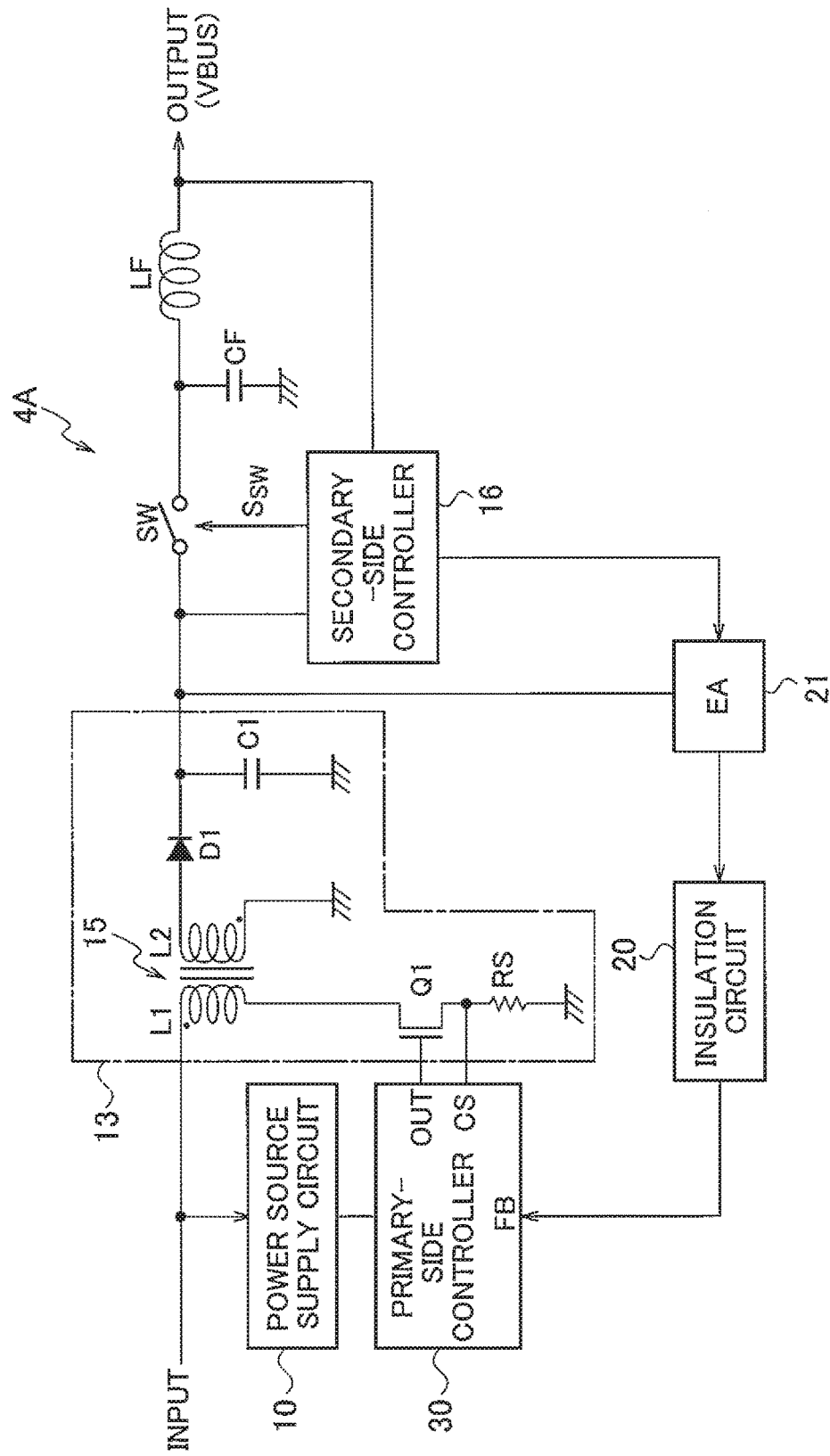
FIG. 1 is a schematic circuit block configuration diagram showing a PD device according to basic technology.

Next, certain embodiments will now be described with reference to drawings. In the description of the following drawings, the identical or similar reference numeral is attached to the identical or similar part. However, it should be noted that the drawings are schematic and therefore the relation between thickness and the plane size and the ratio of the thickness differs from an actual thing. Therefore, detailed thickness and size should be determined in consideration of the following explanation.

Moreover, the embodiments shown hereinafter exemplify the apparatus and method for materializing the technical idea; and the embodiments does not specify the material, shape, structure, placement, etc. of each component part as the following. The embodiments may be changed without departing from the spirit or scope of claims.

[Basic Technology]

As shown in FIG. 1, a PD device 4A according to a basic technology includes: a DC/DC converter 13 disposed between an input and an output, DC/DC converter 13 including a transformer 15, a diode D1, a capacitor C1, and a MOS transistor Q1 and a resistor RS connected in series between a primary-side inductance L1 of the transformer 15 and a ground potential; a primary-side controller 30 configured to control the MOS transistor Q1; a power source supply circuit 10 connected between the input and the primary-side controller 30, the power source supply circuit 10 configured to supply a power source to the primary-side controller 30; a secondary-side controller 16 connected to the output, the secondary-side controller 16 capable of controlling an output voltage $V_o$ and an output current $I_o$; an error amplifier 21 for error compensation connected to an output of the DC/DC converter 13 and the secondary-side controller 16; and an insulation circuit 20 connected to the error amplifier 21, the insulation circuit 20 configured to feed back output information to the primary-side controller 30.

Moreover, the secondary-side controller 16 may be connected to the output (VBUS) through an AC coupling capacitor.

Moreover, as shown in FIG. 1, the PD device 4A according to the basic technology includes: a switch SW configured to interrupt the output of the DC/DC converter 13 and the power line output (VBUS); and a filter circuit (LF, CF) disposed between the switch SW and the power line output (VBUS). ON/OFF control for the switch SW can be executed by the secondary-side controller 16.

An AC signal is superimposed to be input into the power line output (VBUS) from an outside, in the PD device 4A according to the basic technology.

In the PD device 4A according to the basic technology, the control input signal is input into the secondary-side controller 16 from the power line output (VBUS), and electric power information at the output side is fed back to the primary-side controller 30 through the error amplifier 21 and the insulation circuit 20. The primary-side controller 30 controls ON/OFF of the MOS transistor Q1, thereby stabilizing the output voltage.

Moreover, in the PD device 4A according to the basic technology, an amount of current conducted to the primary-side inductance L1 is detected by the current sensing resistor RS, and an amount of current, e.g. a primary-side overcurrent, is controlled in the primary-side controller 30. As a consequence, the PD device 4A according to the basic technology has a variable function of an output voltage value and an available output current value (MAX value).

In the PD device 4A according to the basic technology, the variable function of the output voltage value and the available output current value (MAX value) of the step-down (buck) type DC/DC converter 13 is realized by the feedback control from the secondary-side controller 16 to the primary-side controller 30. Accordingly, a relationship between the output voltage $V_o$ and the output currents $I_o$ can be varied (variable function) in accordance with loads (e.g., smartphones, laptop PCs, tablet PCs, etc.) connected to the output.

The inductance LF formed with a filter coil at the output side is a separating inductance. More specifically, the filter circuit including the inductance LF and the capacitor CF separates a control signal from the DC/DC converter in order that the control input signal from the output is not input into the DC/DC converter 13.

First Embodiment

Figure 2A:
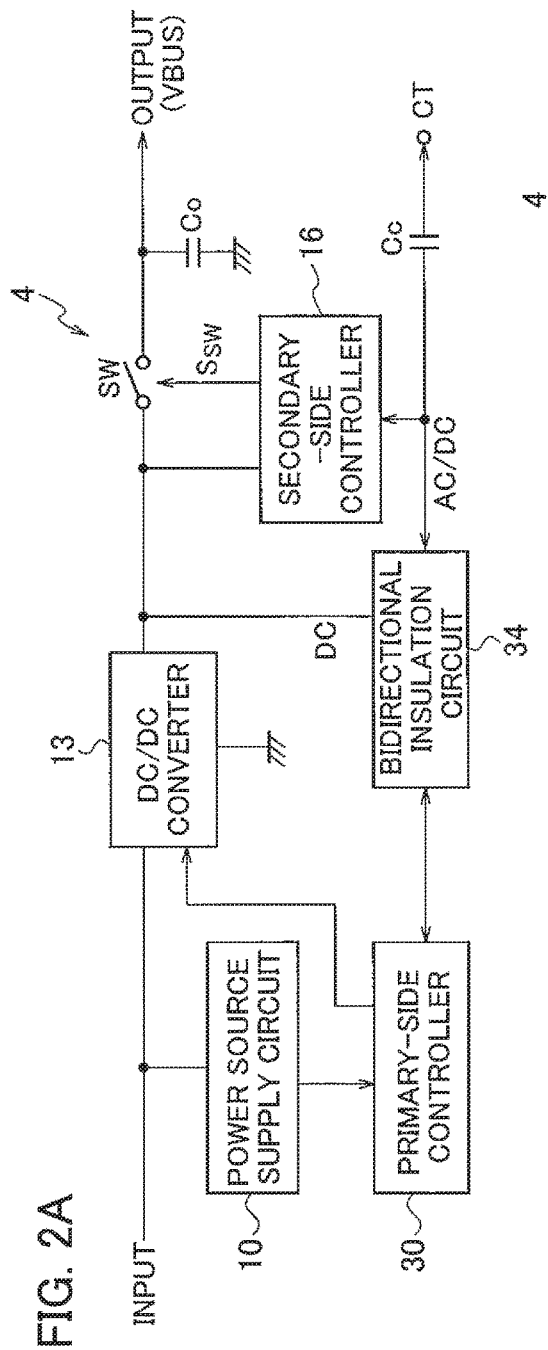
FIG. 2A is a schematic circuit block configuration diagram showing a PD device according to a first embodiment.

FIG. 2A shows a schematic circuit block configuration of a PD device according to a first embodiment.

As shown in FIG. 2A, the PD device 4 according to the first embodiment includes: a DC/DC converter 13 disposed between an input and a VBUS output; a primary-side controller 30 configured to control an input current of the DC/DC converter 13; and a bidirectional insulation circuit 34 coupled to a control input, the bidirectional insulation circuit 34 configured to receive a control input signal of the control input, and then feed back the received control input signal to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 2A, the PD device 4 according to the first embodiment may include: a switch SW disposed between the output of the DC/DC converter 13 and the VBUS output, the switch SW configured to interrupt an output of the DC/DC converter 13; and a secondary-side controller 16 connected to the bidirectional insulation circuit 34, the secondary-side controller 16 configured to execute on/off control of the switch SW.

Moreover, the PD device 4 according to the first embodiment may include an AC coupling capacitor $C_C$ configured to couple the bidirectional insulation circuit 34 and the control input to each other, as shown in FIG. 2A. Alternatively, the bidirectional insulation circuit 34 and the control input may be directly coupled to each other, without through the coupling capacitor $C_C$.

Moreover, as shown in FIG. 2A, the PD device 4 according to the first embodiment may include a control terminal CT, and the control input may be coupled to the control terminal CT. Moreover, a control output signal of the PD device 4 according to the first embodiment can be output to an external apparatus through the control terminal CT.

In the PD device 4 according to the first embodiment, the bidirectional insulation circuit 34 can execute a frequency conversion, a direct current (DC) level conversion, or an amplitude level conversion.

Moreover, in the PD device 4 according to the first embodiment, the output of the DC/DC converter 13 and the power line output (VBUS) can be interrupted by the switch SW. ON/OFF control for the switch SW can be executed by the secondary-side controller 16. The switch SW may include a Metal Oxide Semiconductor Field Effect Transistor (MOSFET).

Moreover, as shown in FIG. 2A, the PD device 4 according to the first embodiment may include a power source supply circuit 10 connected between an input of the DC/DC converter 13 and the primary-side controller 30, the power source supply circuit 10 configured to supply electric power to the primary-side controller 30.

In the PD device 4 according to the first embodiment, the variable function of the output voltage value and the available output current value (MAX value) of the step-down (buck) type DC/DC converter 13 is realized by the feedback control from the bidirectional insulation circuit 34 to the primary-side controller 30. Accordingly, a relationship between the output voltage $V_o$ and the output currents $I_o$ can be varied (variable function) in accordance with loads (e.g., smartphones, laptop PCs, tablet PCs, etc.) connected to the output.

Extended Example

Figure 2B:
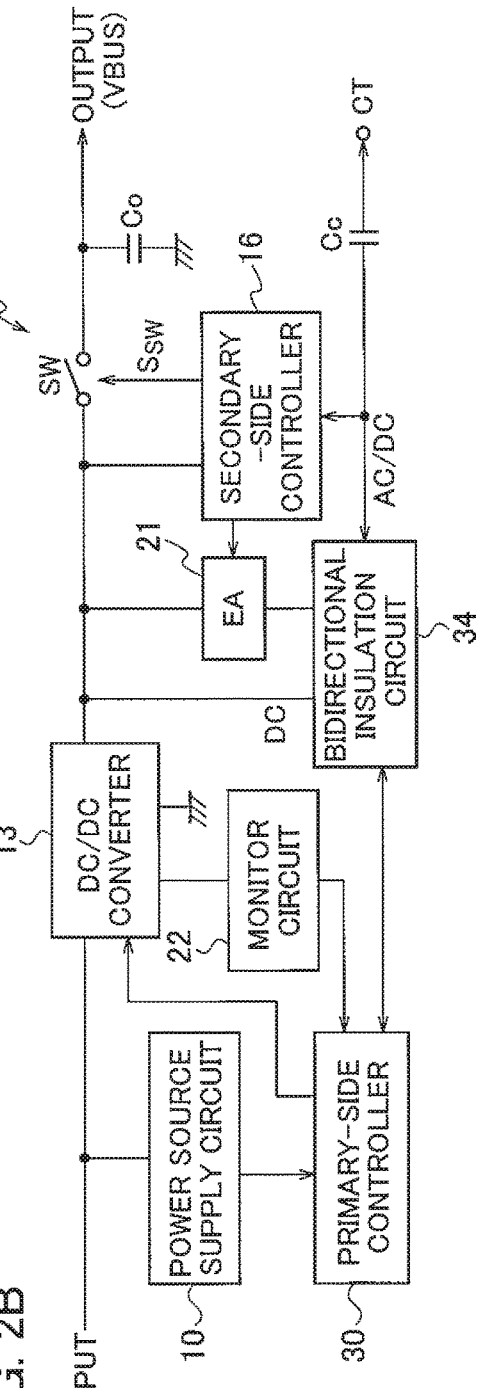
FIG. 2B is a schematic circuit block configuration diagram showing a PD device according to an extended example of the first embodiment.

FIG. 2B shows a schematic circuit block configuration of a PD device according to an extended example of the first embodiment.

The PD device according to the extended example 1 of the first embodiment is operated in accordance with a feedback control different from that of the first embodiment. More specifically, as shown in FIG. 2B, the PD device according to the extended example 1 of the first embodiment includes a monitor circuit 22 configured to detect a primary-side signal of the DC/DC converter 13, and the primary-side controller 30 varies an output voltage value and an available output current value of the DC/DC converter 13 by controlling the secondary-side controller 16 through the bidirectional insulation circuit 34 on the basis of the signal detected by the monitor circuit 22.

The monitor circuit 22 can be configured to include circuits for detecting a voltage between gate and drain of the MOS transistor Q1 shown in FIG. 1, for example.

A PD device according to an extended example 2 of the first embodiment is operated in accordance with a feedback mechanism different from that of the first embodiment and that of the extended example 1. More specifically, as shown in FIG. 2B, the PD device according to the extended example 2 of the first embodiment includes an error amplifier 21 connected between the output of the DC/DC converter 13 and the bidirectional insulation circuit 34; and the primary-side controller 30 receives a feedback signal received through the bidirectional insulation circuit 34 on the basis of the detected signal of the error amplifier 21, and varies an output voltage value and an available output current value of the DC/DC converter 13 by controlling the secondary-side controller 16 through the bidirectional insulation circuit 34 on the basis of the aforementioned feedback signal.

The configuration of the extended examples 1 and 2 of the first embodiment and the feedback control are similarly extensible in the following modified examples 1-7 of the first embodiments, and the same feedback control can be applied thereto. Moreover, the configuration of the extended examples 1 and 2 of the first embodiment can be similarly applied in the following second to eighth embodiments, and the feedback control thereof can be similarly applied thereto. Hereinafter, the duplicated descriptions will be omitted.

Modified Example 1

Figure 3:
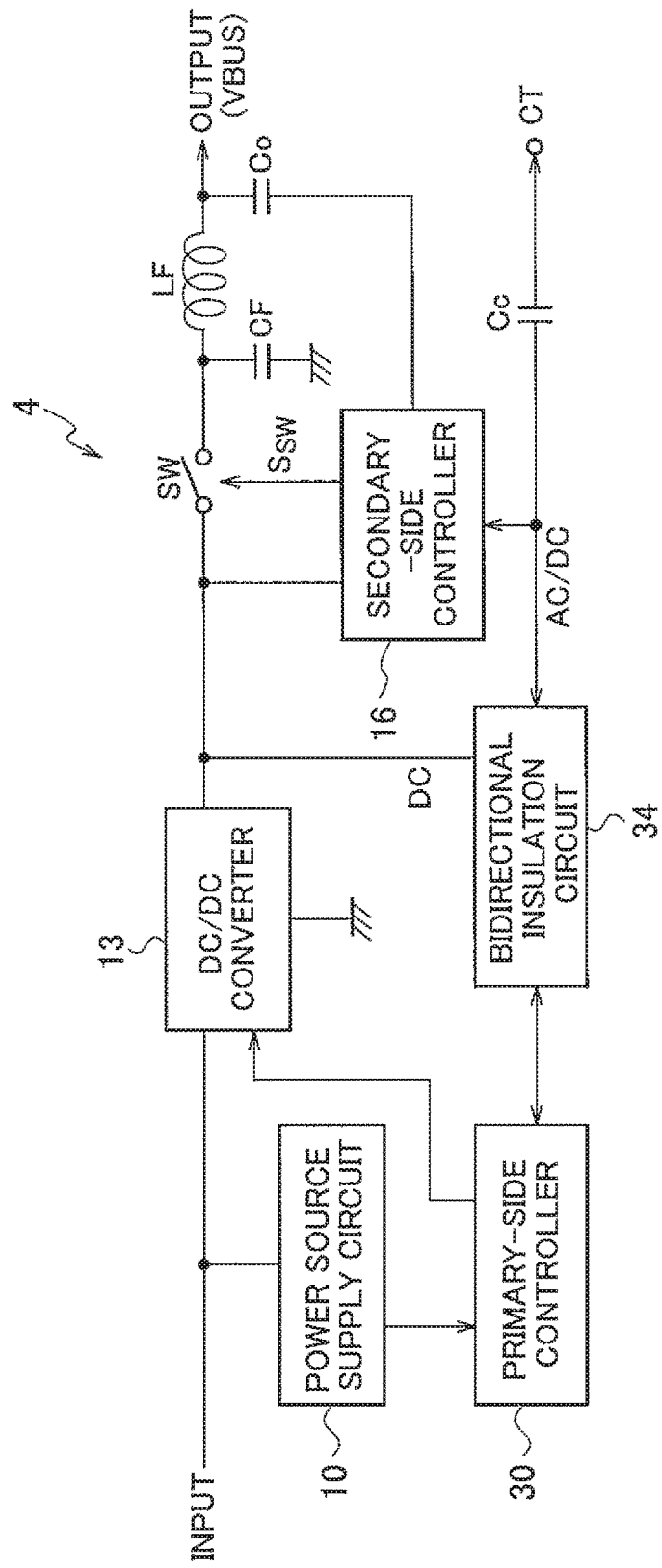
FIG. 3 is a schematic circuit block configuration diagram showing a PD device according to a modified example 1 of the first embodiment.

FIG. 3 shows a schematic circuit block configuration of a PD device according to a modified example 1 of the first embodiment.

As shown in FIG. 3, the PD device 4 according to the modified example 1 of the first embodiment includes: a DC/DC converter 13 disposed between an input and a VBUS output; a primary-side controller 30 configured to control an input current of the DC/DC converter 13; a bidirectional insulation circuit 34 coupled to a control input, the bidirectional insulation circuit 34 configured to receive a control input signal of the control input, and then feed back the received control input signal to the primary-side controller 30; a switch SW disposed between an output of the DC/DC converter 13 and the VBUS output, the switch SW configured to interrupt the output of the DC/DC converter 13; a secondary-side controller 16 connected to the bidirectional insulation circuit 34, the secondary-side controller 16 configured to execute on/off control of the switch SW; and an output capacitor $C_O$ connected to between the secondary-side controller 16 and the VBUS output. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

The bidirectional insulation circuit 34 can further execute signal conversion and switching of an AC signal component of the VBUS output. The AC signal component of the VBUS output is coupled to the secondary-side controller 16 through the output capacitor $C_O$ connected between the VBUS output and the secondary-side controller 16, and can be transmitted to the bidirectional insulation circuit 34.

Moreover, as shown in FIG. 3, the PD device 4 according to the modified example 1 of the first embodiment may include a control terminal CT, and the control input may be coupled to the control terminal CT. Moreover, a control output signal of the PD device 4 according to the modified example 1 of the first embodiment can be output to an external apparatus through the control terminal CT.

Moreover, the control output signal of the PD device 4 according to the modified example 1 of the first embodiment can be output to the external apparatus also through the output capacitor $C_O$, in the PD device 4 according to the first embodiment.

The inductance LF formed with a filter coil at the output side is a separating inductance. More specifically, the filter circuit including the inductance LF and the capacitor CF separates a control signal from the DC/DC converter in order that the control input signal from the VBUS output is not input into the DC/DC converter 13. Other configurations are the same as those of the first embodiment.
(Bidirectional Insulation Circuit)

Figure 4:
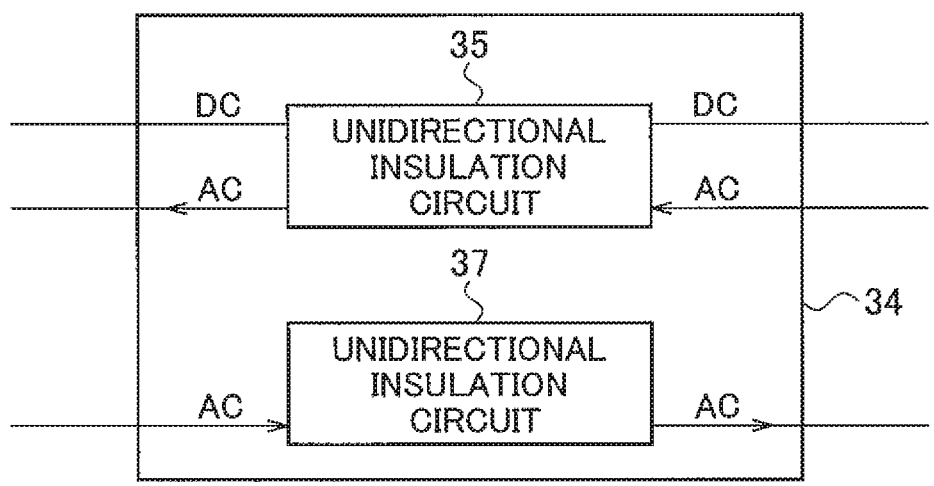
FIG. 4 is a schematic block configuration diagram showing a bidirectional insulation circuit applicable to the PD device according to the first embodiment.

FIG. 4 shows a schematic block configuration of the bidirectional insulation circuit 34 applicable to the PD device according to the first embodiment.

The bidirectional insulation circuit 34 may include a plurality of unidirectional insulation circuits 35 and 37, as shown in FIG. 4.

Moreover, as shown in FIG. 4, the bidirectional insulation circuit 34 may include; a first unidirectional insulation circuit 35 capable of DC coupling and AC coupling; and a second unidirectional insulation circuit 37 capable of AC coupling.

A capacitor, a photo coupler, a transformer, etc. is applicable to the bidirectional insulation circuits 35 and 37. Moreover, as usage, a bidirectional transformer having an insulated driver, a bilateral device, etc. may also be applied thereto.

In the present embodiment, the unidirectional insulation circuit 35 can transmit the DC information and the input AC information from the secondary side to the primary side, and the unidirectional insulation circuit 37 can transmit the output AC information from the primary side to the secondary side. The plurality of the unidirectional insulation circuits 35, 37 are combined, thereby composing the bidirectional insulation circuit 34 as a consequence.

In the PD device 4 according to the first embodiment, the variable function of the output voltage value and the available output current value (MAX value) of the step-down (buck) type DC/DC converter 13 is realized by the feedback control from the bidirectional insulation circuit 34 to the primary-side controller 30. Accordingly, a relationship between the output voltage $V_o$ and the output current $I_o$ can be varied (variable function) in accordance with loads (e.g., smartphones, laptop PCs, tablet PCs, etc.) connected to the output.

Figure 5A:
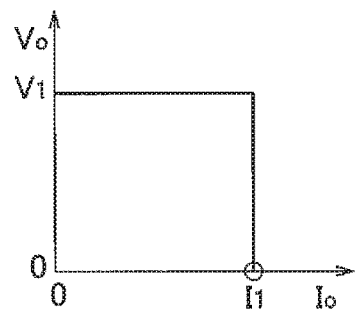
FIG. 5A is a schematic diagram showing a relationship of an output voltage and an output current which are obtained using the PD device according to the first embodiment, which is an example of a rectangular shape indicating a Constant Voltage Constant Current (CVCC) characteristics.
Figure 5B:
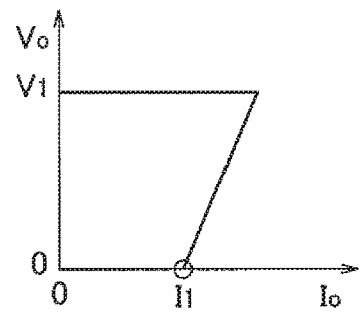
FIG. 5B is a schematic diagram showing the relationship of the output voltage and the output current obtained using the PD device according to the first embodiment, which is an example of a fold-back shape of an inverted trapezium.
Figure 5C:
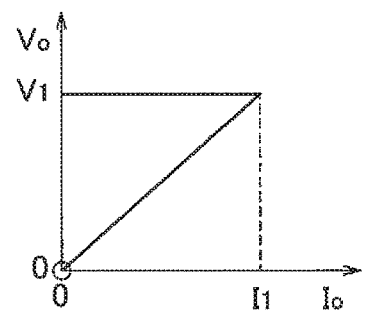
FIG. 5C is a schematic diagram showing the relationship of the output voltage and the output current obtained using the PD device according to the first embodiment, which is an example of a fold-back shape of an inverted triangle.
Figure 5D:
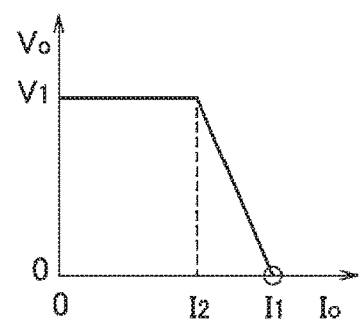
FIG. 5D is a schematic diagram showing the relationship of the output voltage and the output current obtained using the PD device according to the first embodiment, which is an example of a trapezoidal shape.
Figure 5E:
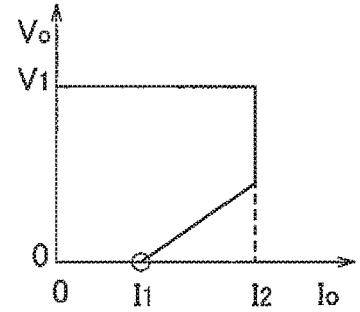
FIG. 5E is a schematic diagram showing the relationship of the output voltage and the output current obtained using the PD device according to the first embodiment, which is an example of a pentagon shape.

As the relationship between the output voltage $V_o$ and the output current $I_o$ obtained by using the PD device 4 according to the first embodiment, there can be adopted various shape, e.g. a rectangular shape as shown in FIG. 5A, a fold-back shape of inverted trapezium as shown in FIG. 5B, a fold-back shape of inverted triangle as shown in FIG. 5C, a trapezoidal shape as shown in FIG. 5D, and a pentagonal shape as shown in FIG. 5E. For example, the rectangular shape shown in FIG. 5A is an example of Constant Voltage Constant Current (CVCC).

In addition, in the PD device 4 according to the modified example 1 of the first embodiment, another output capacitor CO for extracting the AC signals superimposed to be input into the power line output (VBUS) from an outside may be connected between the secondary-side controller 16 and the power line output (VBUS). However, in such a case, the separating inductance LF will be required therefor. More specifically, since it is required to separate the control input signal from the power line output (VBUS) in order that the control input signal is not input into the DC/DC converter 13, there will be required a filter circuit including the inductance LF and the capacitor CF. On the other hand, since the output capacitor $C_O$ is not applied in the PD device 4 according to the first embodiment, such a separating inductance LF becomes unnecessary. In this case, since the separating inductance LF can be removed therefrom, mounting areas can be reduced and thereby miniaturization and weight saving can be realized.

Figure 6:
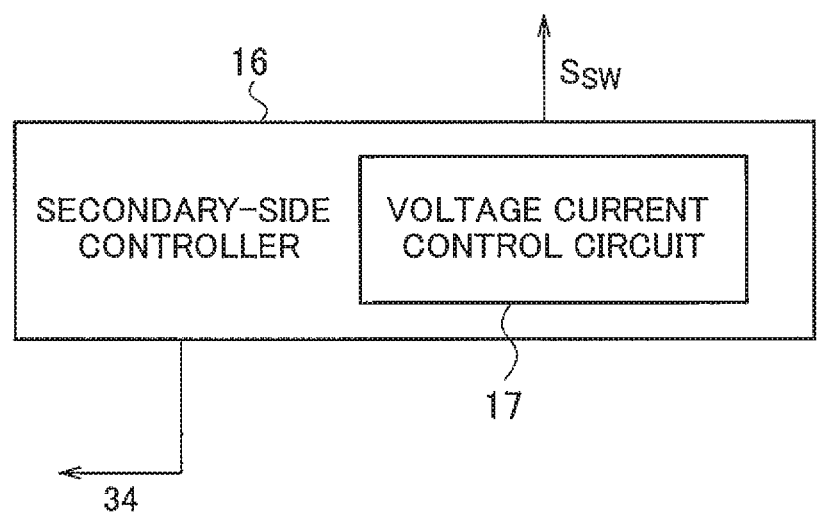
FIG. 6 is a schematic circuit block configuration diagram showing a secondary-side controller applied to the PD device according to the first embodiment.

In the PD device according to the first embodiment, as shown in FIG. 6, the secondary-side controller 16 may include a voltage current control circuit 17 configured to control the output voltage $V_o$ and the output current $I_o$.

Modified Example 2

Figure 7:
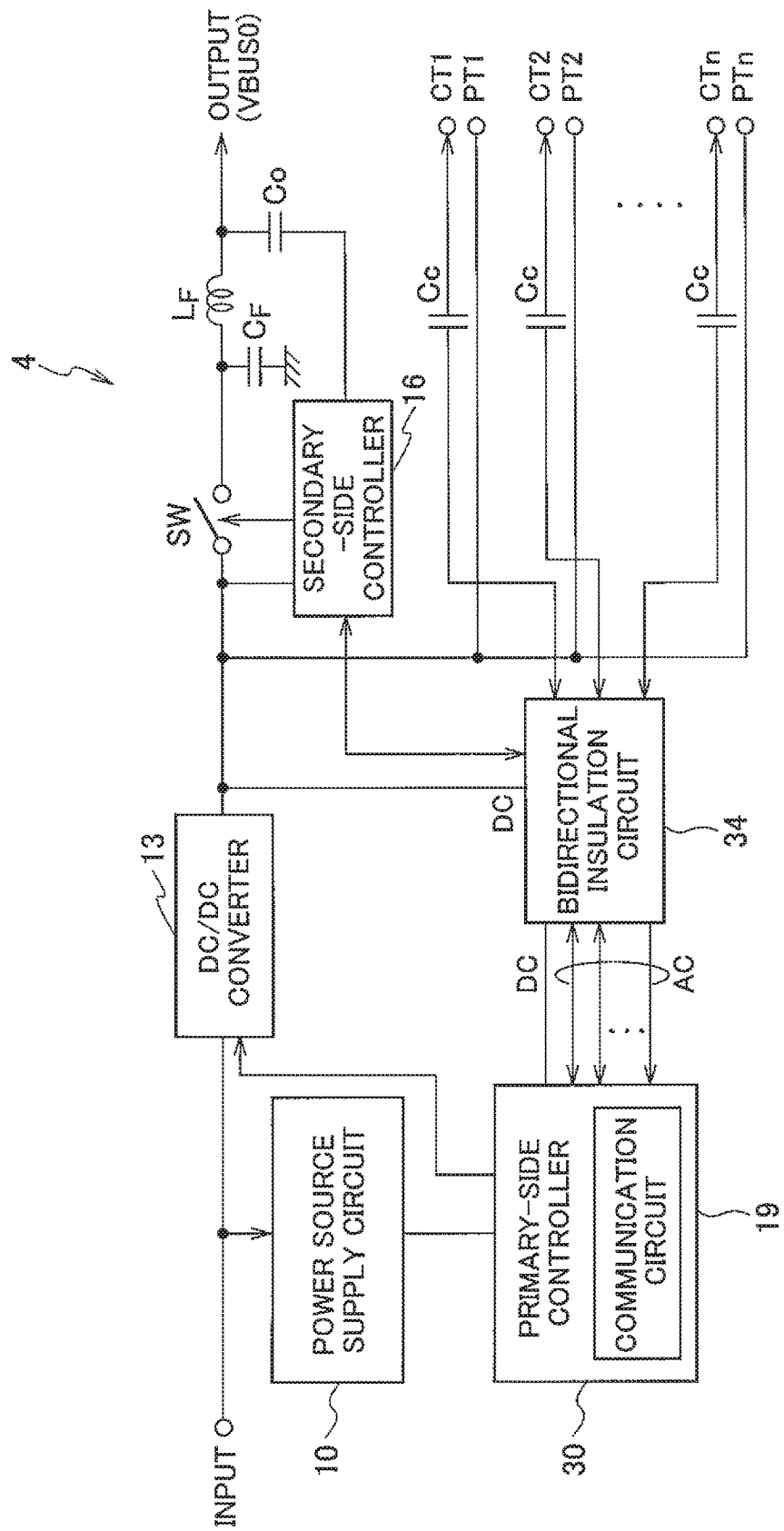
FIG. 7 is a schematic circuit block configuration diagram showing a PD device according to a modified example 2 of the first embodiment.

FIG. 7 shows a schematic circuit block configuration of a PD device according to a modified example 2 of the first embodiment.

In the PD device 4 according to a modified example 2 of the first embodiment, the bidirectional insulation circuit 34 is coupled to a plurality of control inputs, and can execute signal conversion and switching of the control input signals of the plurality of the control inputs.

As shown in FIG. 7, the PD device 4 according to the modified example 2 of the first embodiment includes: a DC/DC converter 13 disposed between an input and a VBUS output; a primary-side controller 30 configured to control an input current of the DC/DC converter 13; and a bidirectional insulation circuit 34 coupled to a plurality of control inputs, the bidirectional insulation circuit 34 configured to executed a signal conversion of control input signals of the plurality of the control inputs, the bidirectional insulation circuit 34 configured to feed back the control input signals subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

As shown in FIG. 7, in the PD device 4 according to the modified example 2 of the first embodiment, the DC/DC converter 13 can supply output voltages to a plurality of VBUS outputs disposed in pairs with the plurality of the control inputs.

Moreover, as shown in FIG. 7, the PD device 4 according to the modified example 3 of the first embodiment includes a plurality of VBUS power output terminals PT1, PT2, . . . , PTn, and the DC/DC converter 13 can supply the output voltages through the plurality of the VBUS power output terminals PT1, PT2, . . . , PTn.

Moreover, the primary-side controller 30 may include a communication circuit 19 capable of executing a code conversion. More specifically, a signal conversion of the control input signal of the plurality of the control inputs to be executed in the bidirectional insulation circuit 34 may be executed in the communication circuit 19 in the primary-side controller 30. In this case, the bidirectional insulation circuit 34 may have a configuration of arranging the unidirectional insulation circuit of which number is equivalent to the number of the control inputs shown in FIG. 4, for example.

Moreover, the PD device 4 according to the modified example 2 of the first embodiment may include an output capacitor $C_O$ configured to couple the secondary-side controller 16 and the VBUS output to each other, as shown in FIG. 7.

The bidirectional insulation circuit 34 can further execute signal conversion and switching of an AC signal component of the VBUS output. The AC signal component of the VBUS output is coupled to the secondary-side controller 16 and the bidirectional insulation circuit 34 through the output capacitor $C_O$ connected between the VBUS output and the secondary-side controller 16.

Moreover, as shown in FIG. 7, the PD device 4 according to the modified example 2 of the first embodiment may include a plurality of control terminals CT1, CT2, . . . , CTn, and the plurality of the control inputs may be respectively coupled to the plurality of the controls terminals CT1, CT2, . . . , CTn. Moreover, the respective control output signals of the PD device 4 according to the modified example 2 of the first embodiment can be output to external apparatuses through the plurality of the respective control terminals CT1, CT2, . . . , CTn. The PD device 4 according to the modified example 2 of the first embodiment may include coupling capacitors $C_C$ respectively configured to couple the plurality of the control terminals CT1, CT2, . . . , CTn and the bidirectional insulation circuit 34 to each other. Alternatively, the bidirectional insulation circuit 34 and the plurality of the control input may be directly coupled to each other, without through the coupling capacitors $C_C$.

Moreover, the control output signal of the PD device 4 according to the modified example 2 of the first embodiment can be output to the external apparatus also through the output capacitor $C_O$, in the PD device 4 according to the modified example 2 of the first embodiment.

Moreover, as shown in FIG. 7, the PD device 4 according to the modified example 2 of the first embodiment may includes: a switch SW configured to interrupt the output of the DC/DC converter 13 and the VBUS output; and a filter circuit (LF, CF) disposed between the switch SW and the VBUS output.

Moreover, in the PD device 4 according to the modified example 2 of the first embodiment, when the output capacitor $C_O$ configured to couple the secondary-side controller 16 and the VBUS output to each other is not applied thereto, the inductance LF may be omitted therefrom. Other configurations are the same as those of the modified example 1 of the first embodiment.

Modified Example 3

Figure 8:
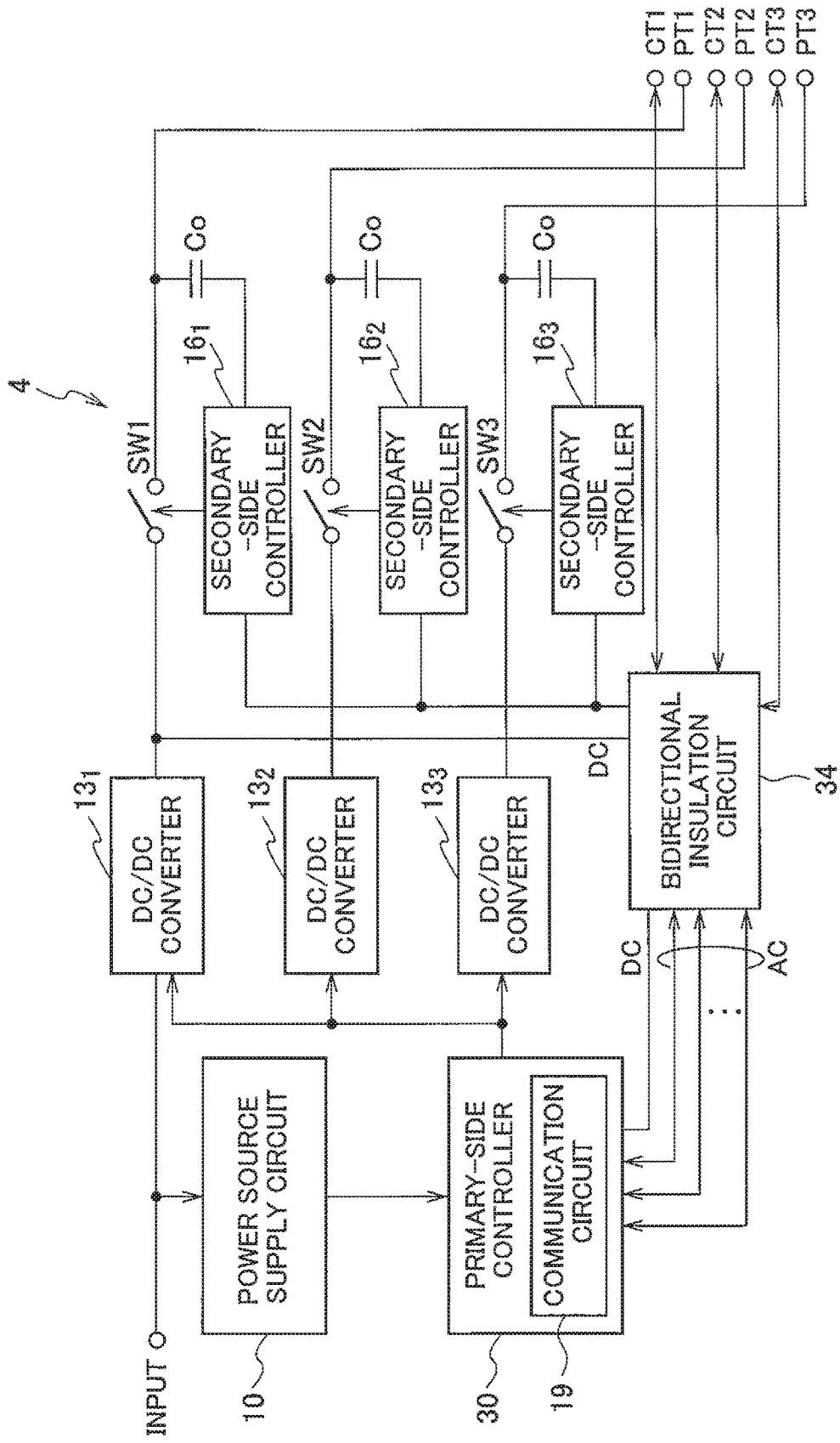
FIG. 8 is a schematic circuit block configuration diagram showing a PD device according to a modified example 3 of the first embodiment.

FIG. 8 shows a schematic circuit block configuration of a PD device according to a modified example 3 of the first embodiment.

As shown in FIG. 8, the PD device 4 according to the modified example 3 of the first embodiment includes: a plurality of DC/DC converters $13_1$, $13_2$, and $13_3$ connected to the primary-side controller 30, each of the DC/DC converters $13_1$, $13_2$, and $13_3$ respectively configured to supply output voltages to a plurality of VBUS outputs disposed in pairs with a plurality of control inputs; switches SW1, SW2, and SW3 respectively disposed between outputs of the plurality of the DC/DC converters $13_1$, $13_2$, and $13_3$ and VBUS outputs; and secondary-side controllers $16_1$, $16_2$, and $16_3$ connected to a bidirectional insulation circuit 34, the secondary-side controllers $16_1$, $16_2$, and $16_3$ respectively execute on/off control of the switches SW1, SW2, and SW3.

Moreover, as shown in FIG. 8, the PD device 4 according to the modified example 3 of the first embodiment includes a plurality of VBUS power output terminals PT1, PT2, and PT3, and the plurality of the DC/DC converter $13_1$, $13_2$, and $13_3$ can respectively supply the output voltages through the plurality of the VBUS power output terminals PT1, PT2, and PT3.

Moreover, the PD device 4 according to the modified example 3 of the first embodiment may include AC coupling capacitors (not shown) respectively coupled to the plurality of the control inputs, and the bidirectional insulation circuit 34 may be coupled to the plurality of the control inputs respectively through the AC coupling capacitors.

Moreover, the plurality of the control inputs may be directly connected to the bidirectional insulation circuit 34. More specifically, the control input signals of the plurality of the control inputs may be directly input to the bidirectional insulation circuit 34 without through the AC coupling capacitors, as shown in FIG. 8.

Moreover, the primary-side controller 30 may include a communication circuit 19 capable of executing a code conversion. More specifically, a signal conversion of the control input signal of the plurality of the control inputs to be executed in the bidirectional insulation circuit 34 may be executed in the communication circuit 19 in the primary-side controller 30. In this case, the bidirectional insulation circuit 34 may have a configuration of arranging the unidirectional insulation circuit of which number is equivalent to the number of the control inputs shown in FIG. 4, for example.

Moreover, as shown in FIG. 8, the PD device 4 according to the modified example 3 of the first embodiment may include output capacitors $C_O$ configured to respectively couple the secondary-side controllers $16_1$, $16_2$, and $16_3$ and the VBUS outputs.

The bidirectional insulation circuit 34 can further execute signal conversion and switching of an AC signal component of the VBUS output. The AC signal components of the VBUS outputs are coupled to the secondary-side controllers $16_1$, $16_2$, and $16_3$ and the bidirectional insulation circuit 34 through the output capacitors $C_O$ respectively connected between the VBUS output and the secondary-side controllers $16_1$, $16_2$, and $16_3$. Other configurations are the same as those of the modified example 2 of the first embodiment.

Modified Example 4

Figure 9:
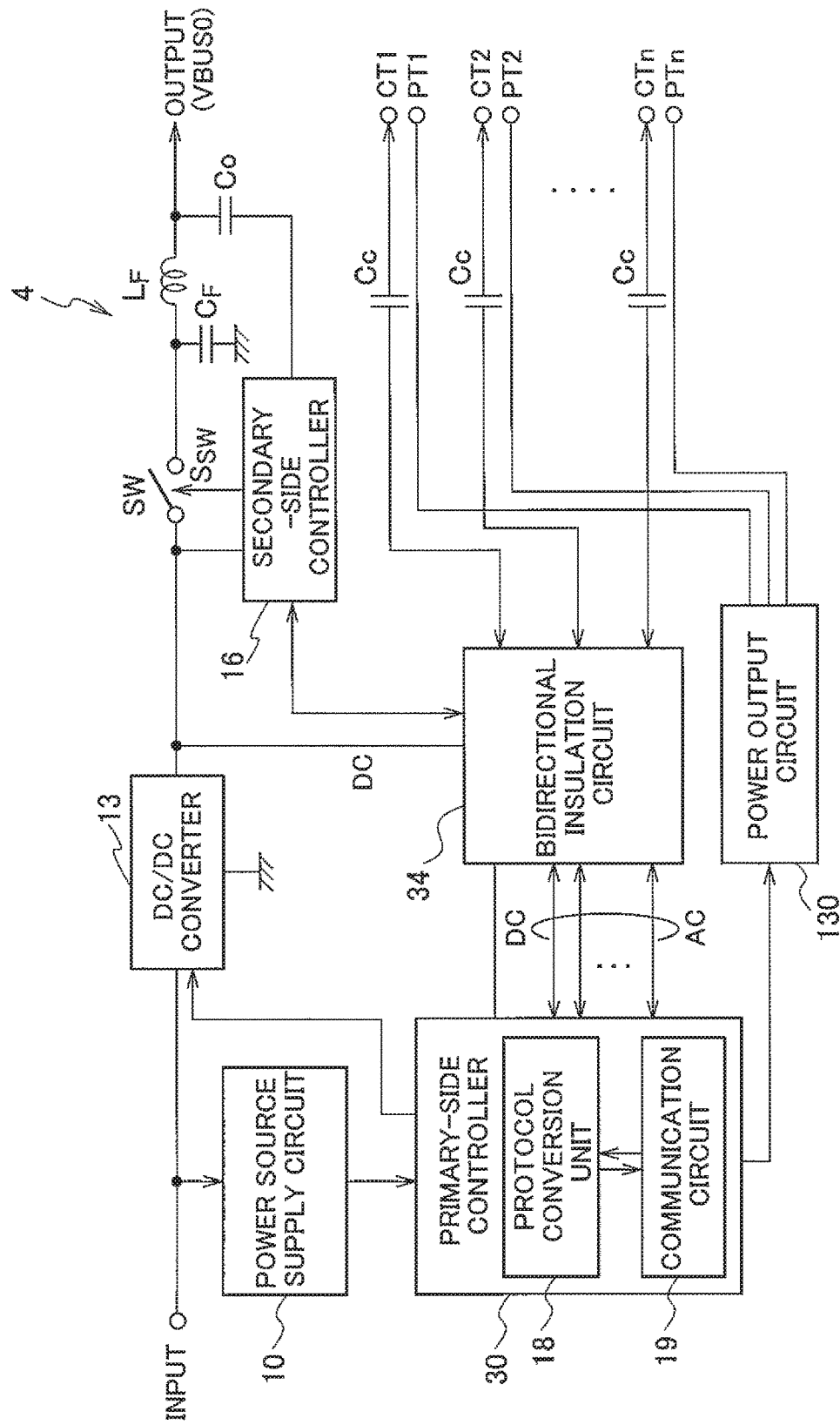
FIG. 9 is a schematic circuit block configuration diagram showing a PD device according to a modified example 4 of the first embodiment.

FIG. 9 shows a schematic circuit block configuration of a PD device according to a modified example 4 of the first embodiment.

As shown in FIG. 9, the PD device 4 according to the modified example 4 of the first embodiment includes: a DC/DC converter 13 disposed between an input and a VBUS output; a primary-side controller 30 configured to control an input current of the DC/DC converter 13; and a bidirectional insulation circuit 34 coupled to a plurality of control inputs, the bidirectional insulation circuit 34 configured to executed a signal conversion of control input signals of the plurality of the control inputs, the bidirectional insulation circuit 34 configured to feed back the control input signals subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

As shown in FIG. 9, the PD device 4 according to the modified example 4 of the first embodiment includes a power output circuit 130 connected to the primary-side controller 30, the power output circuit 130 configured to supply output voltages to a plurality of VBUS outputs disposed in pairs with the plurality of the control inputs. In this context, the power output circuit 130 may include a plurality of DC/DC converters.

Moreover, as shown in FIG. 9, the PD device 4 according to the modified example 4 of the first embodiment includes a plurality of VBUS power output terminals PT1, PT2, . . . , PTn, and the power output circuit 130 can supply the output voltages through the plurality of the VBUS power output terminals PT1, PT2, . . . , PTn.

Moreover, the PD device 4 according to the modified example 4 of the first embodiment may include AC coupling capacitors (not shown) respectively coupled to the plurality of the control inputs, and the bidirectional insulation circuit 34 may be coupled to the plurality of the control inputs respectively through the AC coupling capacitors.

Moreover, the plurality of the control inputs may be directly connected to the bidirectional insulation circuit 34. More specifically, the control input signals of the plurality of the control inputs may be directly input to the bidirectional insulation circuit 34 without through the AC coupling capacitors.

Moreover, as shown in FIG. 9, the PD device 4 according to the modified example 4 of the first embodiment may include: a switch SW disposed between the output of the DC/DC converter 13 and the VBUS output, the switch SW configured to interrupt an output of the DC/DC converter 13; and a secondary-side controller 16 connected to the bidirectional insulation circuit 34, the secondary-side controller 16 configured to execute on/off control of the switch SW.

Moreover, the PD device 4 according to the modified example 4 of the first embodiment may include an output capacitor $C_O$ configured to couple the secondary-side controller 16 and the VBUS output.

Moreover, the primary-side controller 30 may include: a protocol conversion unit 18 capable of executing a frequency conversion; and a communication circuit 19 capable of executing a code conversion. More specifically, a signal conversion of the control input signal of the plurality of the control inputs to be executed in the bidirectional insulation circuit 34 may be executed in the protocol conversion unit 18 and the communication circuit 19 in the primary-side controller 30. In this case, the bidirectional insulation circuit 34 may have a configuration of arranging the unidirectional insulation circuit of which number is equivalent to the number of the control inputs shown in FIG. 4, for example.

The primary-side controller 30 can further execute signal conversion and switching of an AC signal component of the VBUS output. The AC signal component of the VBUS output is coupled to the secondary-side controller 16, the bidirectional insulation circuit 34, and the primary-side controller 30, through the output capacitor $C_O$ connected between the VBUS output and the secondary-side controller 16.

Moreover, as shown in FIG. 9, the PD device 4 according to the modified example 4 of the first embodiment may include a plurality of control terminals CT1, CT2, . . . , CTn, and the plurality of the control inputs may be respectively coupled to the plurality of the controls terminals CT1, CT2, . . . , CTn. Moreover, the respective control output signals of the PD device 4 according to the modified example 4 of the first embodiment can be output to external apparatuses through the plurality of the respective control terminals CT1, CT2, . . . , CTn. The PD device 4 according to the modified example 4 of the first embodiment may include coupling capacitors $C_C$ respectively configured to couple the plurality of the control terminals CT1, CT2, . . . , CTn and the bidirectional insulation circuit 34. Alternatively, the bidirectional insulation circuit 34 and the plurality of the control input may be directly coupled to each other, without through the coupling capacitors $C_C$.

Moreover, the control output signal of the PD device 4 according to the modified example 2 of the first embodiment can be output to the external apparatus also through the output capacitor $C_O$, in the PD device 4 according to the modified example 2 of the first embodiment.

Moreover, as shown in FIG. 9, the PD device 4 according to the modified example 4 of the first embodiment may includes: a switch SW configured to interrupt the output of the DC/DC converter 13 and the VBUS output; and a filter circuit (LF, CF) disposed between the switch SW and the VBUS output.

Moreover, in the PD device 4 according to the modified example 4 of the first embodiment, when the output capacitor $C_O$ configured to couple the secondary-side controller 16 and the VBUS output to each other is not applied thereto, the inductance LF may be omitted therefrom. Other configurations are the same as those of the modified example 2 of the first embodiment.

According to the PD device according to the modified examples 2 to 4 of the first embodiment, there can be provided the PD device capable of switching with respect to the plurality of apparatuses and capable of reducing the number of the parts, and thereby capable of achieving miniaturization and cost reduction and capable of controlling the output voltage value and the available output current value (MAX value).

(Configuration of Bidirectional Insulation Circuit)

Figure 10:
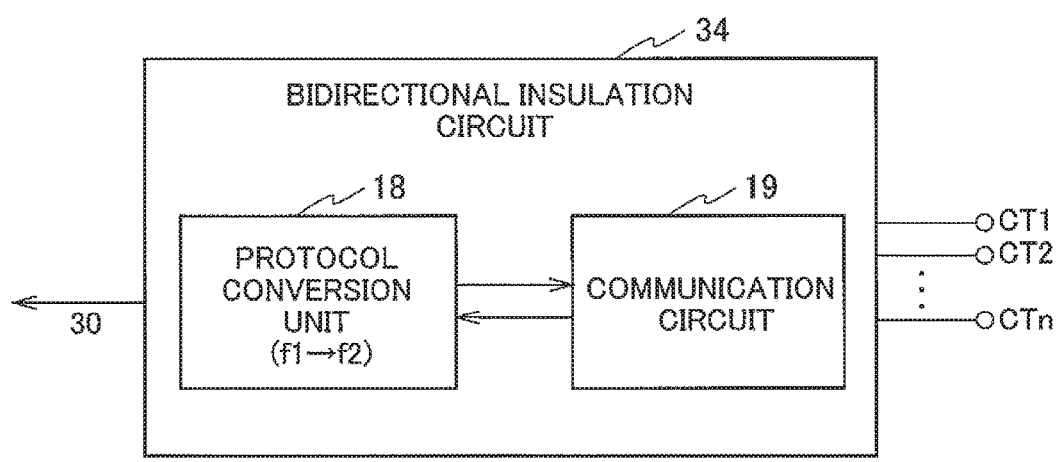
FIG. 10 is a schematic block configuration diagram showing a bidirectional insulation circuit applicable to the PD device according to the first embodiment.

FIG. 10 shows a schematic block configuration of the bidirectional insulation circuit 34 applicable to the PD device according to the first embodiment.

In the PD device according to the first embodiment, as shown in FIG. 10, the bidirectional insulation circuit 34 includes: a protocol conversion unit 18 connected to the primary-side controller 30, the protocol conversion unit 18 configured to execute a frequency conversion; and a communication circuit 19 disposed between the protocol conversion unit 18 and the control input, the communication circuit 19 configured to execute a code conversion.

In the PD device according to the first embodiment, the control inputs in the plurality of the control terminals CT1, CT2, . . . , CTn are subjected to a coding modulation in the communication circuit 19, and also are subjected to a frequency conversion from a frequency f1 to a frequency f2 in the protocol conversion unit 18, and then are input into the primary-side controller 30.

Moreover, the respective control output signals of the PD device 4 according to the first embodiment can be output to external apparatuses through the plurality of the respective control terminals CT1, CT2, . . . , CTn. More specifically, the control signals from the primary-side controller 30 are also subjected to the frequency conversion from the frequency f2 to the frequency f1 in the protocol conversion unit 18, and are also subjected to the coding modulation in the communication circuit 19, and then can be output to the plurality of the control terminals CT1, CT2, . . . , CTn.

Moreover, the AC signal components superimposed on the VBUS output are subjected to a frequency conversion from the frequency f1 to the frequency f2 in the protocol conversion unit 18 through the output capacitor $C_O$ and the secondary-side controller 16, and are subjected to a coding modulation in the communication circuit 19, and then are input into the primary-side controller 30. Moreover, the control signals from the primary-side controller 30 are also subjected to the frequency conversion from the frequency f2 to the frequency f1 in the protocol conversion unit 18, and are also subjected to the coding modulation in the communication circuit 19, and then can be output to the VBUS output through the output capacitor $C_O$ and the secondary-side controller 16. Thus, a control output signal of the PD device 4 according to the first embodiment can be output to an external apparatus also through the VBUS output.

Configuration Example 1

Figure 11:
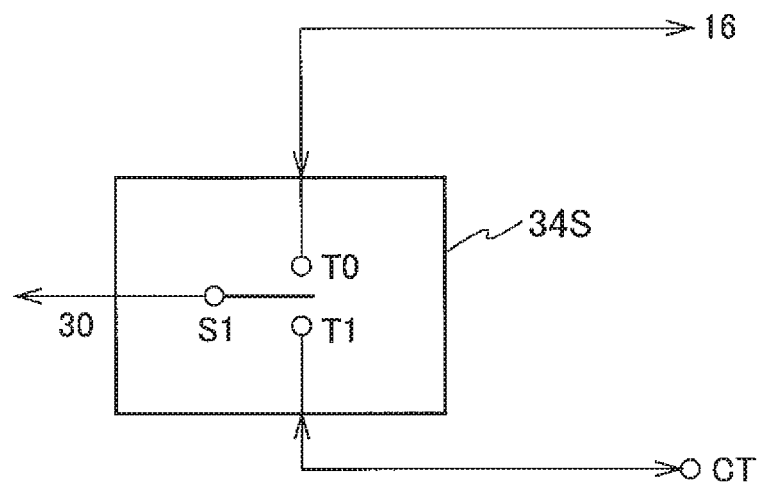
FIG. 11 is a schematic block configuration diagram showing the bidirectional insulation circuit (configuration example 1) applicable to the PD device according to the first embodiment.

FIG. 11 shows an example 1 of a schematic block configuration of a bidirectional insulation circuit 34S applicable to the PD device according to the first embodiment.

In the PD device according to the first embodiment, as shown in FIG. 11, the bidirectional insulation circuit 34S may include a switch (S1, T0, T1) connected to the primary-side controller 30, the switch (S1, T0, T1) configured to select (switch) between the secondary-side controller 16 and the control input supplied into the control terminal CT.

Configuration Example 2

Figure 12:
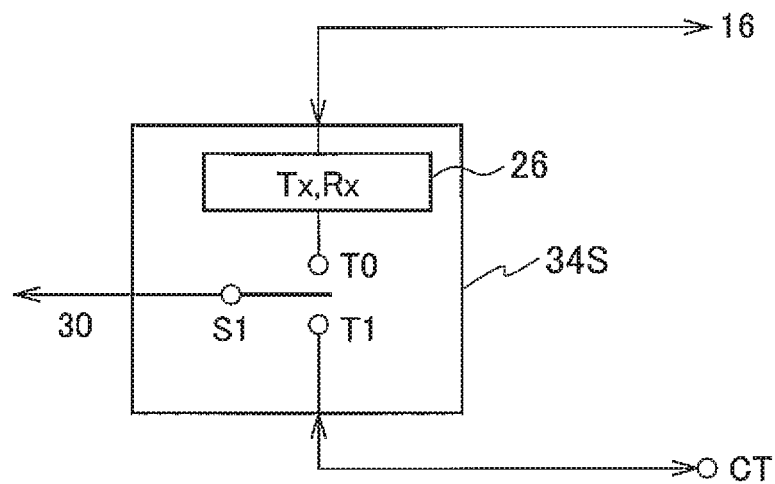
FIG. 12 is a schematic block configuration diagram showing the bidirectional insulation circuit (configuration example 2) applicable to the PD device according to the first embodiment.

FIG. 12 shows an example 2 of a schematic block configuration of a bidirectional insulation circuit 34S applicable to the PD device according to the first embodiment.

In the PD device according to the first embodiment, as shown in FIG. 12, the bidirectional insulation circuit 34S may include: a transceiver 26 connected to the secondary-side controller 16; and a switch (S1, T0, T1) connected to the primary-side controller 30, the switch (S1, T0, T1) configured to select (switch) between the transceiver 26 and the control input supplied into the control terminal CT.

Configuration Example 3

Figure 13:
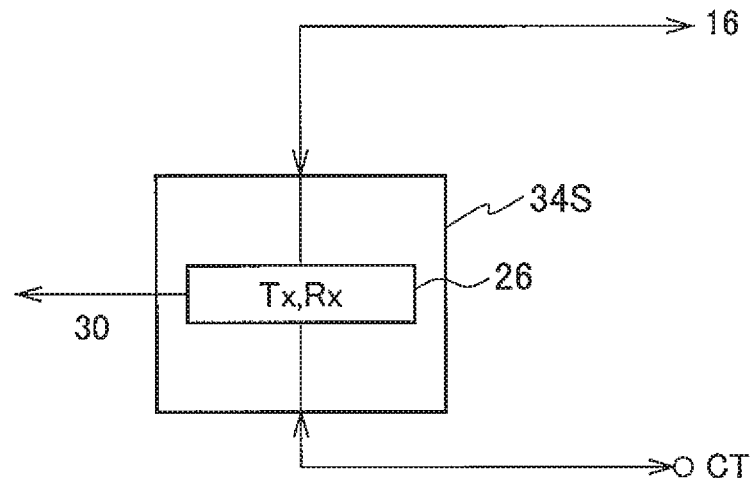
FIG. 13 is a schematic block configuration diagram showing the bidirectional insulation circuit (configuration example 3) applicable to the PD device according to the first embodiment.

FIG. 13 shows an example 3 of a schematic block configuration of a bidirectional insulation circuit 34S applicable to the PD device according to the first embodiment.

In the PD device according to the first embodiment, as shown in FIG. 13, the bidirectional insulation circuit 34S may include a transceiver 26 connected to the primary-side controller 30, the transceiver 26 configured to select (switch) between the secondary-side controller 16 and the control input supplied into the control terminal CT. In this context, the transceiver 26 can execute conversion and switching of transmission and reception signal between the secondary-side controller 16 and the control input supplied into the control terminal CT.

Configuration Example 4

Figure 14:
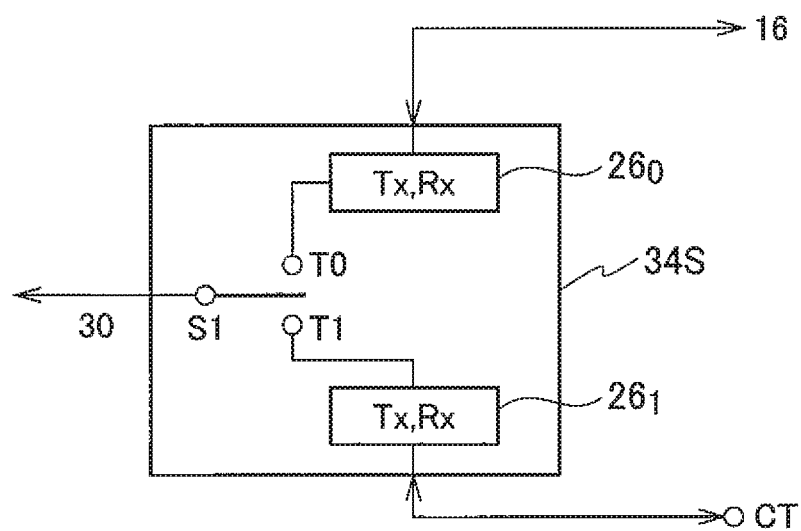
FIG. 14 is a schematic block configuration diagram showing the bidirectional insulation circuit (configuration example 4) applicable to the PD device according to the first embodiment.

FIG. 14 shows an example 4 of a schematic block configuration of a bidirectional insulation circuit 34S applicable to the PD device according to the first embodiment.

In the PD device according to the first embodiment, as shown in FIG. 14, the bidirectional insulation circuit 34S may include: a first transceiver $26_0$ connected to the secondary-side controller 16; a second transceiver $26_1$ connected to a control input supplied into the control terminal CT; and a switch (S1, T0, T1) connected to the primary-side controller 30, the switch (S1, T0, T1) configured to select (switch) between the first transceiver $26_0$ and the second transceiver $26_1$. In this context, the first transceiver $26_0$ and the second transceiver $26_1$ include the same configuration.

Configuration Example 5

Figure 15:
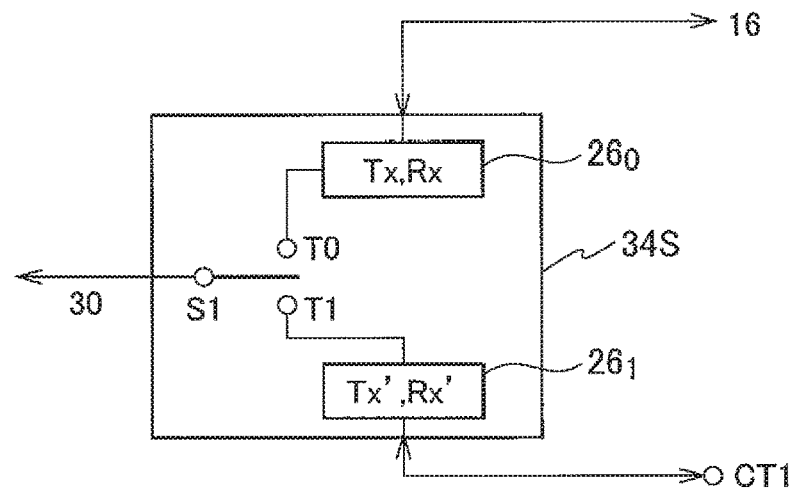
FIG. 15 is a schematic block configuration diagram showing the bidirectional insulation circuit (configuration example 5) applicable to the PD device according to the first embodiment.

FIG. 15 shows an example 5 of a schematic block configuration of a bidirectional insulation circuit 34S applicable to the PD device according to the first embodiment.

In the PD device according to the first embodiment, as shown in FIG. 15, the bidirectional insulation circuit 34S may include: a first transceiver $26_0$ connected to the secondary-side controller 16; a second transceiver $26_1$ connected to a control input supplied into the control terminal CT; and a switch (S1, T0, T1) connected to the primary-side controller 30, the switch (S1, T0, T1) configured to select (switch) between the first transceiver $26_0$ and the second transceiver $26_1$. In this case, the first transceiver $26_0$ and the second transceiver $26_1$ include configurations different from each other.

Configuration Example 6

Figure 16:
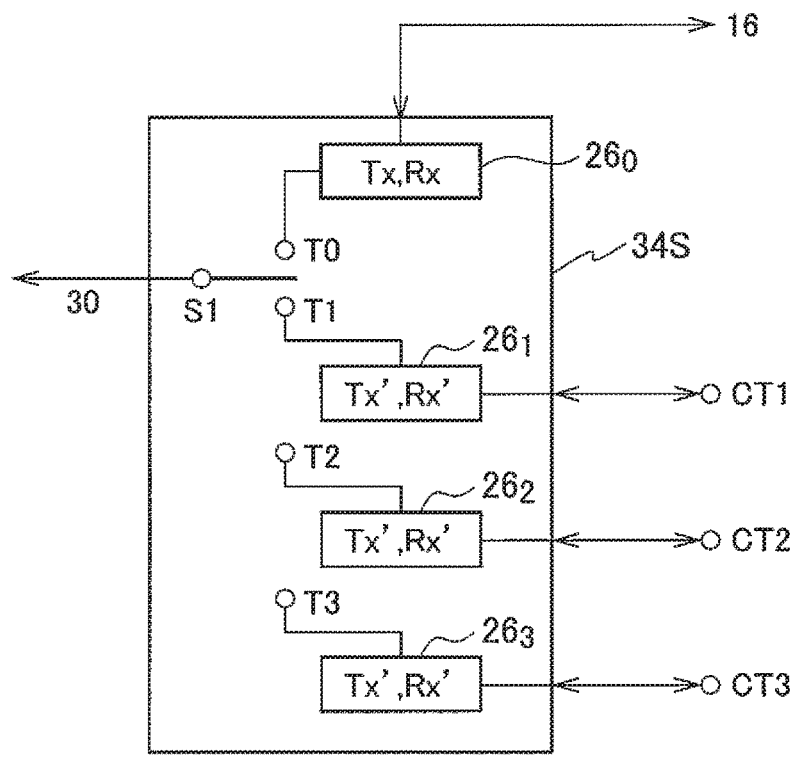
FIG. 16 is a schematic block configuration diagram showing the bidirectional insulation circuit (configuration example 6) applicable to the PD device according to the first embodiment.

FIG. 16 shows an example 6 of a schematic block configuration of a bidirectional insulation circuit 34S applicable to the PD device according to the first embodiment.

In the PD device according to the first embodiment, as shown in FIG. 16, the bidirectional insulation circuit 34S may include: a first transceiver $26_0$ connected to the secondary-side controller; a plurality of second transceivers $26_1$, $26_2$, and $26_3$ respectively connected to control inputs respectively supplied into a plurality of control terminals CT1, CT2, and CT3; and A switch (S1, T0, T1) controlled by the primary-side controller 30, the switch (S1, T0, T1) configured to select between the first transceiver $26_0$ and the plurality of the second transceivers $26_1$, $26_2$, and $26_3$. In this case, the plurality of the second transceivers $26_1$, $26_2$, and $26_3$ may include the same configuration, and the first transceiver $26_0$ and the second transceivers $26_1$, $26_2$, and $26_3$ may include configurations different from each other.

Configuration Example 7

Figure 17:
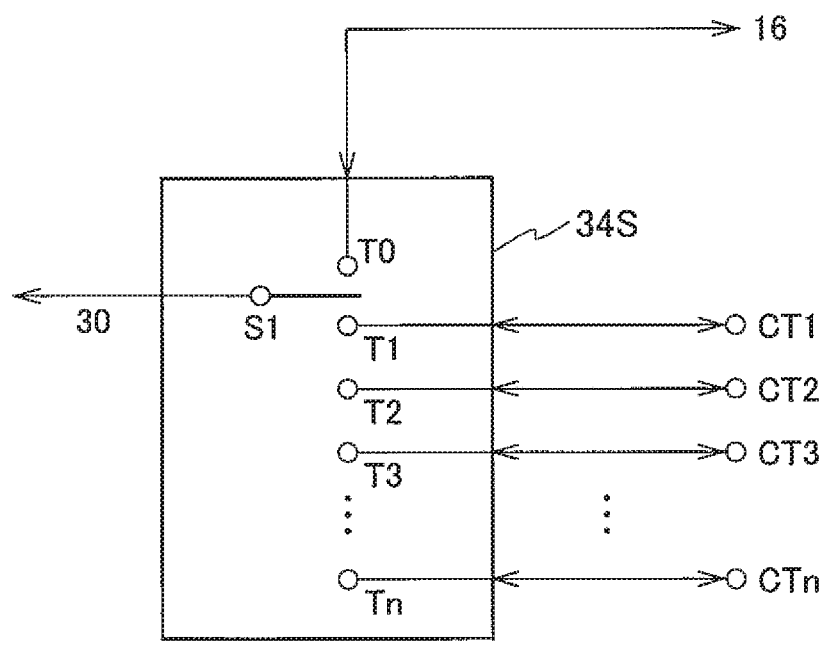
FIG. 17 is a schematic block configuration diagram showing the bidirectional insulation circuit (configuration example 7) applicable to the PD device according to the first embodiment.

FIG. 17 shows an example 7 of a schematic block configuration of a bidirectional insulation circuit 34S applicable to the PD device according to the first embodiment.

In the PD device according to the first embodiment, as shown in FIG. 17, the bidirectional insulation circuit 34S may include a switch (S1, T0, T1, T2, T3, . . . , Tn) connected to the primary-side controller 30, the switch (S1, T0, T1, T2, T3, . . . , Tn) configured to select between the secondary-side controller 16 and a plurality of control inputs supplied into a plurality of control terminals CT1, CT2, CT3, . . . , CTn.

Configuration Example 8

Figure 18:
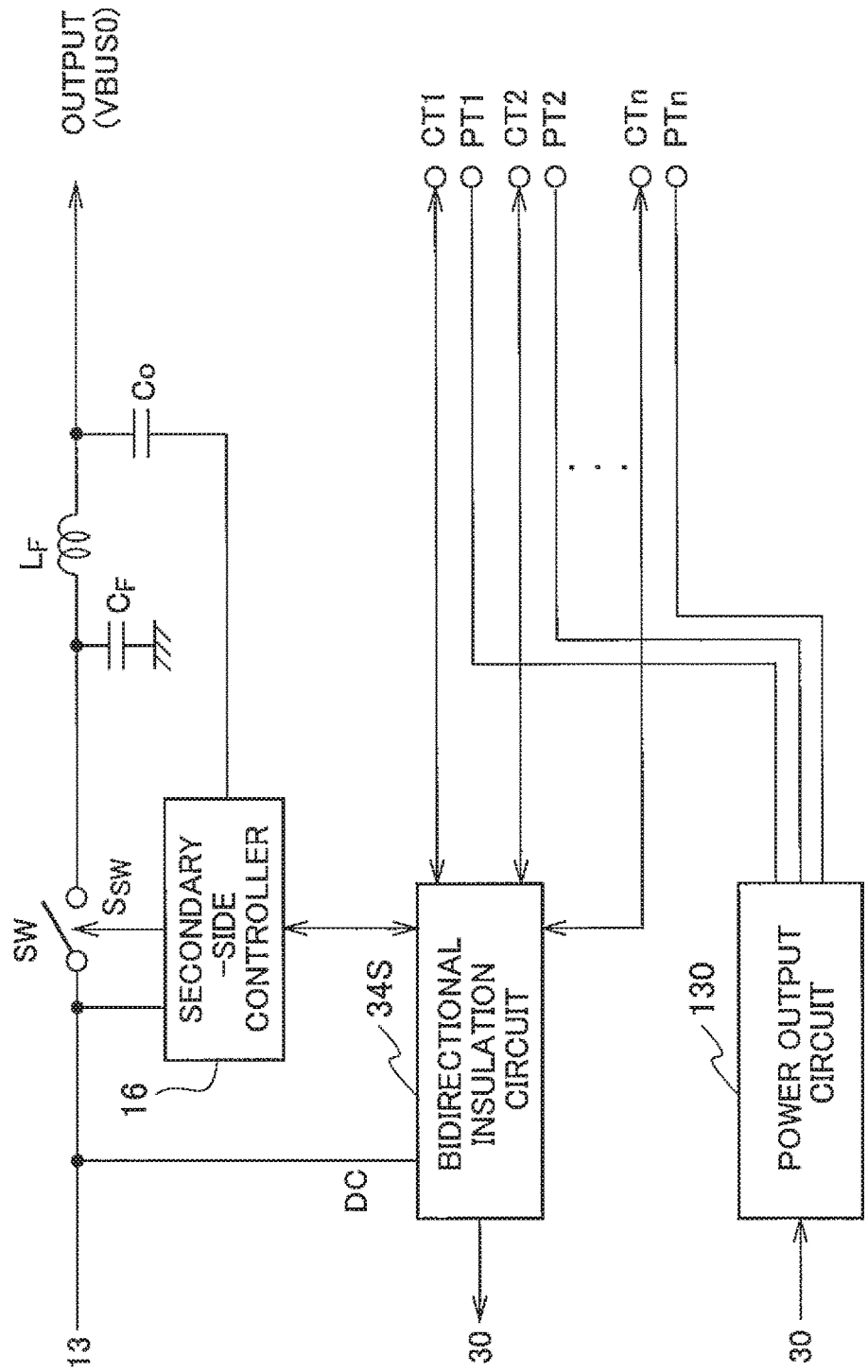
FIG. 18 is a schematic block configuration diagram showing a bidirectional insulation circuit and a power output circuit, both of which are applicable to the PD device according to the first embodiment.

FIG. 18 shows a schematic block configuration of the bidirectional insulation circuit 34S and a power output circuit 130, applicable to the PD device according to the first embodiment.

Also in the examples 1 to 7 of the schematic block configuration of the bidirectional insulation circuit 34S shown in FIG. 11 to FIG. 17, there may included a power output circuit 130 connected to the primary-side controller 30, the power output circuit 130 configured to supply output voltages to a plurality of VBUS outputs disposed in pairs with the plurality of the control inputs.

More specifically, as shown in FIG. 18, there are included a plurality of VBUS power output terminals PT1, PT2, . . . , PTn disposed in pairs with a plurality of control terminals CT1, CT2, . . . , CT3, and the power output circuit 130 can supply the output voltages through the plurality of the VBUS power output terminals PT1, PT2, . . . , PTn.

Figure 19:
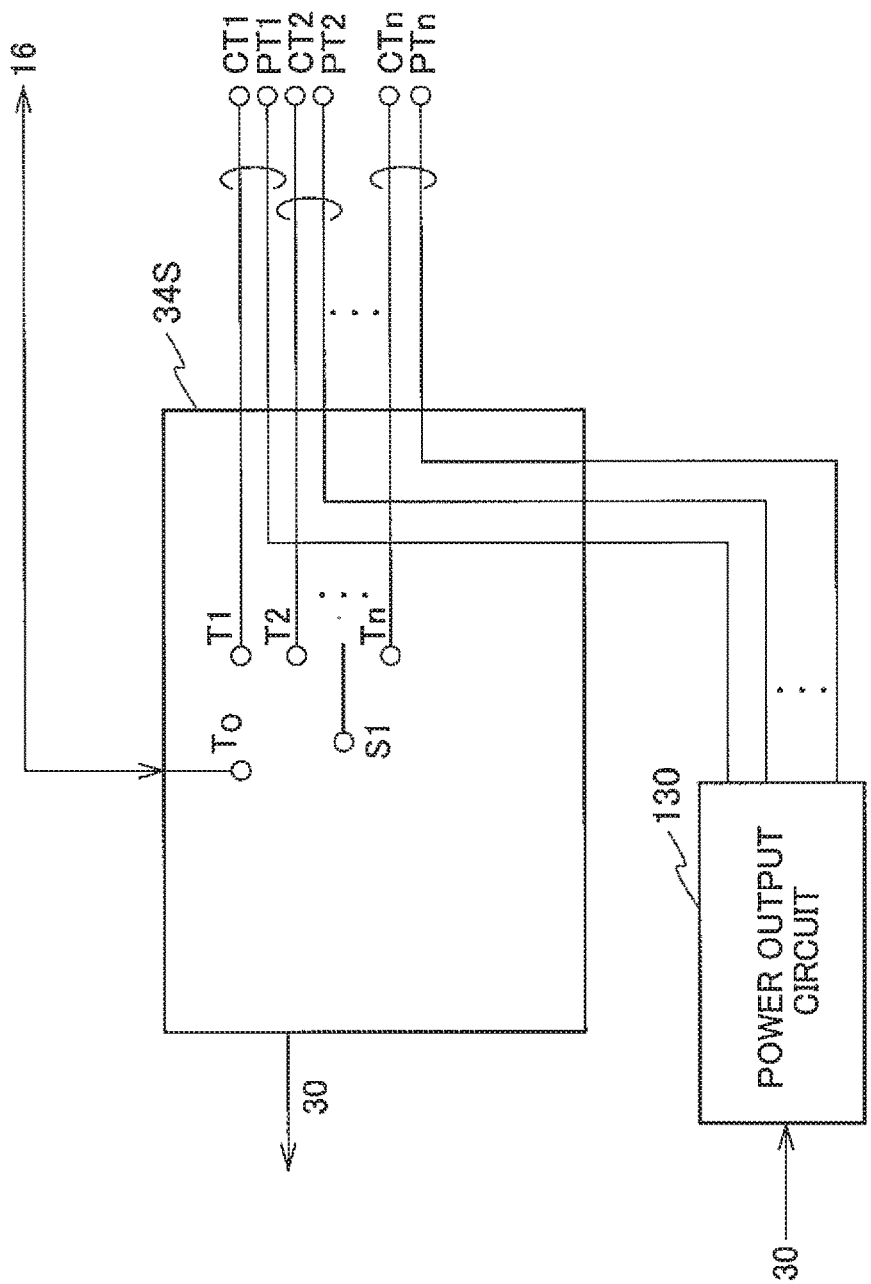
FIG. 19 is a schematic block configuration diagram showing the bidirectional insulation circuit (configuration example 8) applicable to the PD device according to the first embodiment.

FIG. 19 shows an example 8 of a schematic block configuration of a bidirectional insulation circuit 34S applicable to the PD device according to the first embodiment.

As shown in FIG. 19, the PD device 4 according to the first embodiment may include a power output circuit 130 connected to the primary-side controller 30, the power output circuit 130 configured to supply output voltages to a plurality of VBUS outputs disposed in pairs with the plurality of the control inputs; and the bidirectional insulation circuit 34S may include a switch (S1, T0, T1, T2, T3, . . . , Tn) configured to select a plurality of control inputs.

Moreover, as shown in FIG. 19, the plurality of the control inputs are respectively coupled to a plurality of control terminals CT1, CT2, . . . , CTn. Moreover, the respective control output signals of the PD device 4 according to the first embodiment can be output to external apparatuses through the plurality of the respective control terminals CT1, CT2, . . . , CTn.

Moreover, as shown in FIG. 19, the power output circuit 130 can supply the output voltages respectively through the plurality of the VBUS power output terminals PT1, PT2, . . . , PTn.

Configuration Example 9

Figure 20:
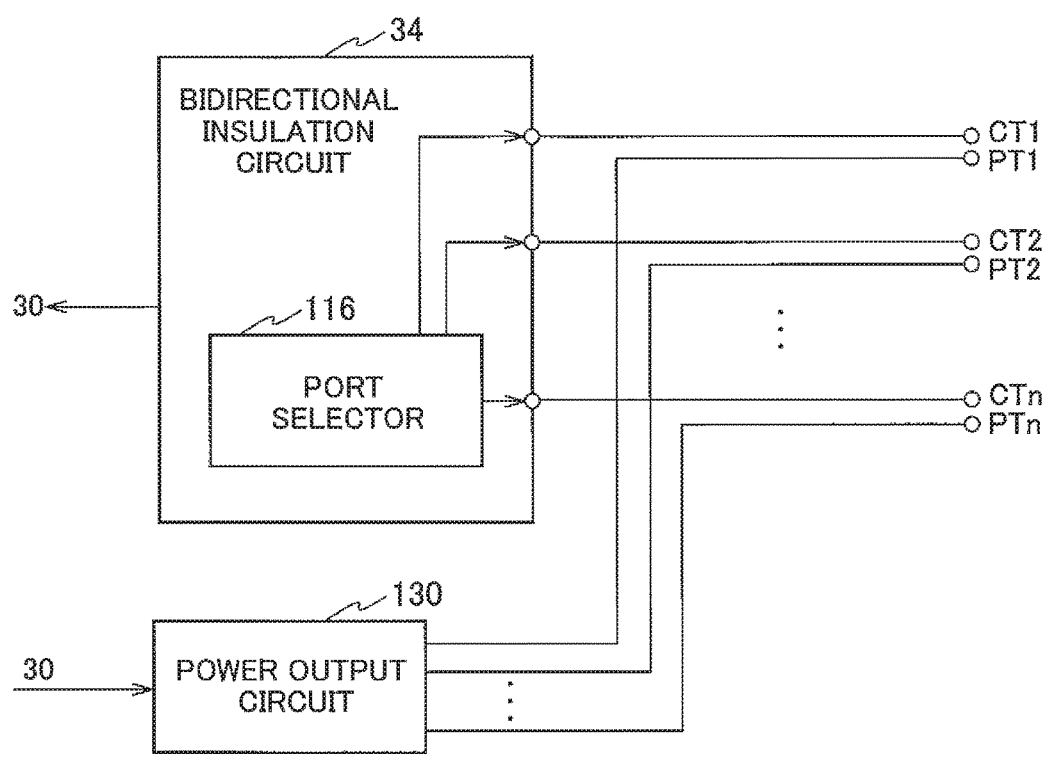
FIG. 20 is a schematic block configuration diagram showing the bidirectional insulation circuit and the power output circuit (configuration example 9), both of which are applicable to the PD device according to the first embodiment.

FIG. 20 shows an example 9 of a schematic block configuration of a bidirectional insulation circuit 34 applicable to the PD device according to the first embodiment.

As shown in FIG. 20, the PD device 4 according to the first embodiment may include a power output circuit 130 connected to the primary-side controller 30, the power output circuit 130 configured to supply output voltages to a plurality of VBUS outputs disposed in pairs with the plurality of the control inputs; and the bidirectional insulation circuit 34 may include a port selector 116 configured to select the plurality of the control inputs.

Moreover, as shown in FIG. 20, the plurality of the control inputs are respectively coupled to a plurality of control terminals CT1, CT2, . . . , CTn. Moreover, the respective control output signals of the PD device 4 according to the first embodiment can be output to external apparatuses through the plurality of the respective control terminals CT1, CT2, . . . , CTn.

Moreover, as shown in FIG. 20, the power output circuit 130 can supply the output voltages respectively through the plurality of the VBUS power output terminals PT1, PT2, . . . , PTn.

Figure 21A:
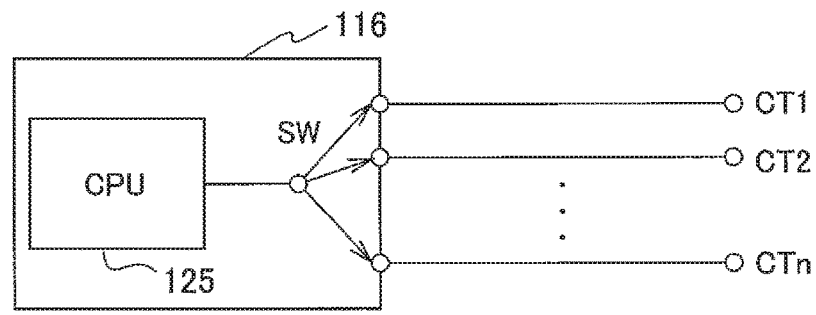
FIG. 21A shows a configuration example of a port selector shown in FIG. 20.
Figure 21B:
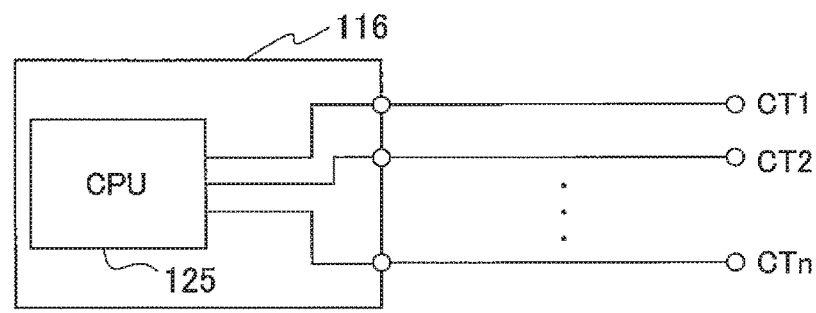
FIG. 21B shows another configuration example of the port selector shown in FIG. 20.

Moreover, FIG. 21A shows a configuration example of the port selector 116, and FIG. 21B shows another configuration example of the port selector 116.

As shown in FIG. 21A, the port selector 116 may include: a CPU 125; and a switch SW connected to the CPU 125, the switch SW configured to select the plurality of the control terminals CT1, CT2, . . . , CTn.

Moreover, as shown in FIG. 21B, the port selector 116 may include a CPU 125 connected to the plurality of the control terminals CT1, CT2, . . . , CTn. More specifically, the CPU 125 itself may include a switch function configured to select the plurality of the control terminals CT1, CT2, . . . , CTn, in the example shown in FIG. 21B.

Configuration Example 10

Figure 22:
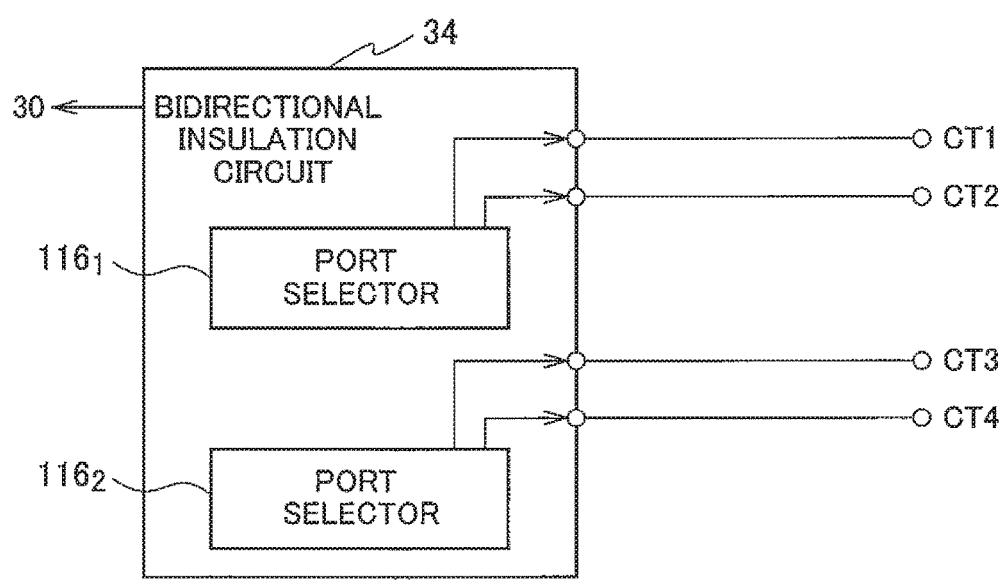
FIG. 22 is a schematic block configuration diagram showing the bidirectional insulation circuit (configuration example 10) applicable to the PD device according to the first embodiment.

FIG. 22 shows an example 10 of a schematic block configuration of a bidirectional insulation circuit 34 applicable to the PD device according to the first embodiment.

In the PD device according to the first embodiment, the bidirectional insulation circuit 34 may include a plurality of port selectors $116_1$ and $116_2$ as shown in FIG. 22.

As shown in FIG. 22, the control input terminals CT1 and CT2 are connected to the port selector $116_1$, and the control input terminals CT3 and CT4 are connected to the port selector $116_2$.

In the same manner as the configuration example 8 in FIG. 19 or the configuration example 9 in FIG. 20, the PD device 4 according to the first embodiment may include a power output circuit 130 connected to the primary-side controller 30, the power output circuit 130 configured to supply output voltages to a plurality of VBUS outputs disposed in pairs with the plurality of the control inputs.

In the same manner as the configuration example 9 shown in FIGS. 21A and 21B, each of the port selectors $116_1$ and $116_2$ may include a CPU and a switch connected to the CPU, the switch configured to select the plurality of the control terminals. Alternatively, each of the port selectors $116_1$ and $116_2$ may include a CPU connected to the plurality of the control terminals.

Modified Example 5

Figure 23:
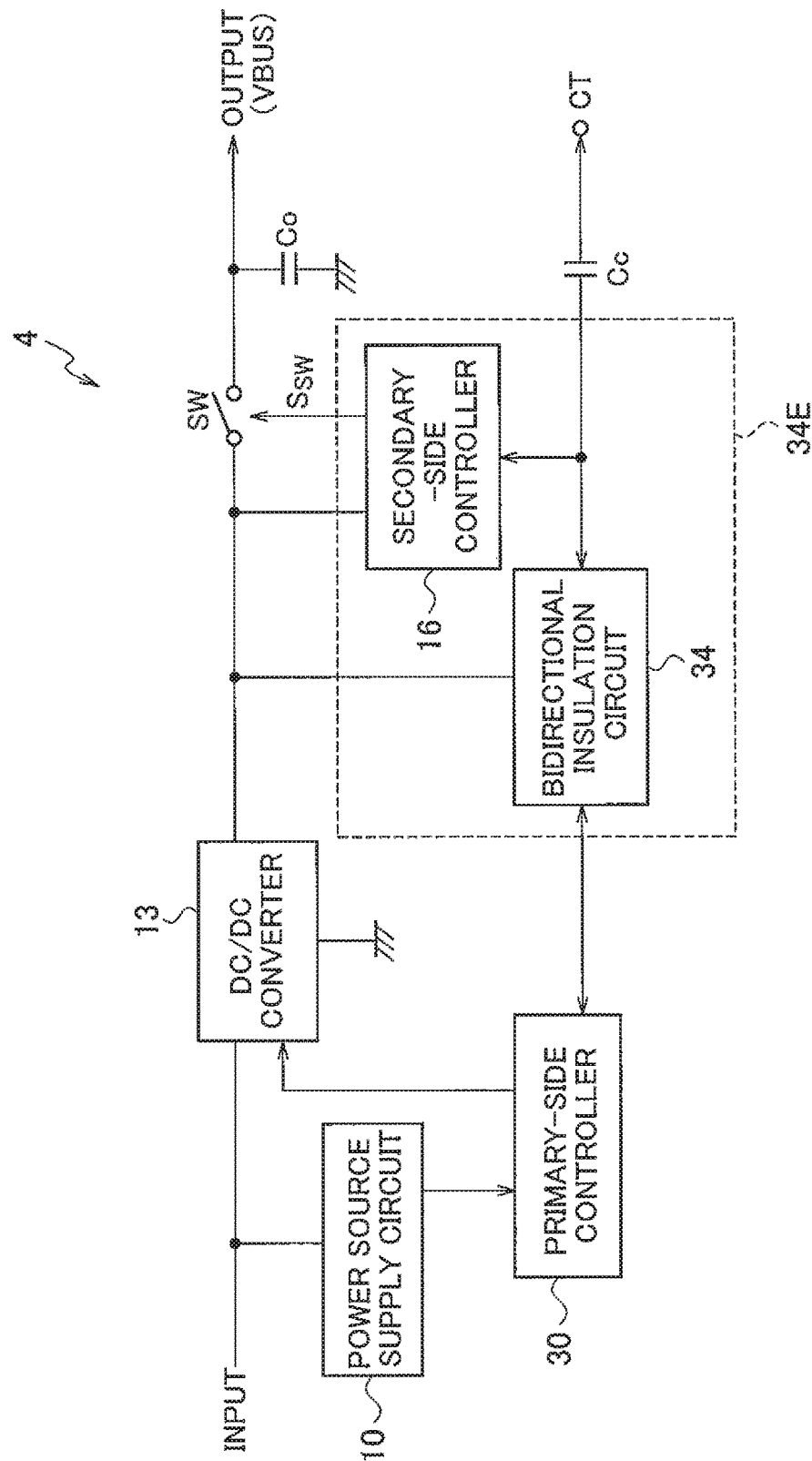
FIG. 23 is a schematic circuit block configuration diagram showing a PD device according to a modified example 5 of the first embodiment.

A PD device 4 according to a modified example 5 of the first embodiment may include a bidirectional insulation circuit 34E in which the secondary-side controller 16 is contained, as shown in FIG. 23. More specifically, as shown in FIG. 23, the bidirectional insulation circuit 34 and the secondary-side controller 16 may be formed so as to be integrated to each other. Other configurations are the same as those of the first embodiment.

Modified Example 6

Figure 24:
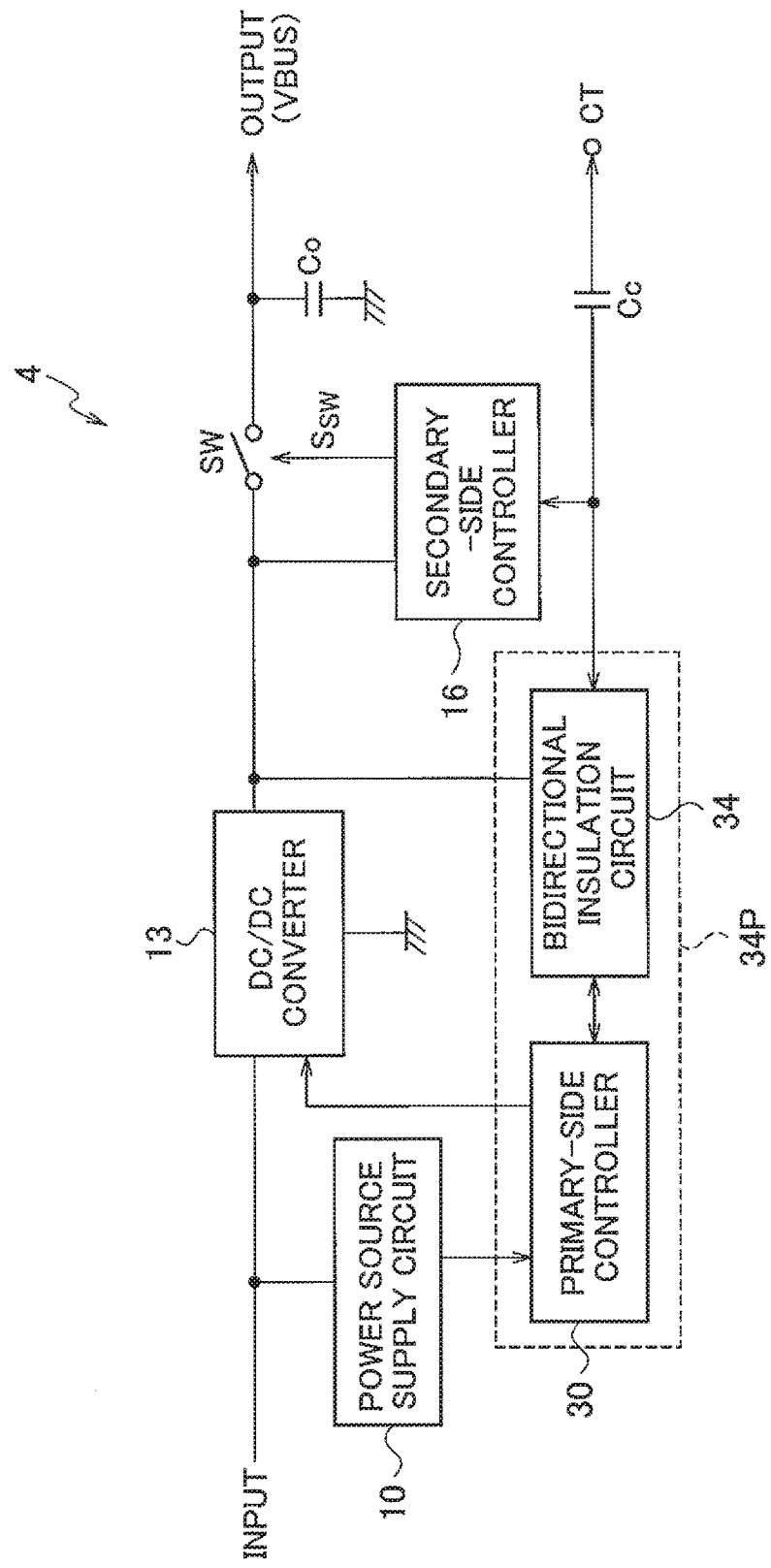
FIG. 24 is a schematic circuit block configuration diagram showing a PD device according to a modified example 6 of the first embodiment.

Moreover, a PD device 4 according to a modified example 6 of the first embodiment may include a bidirectional insulation circuit 34P in which the primary-side controller 30 is contained, as shown in FIG. 24. More specifically, as shown in FIG. 24, the primary-side controller 30 and the bidirectional insulation circuit 34 may be formed so as to be integrated to each other. Other configurations are the same as those of the first embodiment.

Modified Example 7

Figure 25:
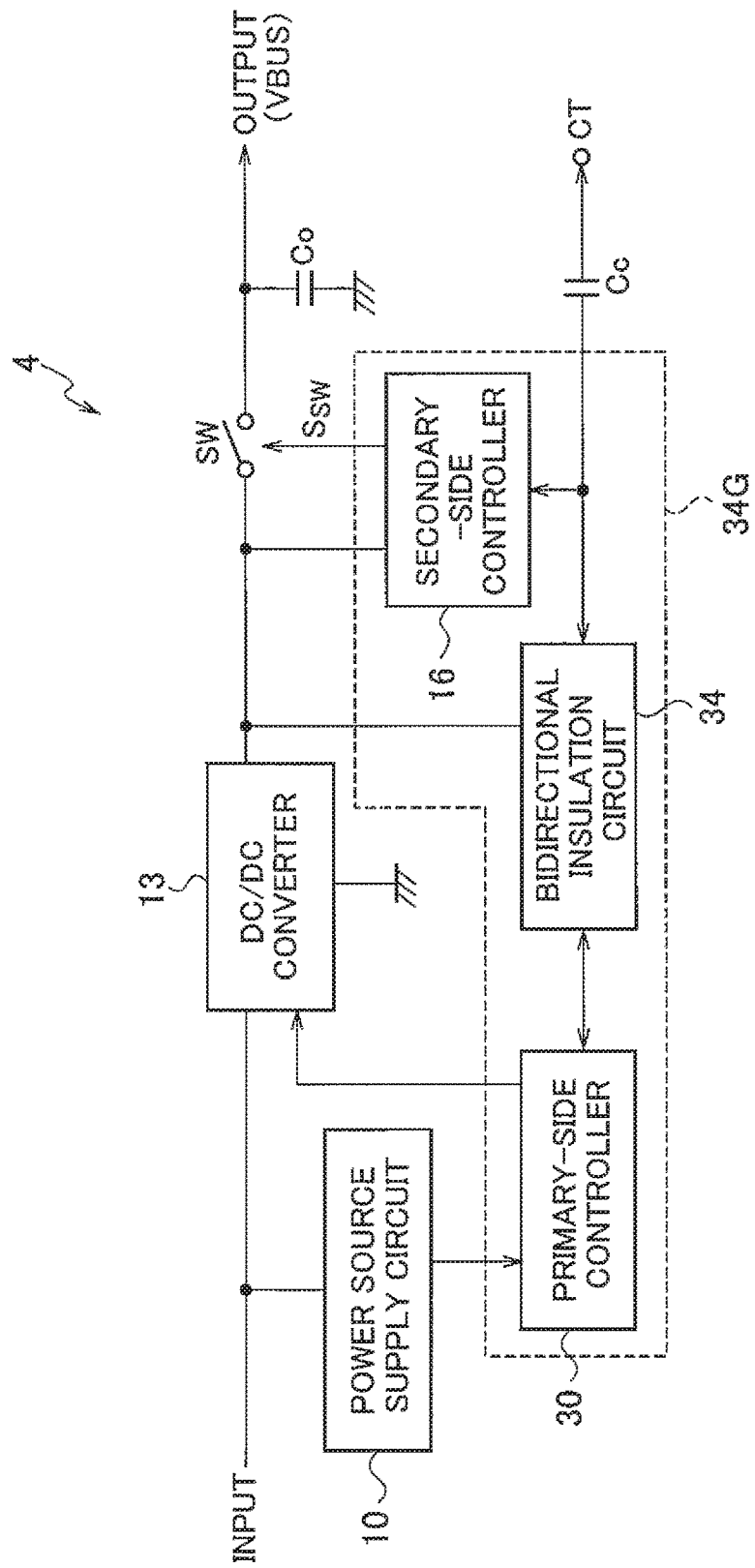
FIG. 25 is a schematic circuit block configuration diagram showing a PD device according to a modified example 7 of the first embodiment.

Moreover, a PD device 4 according to a modified example 7 of the first embodiment may include a bidirectional insulation circuit 34G in which the secondary-side controller 16 the primary-side controller 30 is contained, as shown in FIG. 25. More specifically, as shown in FIG. 25, the secondary-side controller 16, the primary-side controller 30, and the bidirectional insulation circuit 34 may be formed so as to be integrated to each other. Other configurations are the same as those of the first embodiment.

According to the first embodiment and its modified examples, there can be provided the PD device capable of reducing the mounting space, and thereby capable of achieving miniaturization and cost reduction and capable of controlling the output voltage value and the available output current value (MAX value).

Second Embodiment

Figure 26:
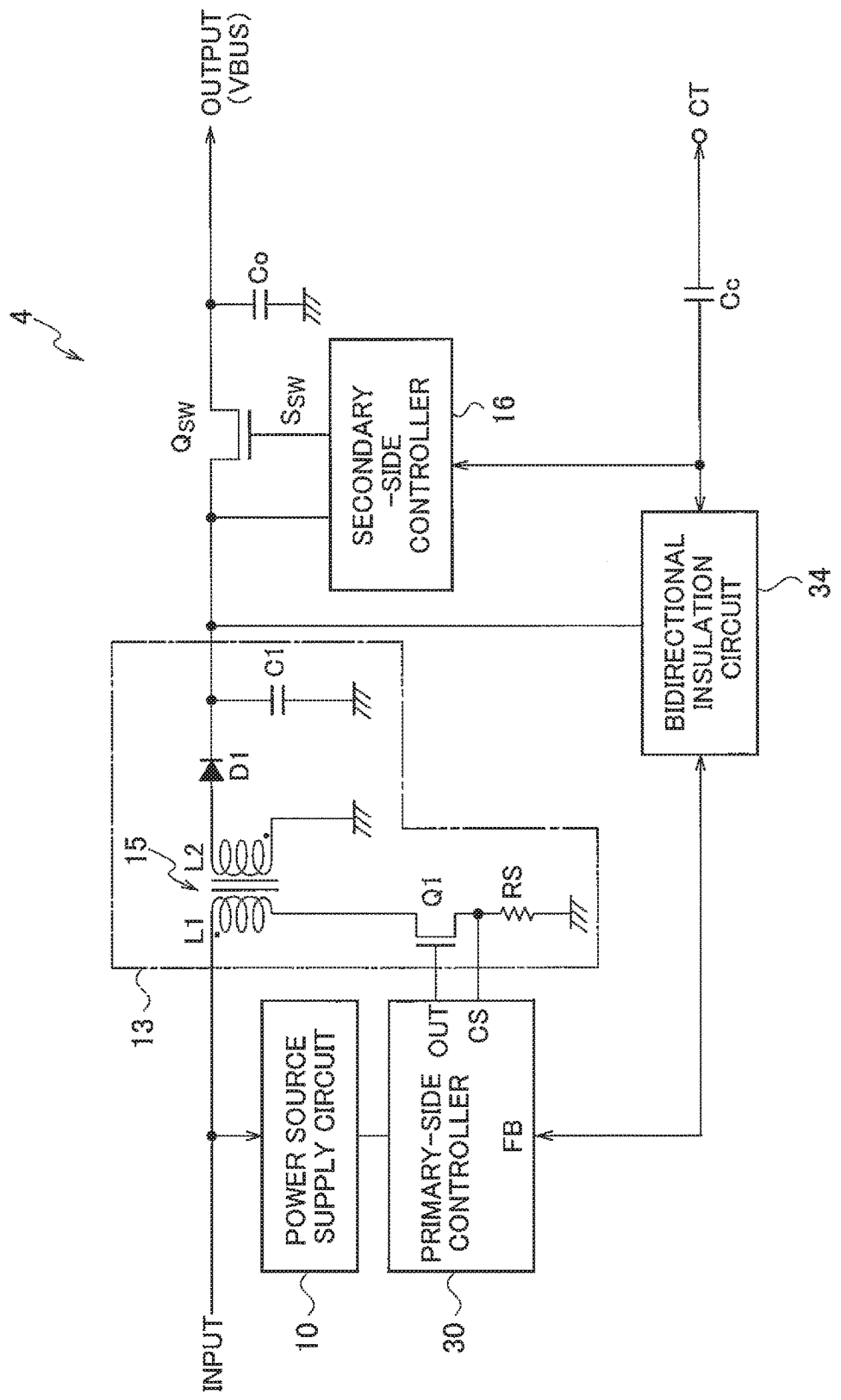
FIG. 26 is a schematic circuit block configuration diagram showing a PD device according to a second embodiment.

FIG. 26 shows a PD device 4 according to a second embodiment.

In the PD device 4 according to the second embodiment, the DC/DC converter 13 includes a diode rectification type converter, as shown in FIG. 26.

In the PD device 4 according to the second embodiment, as shown in FIG. 26, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the VBUS output; and a first capacitor C1 connected between the VBUS output and the ground potential.

As shown in FIG. 26, a PD device 4 according to the second embodiment includes: a DC/DC converter 13 disposed between an input and a VBUS output; a primary-side controller 30 configured to control an input current of the DC/DC converter 13; and a bidirectional insulation circuit 34 coupled to a control input, the bidirectional insulation circuit 34 configured to receive a control input signal of the control input, and then feed back the received control input signal to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 26, the PD device 4 according to the second embodiment may include: an MOS switch $Q_{SW}$ disposed between the output of the DC/DC converter 13 and the VBUS output, the MOS switch $Q_{SW}$ configured to interrupt an output of the DC/DC converter 13; and a secondary-side controller 16 connected to the bidirectional insulation circuit 34, the secondary-side controller 16 configured to execute on/off control of the MOS switch $Q_{SW}$.

Moreover, as shown in FIG. 26, the PD device 4 according to the second embodiment may include a control terminal CT, and the control input may be coupled to the control terminal CT. Moreover, a control output signal of the PD device 4 according to the second embodiment can be output to an external apparatus through the control terminal CT. Other configurations are the same as those of the first embodiment.

According to the second embodiment, there can be provided the PD device capable of reducing the mounting space, and thereby capable of achieving miniaturization and cost reduction and capable of controlling the output voltage value and the available output current value (MAX value).

Third Embodiment

Figure 27:
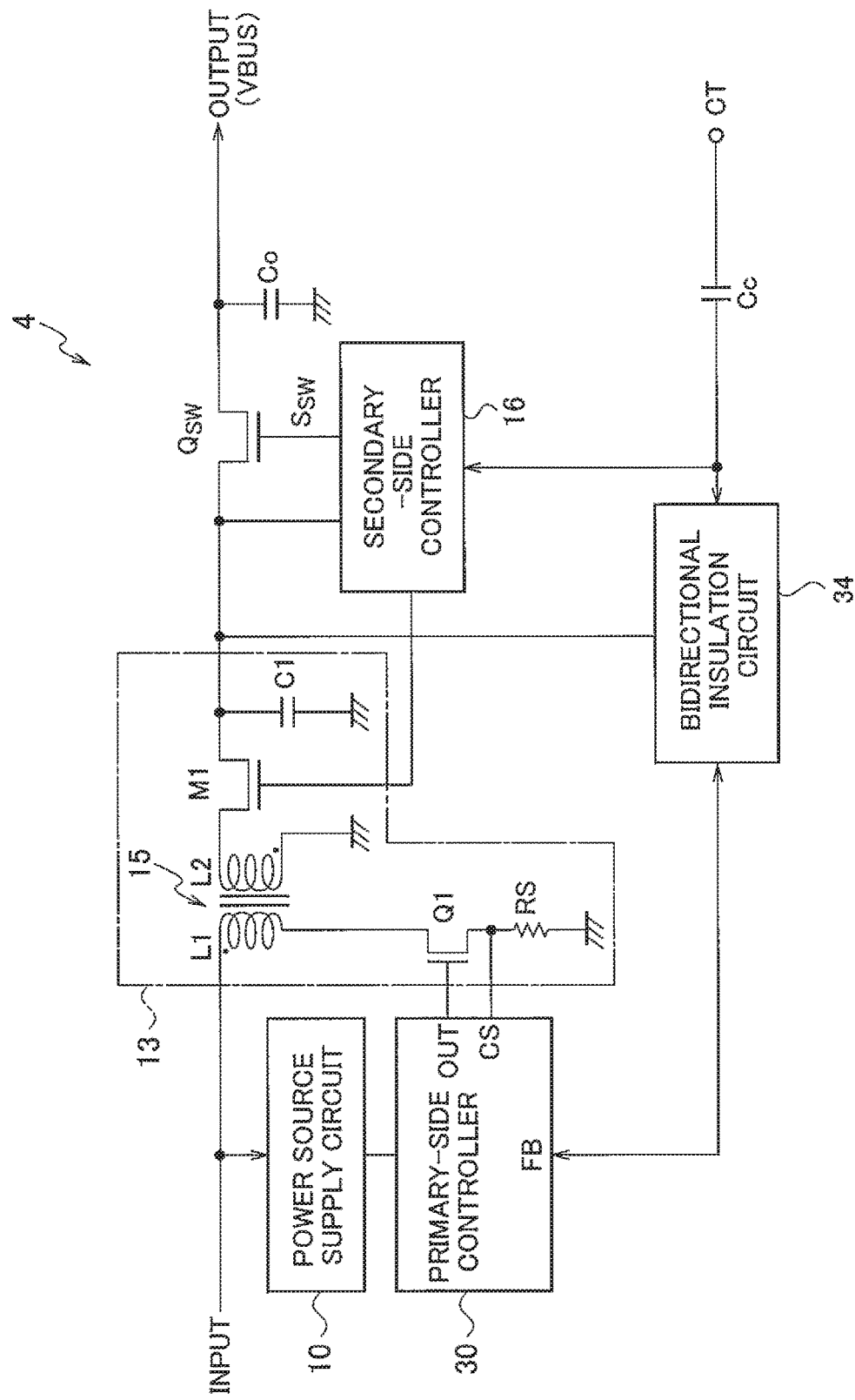
FIG. 27 is a schematic circuit block configuration diagram showing a PD device according to a third embodiment.

FIG. 27 shows a PD device 4 according to a third embodiment.

In the PD device 4 according to the third embodiment, DC/DC converter 13 includes a synchronous rectification type converter, as shown in FIG. 27.

In the PD device 4 according to the third embodiment, as shown in FIG. 27, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential.

As shown in FIG. 27, the PD device 4 according to the third embodiment includes: a DC/DC converter 13 disposed between an input and a VBUS output; a primary-side controller 30 configured to control an input current of the DC/DC converter 13; and a bidirectional insulation circuit 34 coupled to a control input, the bidirectional insulation circuit 34 configured to executed a signal conversion of a control input signal of the control input, and configured to feed back the control input signal subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 27, the PD device 4 according to the third embodiment may include: an MOS switch $Q_{SW}$ disposed between the output of the DC/DC converter 13 and the VBUS output, the MOS switch $Q_{SW}$ configured to interrupt an output of the DC/DC converter 13; and a secondary-side controller 16 connected to the bidirectional insulation circuit 34, the secondary-side controller 16 configured to execute on/off control of the MOS switch $Q_{SW}$.

Moreover, as shown in FIG. 27, the PD device 4 according to the third embodiment may include a control terminal CT, and the control input may be coupled to the control terminal CT. Moreover, a control output signal of the PD device 4 according to the third embodiment can be output to an external apparatus through the control terminal CT. Other configurations are the same as those of the first embodiment.

In the PD device 4 according to the third embodiment, since the synchronous rectification method is adopted for the DC/DC converter, instead of the diode rectification system, DC/DC power conversion efficiency can be increased, compared with the second embodiment adapting the diode rectification system.

According to the third embodiment, there can be provided the PD device capable of reducing the mounting space, and thereby capable of achieving miniaturization and cost reduction and capable of controlling the output voltage value and the available output current value (MAX value).

Fourth Embodiment

Figure 28:
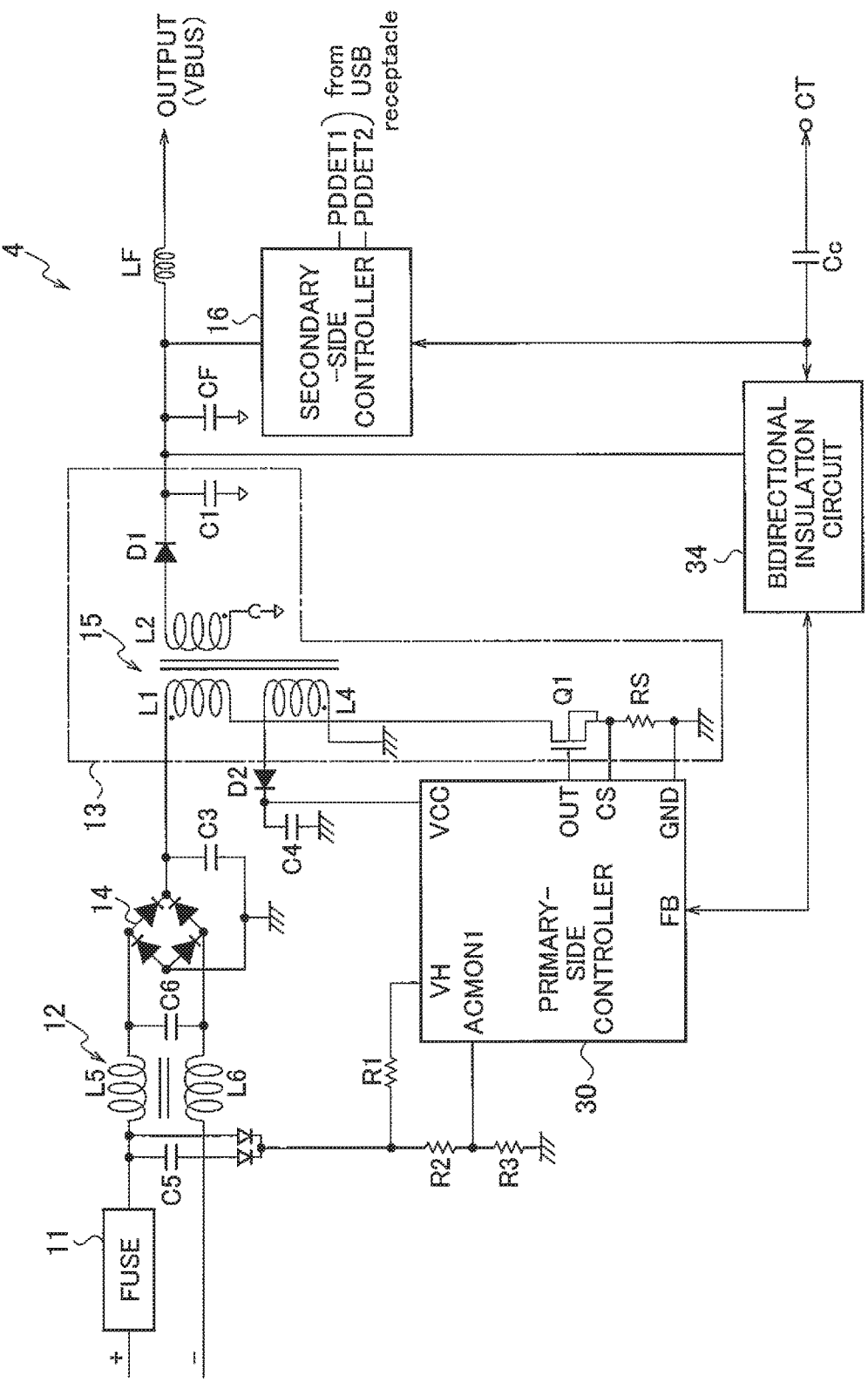
FIG. 28 is a schematic circuit block configuration diagram showing a PD device according to a fourth embodiment.

As shown in FIG. 28, a PD device 4 according to a fourth embodiment includes an AC/DC converter connected to an AC input, the AC/DC converter 300 composed by including a fuse 11, a choke coil 12, a diode rectification bridge 14, capacitors C5, C6 and C3, etc., instead of the power source supply circuit 10 as in the first embodiment.

Moreover, as shown in FIG. 28, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 28, the PD device 4 according to the fourth embodiment includes: a DC/DC converter 13 disposed between an input (DC output of the AC/DC converter) and a VBUS output; a primary-side controller 30 configured to control an input current of the DC/DC converter 13; and a bidirectional insulation circuit 34 coupled to a control input, the bidirectional insulation circuit 34 configured to executed a signal conversion of a control input signal of the control input, and configured to feed back the control input signal subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 28, the PD device 4 according to the fourth embodiment may include a secondary-side controller 16 disposed between the bidirectional insulation circuit 34 and the output of the DC/DC converter 13.

Moreover, as shown in FIG. 28, there may be included a control terminal CT, and the control input may be coupled to the control terminal CT. Moreover, a control output signal of the PD device 4 according to the fourth embodiment can be output to an external apparatus through the control terminal CT.

Although PDDET1 and PDDET2 from USB receptacle are described on the secondary-side controller 16, the PDDET1 and PDDET2 may be omitted.

In the PD device 4 according to the fourth embodiment, the DC/DC converter 13 includes a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential.

According to the fourth embodiment, there can be provided the PD device capable of achieving miniaturization and cost reduction and capable of controlling the output voltage value and the available output current value (MAX value).

Fifth Embodiment

Figure 29:
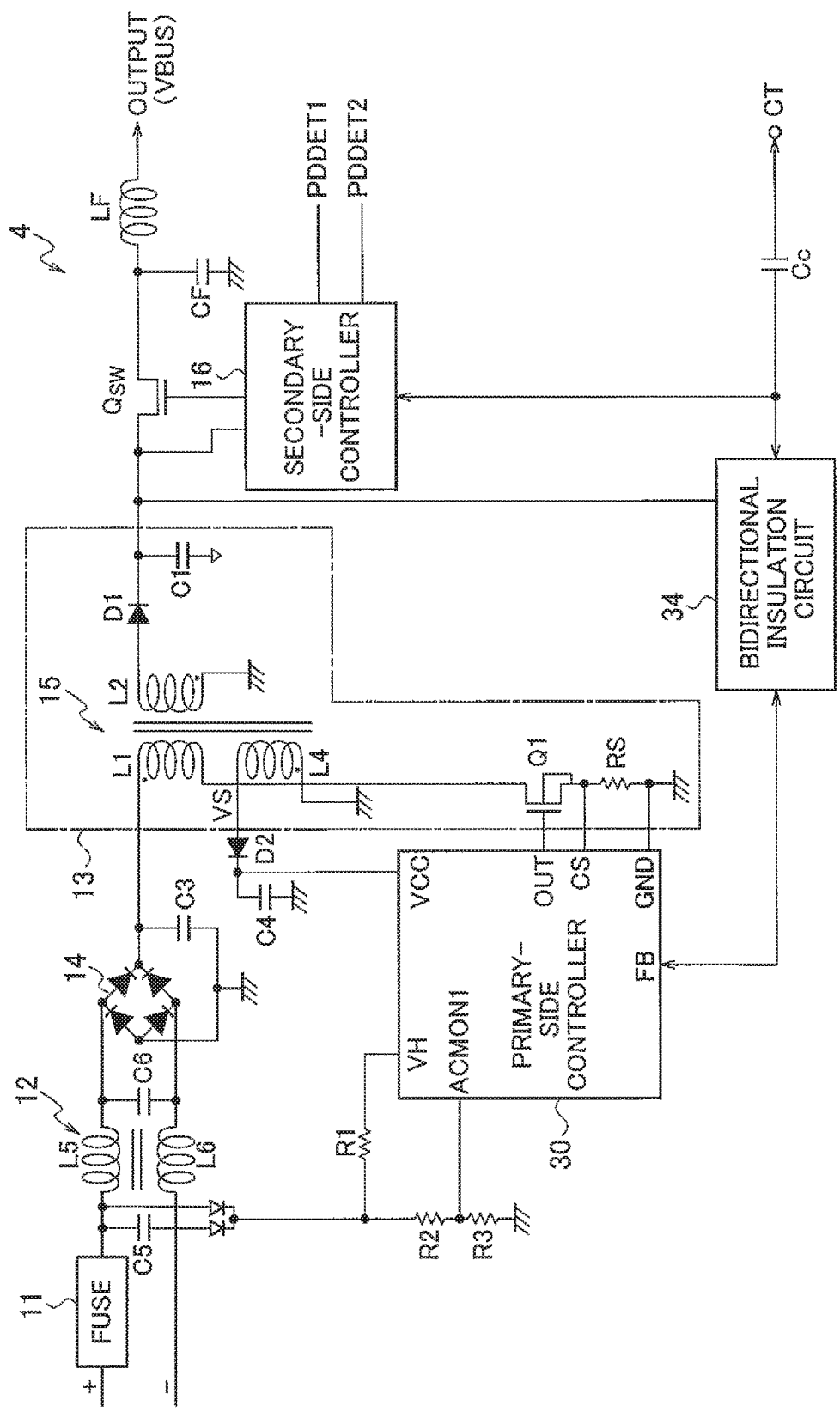
FIG. 29 is a schematic circuit block configuration diagram showing a PD device according to a fifth embodiment.

As shown in FIG. 29, a PD device 4 according to the fifth embodiment includes an AC/DC converter connected to an AC input, the AC/DC converter 300 composed by including a fuse 11, a choke coil 12, a diode rectification bridge 14, capacitors C5, C6 and C3, etc., instead of the power source supply circuit 10 as in the first embodiment.

Moreover, as shown in FIG. 29, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 29, the PD device 4 according to the fifth embodiment includes: a DC/DC converter 13 disposed between an input (DC output of the AC/DC converter) and a VBUS output; a primary-side controller 30 configured to control an input current of the DC/DC converter 13; and a bidirectional insulation circuit 34 coupled to a control input, the bidirectional insulation circuit 34 configured to executed a signal conversion of a control input signal of the control input, and configured to feed back the control input signal subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 29, the PD device 4 according to the fifth embodiment may include: an MOS switch $Q_{SW}$ disposed between the output of the DC/DC converter 13 and the VBUS output, the MOS switch $Q_{SW}$ configured to interrupt an output of the DC/DC converter 13; and a secondary-side controller 16 connected to the bidirectional insulation circuit 34, the secondary-side controller 16 configured to execute on/off control of the MOS switch $Q_{SW}$.

Moreover, as shown in FIG. 29, there may be included a control terminal CT, and the control input may be coupled to the control terminal CT. Moreover, a control output signal of the PD device 4 according to the fifth embodiment can be output to an external apparatus through the control terminal CT.

Although PDDET1 and PDDET2 from USB receptacle are described on the secondary-side controller 16, the PDDET1 and PDDET2 may be omitted.

In the PD device 4 according to the fifth embodiment, the DC/DC converter 13 includes a diode rectification type converter. More specifically, the DC/DC converter 13 includes: a transformer 15; a first MOS transistor Q1 and a current sensing resistor RS each connected in series between the primary-side inductance L1 of the transformer 15 and ground potential; a diode D1 connected between the secondary-side inductance L2 of the transformer 15 and the output; and a first capacitor C1 connected between the output and the ground potential. Other configurations are the same as those of the second embodiment.

According to the fifth embodiment, there can be provided the PD device capable of achieving miniaturization and cost reduction and capable of controlling the output voltage value and the available output current value (MAX value).

Sixth Embodiment

Figure 30:
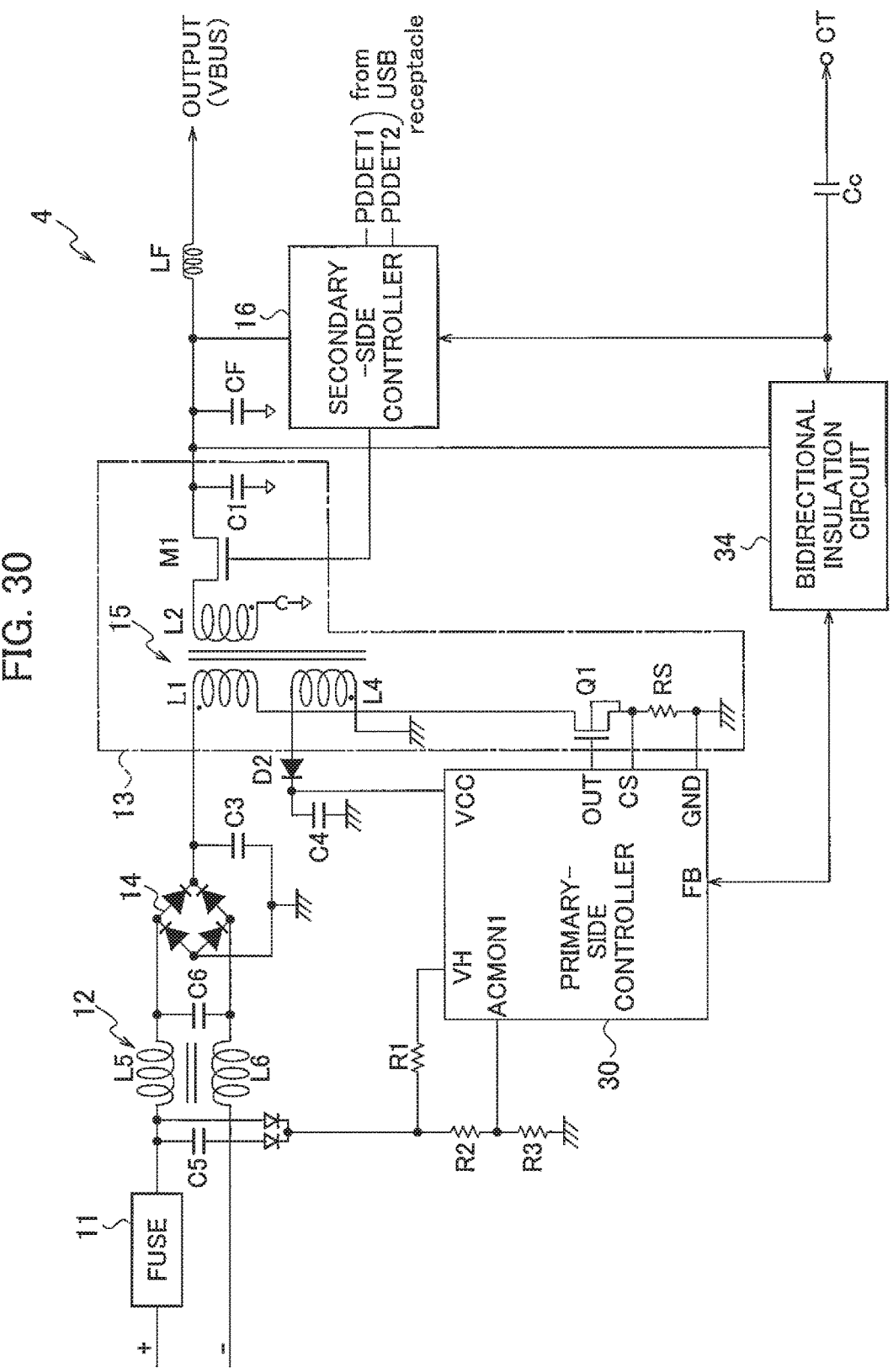
FIG. 30 is a schematic circuit block configuration diagram showing a PD device according to a sixth embodiment.

As shown in FIG. 30, a PD device 4 according to a sixth embodiment includes an AC/DC converter connected to an AC input, the AC/DC converter 300 composed by including a fuse 11, a choke coil 12, a diode rectification bridge 14, capacitors C5, C6 and C3, etc., instead of the power source supply circuit 10 as in the third embodiment.

Moreover, as shown in FIG. 30, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 30, the PD device 4 according to the sixth embodiment includes: a DC/DC converter 13 disposed between an input (DC output of the AC/DC converter) and a VBUS output; a primary-side controller 30 configured to control an input current of the DC/DC converter 13; and a bidirectional insulation circuit 34 coupled to a plurality of control inputs, the bidirectional insulation circuit 34 configured to executed a signal conversion of control input signals of the plurality of the control inputs, the bidirectional insulation circuit 34 configured to feed back the control input signals subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 30, the PD device 4 according to the sixth embodiment may include a secondary-side controller 16 disposed between the bidirectional insulation circuit 34 and the output of the DC/DC converter 13.

Moreover, as shown in FIG. 30, there may be included a control terminal CT, and the control input may be coupled to the control terminal CT. Moreover, a control output signal of the PD device 4 according to the sixth embodiment can be output to an external apparatus through the control terminal CT.

Although PDDET1 and PDDET2 from USB receptacle are described on the secondary-side controller 16, the PDDET1 and PDDET2 may be omitted.

In the PD device 4 according to the sixth embodiment, the DC/DC converter 13 includes a synchronous rectification type converter. More specifically, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential. Other configurations are the same as those of the third embodiment.

In the PD device 4 according to the sixth embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system.

According to the sixth embodiment, there can be provided the PD device capable of achieving miniaturization and cost reduction and capable of controlling the output voltage value and the available output current value (MAX value).

Seventh Embodiment

Figure 31:
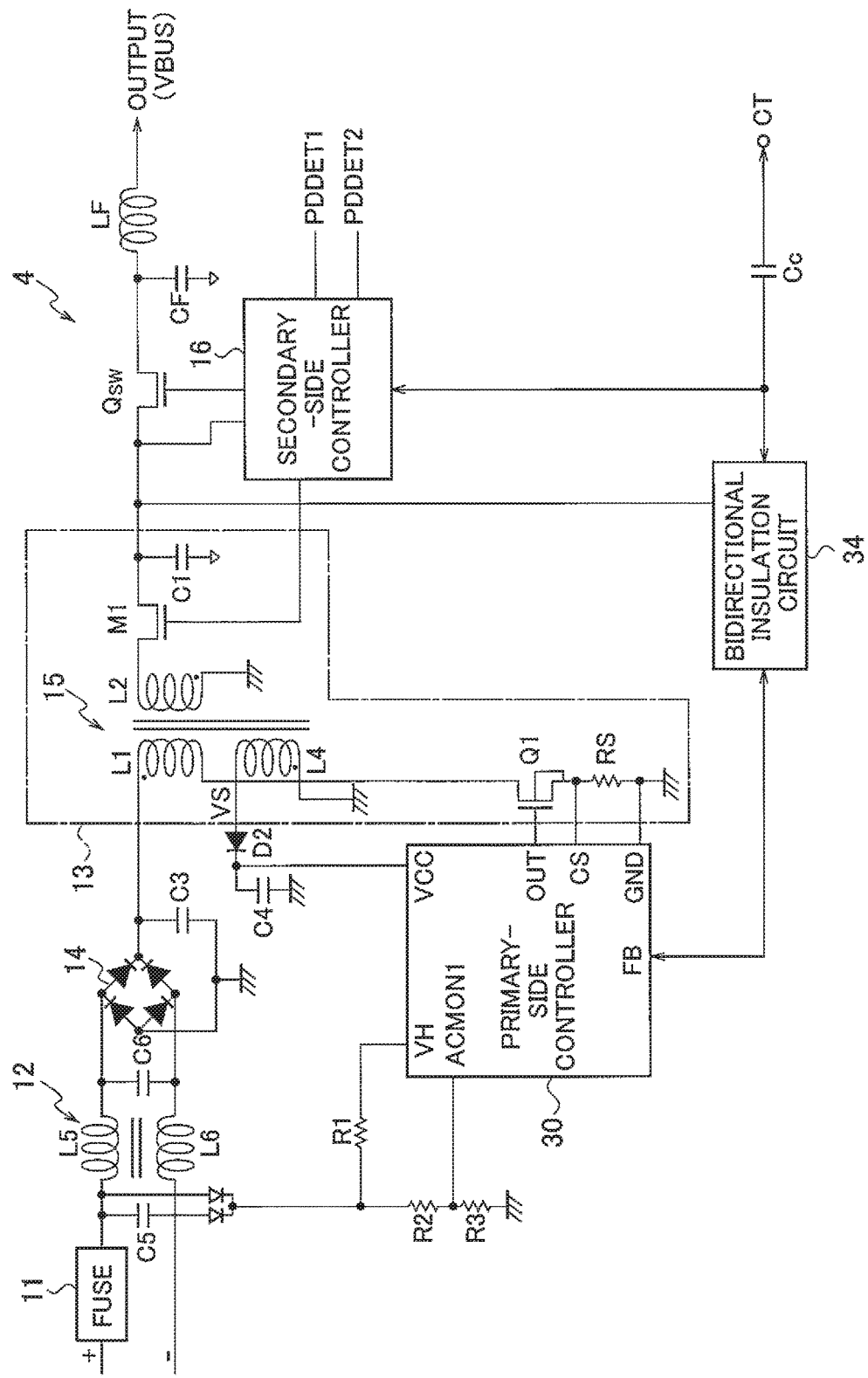
FIG. 31 is a schematic circuit block configuration diagram showing a PD device according to a seventh embodiment.

As shown in FIG. 31, a PD device 4 according to a seventh embodiment includes an AC/DC converter connected to an AC input, the AC/DC converter 300 composed of a fuse 11, a choke coil 12, a diode rectification bridge 14, capacitors C5, C6, and C3, etc., instead of the power source supply circuit 10 as in the third embodiment, in the same manner as the sixth embodiment.

Moreover, as shown in FIG. 31, there are included an auxiliary inductance L4 including the primary-side auxiliary winding in the transformer 15, and a diode D2 and a capacitor C4 connected in parallel to the auxiliary inductance L4 therein, and the DC voltage VCC is supplied from the capacitor C4 to the primary-side controller 30.

As shown in FIG. 31, the PD device 4 according to the seventh embodiment includes: a DC/DC converter 13 disposed between an input (DC output of the AC/DC converter) and a VBUS output; a primary-side controller 30 configured to control an input current of the DC/DC converter 13; and a bidirectional insulation circuit 34 coupled to a control input, the bidirectional insulation circuit 34 configured to executed a signal conversion of a control input signal of the control input, and configured to feed back the control input signal subjected to the signal conversion to the primary-side controller 30. In this context, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34.

Moreover, as shown in FIG. 31, the PD device 4 according to the seventh embodiment may include: an MOS switch $Q_{SW}$ disposed between the output of the DC/DC converter 13 and the VBUS output, the MOS switch $Q_{SW}$ configured to interrupt an output of the DC/DC converter 13; and a secondary-side controller 16 connected to the bidirectional insulation circuit 34, the secondary-side controller 16 configured to execute on/off control of the MOS switch $Q_{SW}$.

Moreover, as shown in FIG. 31, there may be included a control terminal CT, and the control input may be coupled to the control terminal CT. Moreover, a control output signal of the PD device 4 according to the fifth embodiment can be output to an external apparatus through the control terminal CT.

Although PDDET1 and PDDET2 are described on the secondary-side controller 16, the PDDET1 and PDDET2 may be omitted.

In the PD device 4 according to the seventh embodiment, the DC/DC converter 13 includes a synchronous rectification type converter. More specifically, as shown in FIG. 31, the DC/DC converter 13 includes: a transformer 15; a first MOS transistor Q1 and a current sensing resistor RS each connected in series between the primary-side inductance L1 of the transformer 15 and ground potential; a second MOS transistor M1 connected between the secondary-side inductance L2 of the transformer 15 and the output; and a first capacitor C1 connected between the output and the ground potential. Other configurations are the same as those of the sixth embodiment.

In the PD device 4 according to the seventh embodiment, since the synchronous rectification method is adopted for the DC/DC converter, instead of the diode rectification system, and thereby DC/DC power conversion efficiency can be increased, compared with the second, fourth, and fifth embodiments adapting the diode rectification system.

According to the seventh embodiment, there can be provided the PD device capable of achieving miniaturization and cost reduction and capable of controlling the output voltage value and the available output current value (MAX value).

Eighth Embodiment

Figure 32A:
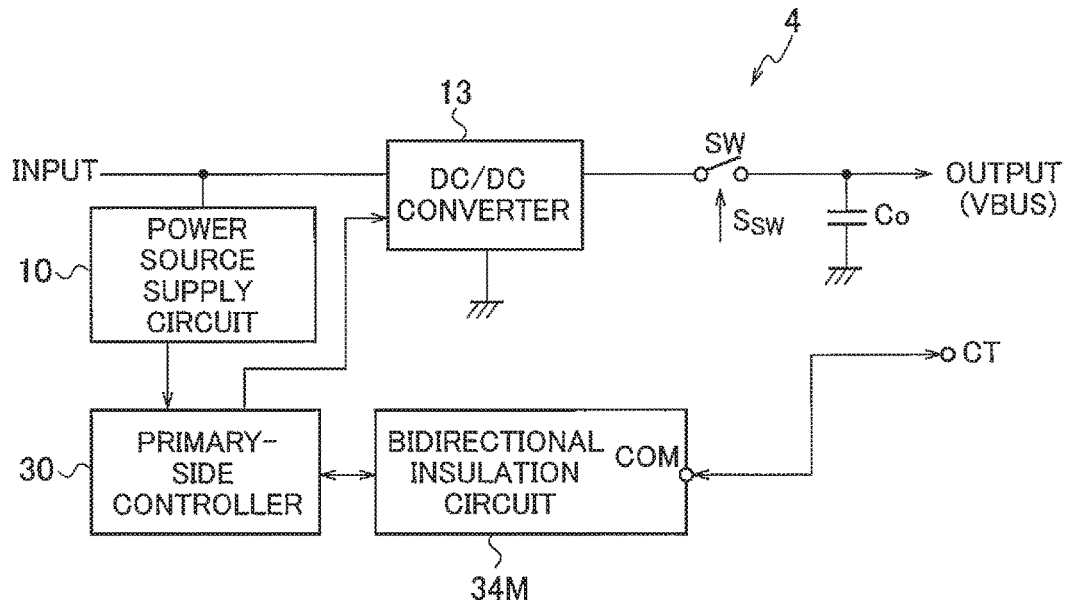
FIG. 32A is a schematic circuit block configuration diagram showing a PD device according to an eighth embodiment.

As shown in FIG. 32A, a PD device 4 according to an eighth embodiment includes: a DC/DC converter 13 disposed between an input and an output; a primary-side controller 30 configured to control an input current of the DC/DC converter 13; and a bidirectional insulation circuit 34M connected a the control input, the bidirectional insulation circuit 34M configured to feed back a control input signal of the control input to the primary-side controller 30. In this context, the control input signal of the control input is input into a communication terminal COM of the bidirectional insulation circuit 34M. Moreover, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34M.

Moreover, as shown in FIG. 32A, there may be included a control terminal CT, and the control input may be coupled to the control terminal CT. Moreover, a control output signal of the PD device 4 according to the eighth embodiment can be output to an external apparatus through the control terminal CT.

Moreover, the PD device 4 according to the eighth embodiment may include an AC coupling capacitor $C_C$ coupled to the control input, and the bidirectional insulation circuit 34M may be connected to the control input through the AC coupling capacitor $C_C$.

Moreover, the control input may be directly connected to the bidirectional insulation circuit 34M. More specifically, the control input signal of the control input may be directly input to the bidirectional insulation circuit 34M without through the AC coupling capacitor $C_C$.

A capacitor, a photo coupler, a transformer, etc. are applicable to the bidirectional insulation circuit 34M. Moreover, as usage, a bidirectional transformer having an insulated driver, a bilateral device, etc. may also be applied thereto.

Moreover, as shown in FIG. 32A, the secondary-side controller is removed from the PD device 4 according to the eighth embodiment.

Moreover, as shown in FIG. 32A, the PD device 4 according to the eighth embodiment may include the switch SW connected to the output of the DC/DC converter 13, the switch SW configured to interrupt an output voltage of the DC/DC converter 13. The output of the DC/DC converter 13 and the power line output (VBUS) can be interrupted by the switch SW. ON/OFF control for the switch SW can be executed by the primary-side controller 30 or the bidirectional insulation circuit 34M. The switch SW may include a MOS switch.

In the PD device 4 according to the eighth embodiment, the control input signal is input into the bidirectional insulation circuit 34M through the AC coupling capacitor $C_C$ from the control input, and then the control information including electric power information at the output side is fed back to the primary-side controller 30 in response to the control input signal. The primary-side controller 30 controls an input current of the DC/DC converter 13 in order to stabilize an output voltage. Other configurations are the same as those of the first embodiment.

Also in the PD device 4 according to the eighth embodiment, the power line output (VBUS)/AC superposition mode may be used in conjunction with the power line output (VBUS)/AC separation mode.

Modified Example

Figure 32B:
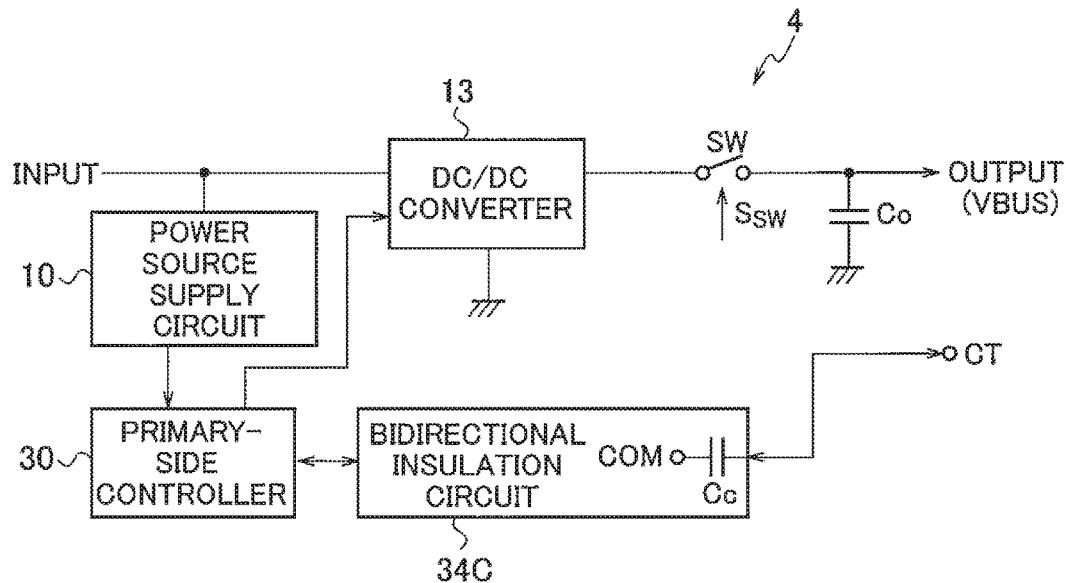
FIG. 32B is a schematic circuit block configuration diagram showing a PD device according to a modified example of the eighth embodiment.

As shown in FIG. 32B, a PD device 4 according to a modified example of the eighth embodiment includes: a DC/DC converter 13 disposed between an input and an output; a primary-side controller 30 configured to control an input current of the DC/DC converter 13; and a bidirectional insulation circuit 34C connected to a control input, the bidirectional insulation circuit 34C configured to feed back a control input signal of the control input to the primary-side controller 30. In this context, the control input signal is input into a communication terminal COM provided in the bidirectional insulation circuit 34C. Moreover, the primary-side controller 30 varies an output voltage value and an available output current value (MAX value) of the DC/DC converter 13 by controlling the input current of the DC/DC converter 13 on the basis of the control input signal fed back from the bidirectional insulation circuit 34C.

Moreover, as shown in FIG. 32B, there may be included a control terminal CT, and the control input may be coupled to the control terminal CT. Moreover, a control output signal of the PD device 4 according to the modified example of the eighth embodiment can be output to an external apparatus through the control terminal CT.

Moreover, as shown in FIG. 32B, the PD device 4 according to the modified example of the eighth embodiment includes an AC coupling capacitor $C_C$ coupled to the control input. In this context, the AC coupling capacitor $C_C$ is contained in the bidirectional insulation circuit 34C.

The bidirectional insulation circuit 34C is connected to the control input through the AC coupling capacitor $C_C$ contained therein.

Moreover, as shown in FIG. 32B, the secondary-side controller is removed from the PD device 4 according to the modified example of the eighth embodiment.

In the PD device 4 according to the modified example of the eighth embodiment, the control input signal is input into the bidirectional insulation circuit 34C from the control input, and then the control information including electric power information at the output side is fed back to the primary-side controller 30 in response to the control input signal. The primary-side controller 30 controls an input current of the DC/DC converter 13 in order to stabilize an output voltage. Other configurations are the same as those of the eighth embodiment.

Also in the PD device 4 according to the modified example of the eighth embodiment, the power line output (VBUS)/AC superposition mode may be used in conjunction with the power line output (VBUS)/AC separation mode.

According to the eighth embodiment and its modified examples, there can be provided the PD device, in which no filter coil is required for the output side and the mounting space is reduced, and thereby capable of achieving miniaturization and cost reduction, and capable of controlling the output voltage value and the available output current value (MAX value).

(MOS Switch)

Figure 33:
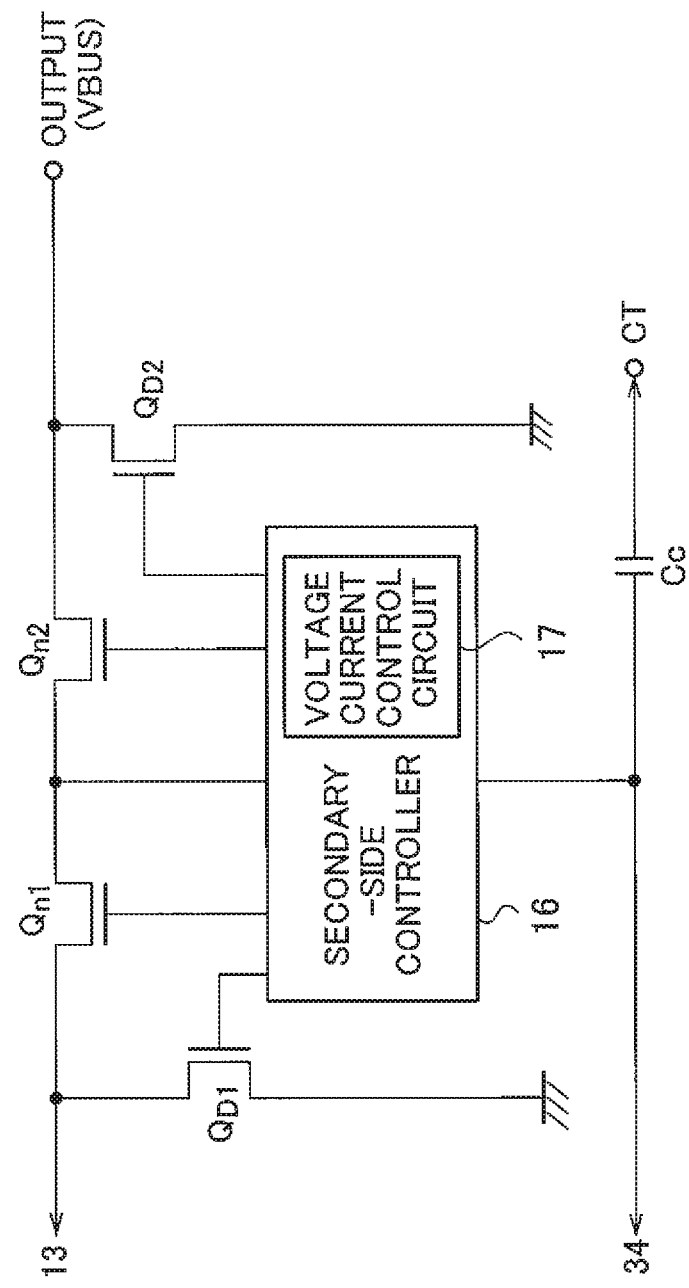
FIG. 33 is a schematic circuit block configuration diagram showing a metal oxide semiconductor (MOS) switch applied to the PD device according to the embodiments.

As shown in FIG. 33, a schematic circuit block configuration example of a switch SW applicable to the PD device 4 according to the first or eighth embodiment, or a MOS switch $Q_{SW}$ applicable to the PD device according to the second, third, fifth or seventh embodiment includes: two n-channel MOSFETs $Q_{n1}$ and $Q_{n2}$ connected to each other in series; and MOSFETs QD1 and QD2 for discharging respectively connected to both ends of the n channel MOSFETs $Q_{n1}$ and $Q_{n2}$ connected to each other in series. Each gate of the two n-channel MOSFETs $Q_{n1}$ and $Q_{n2}$ connected to each other in series is connected to the secondary-side controller 16, and ON/OFF of MOSFETs $Q_{n1}$ and $Q_{n2}$ is controlled by the secondary-side controller 16. A voltage and current control circuit 17 is contained in the secondary-side controller 16, and the control input signal is input into the communication terminal COM of the secondary-side controller 16.

(Example of Connection Through Receptacle)

Figure 34:
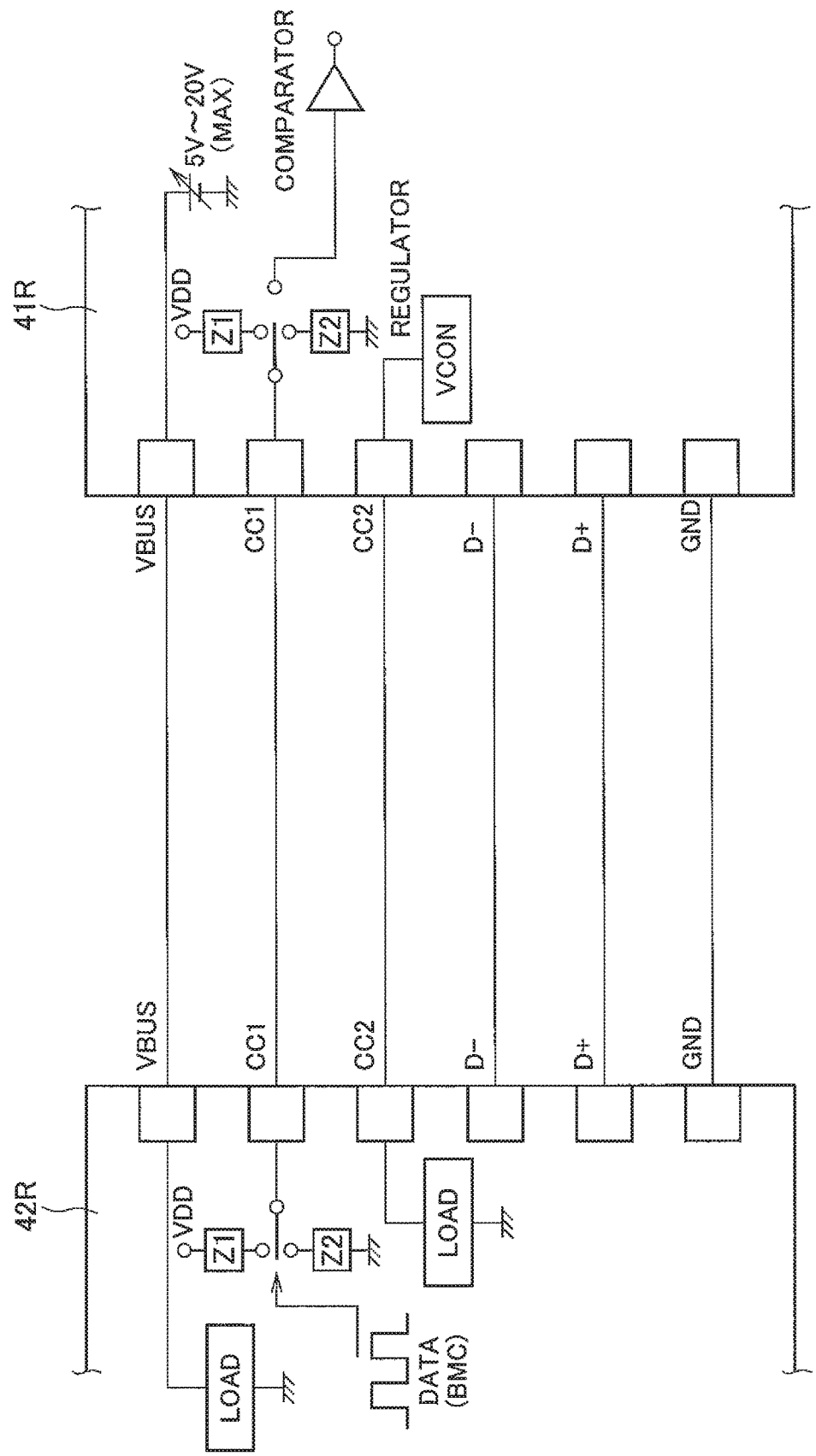
FIG. 34 is a schematic configuration diagram showing an aspect of connecting between the PD devices according to the first embodiment through receptacles.

FIG. 34 shows a schematic configuration of connecting between the PD devices according to the first embodiment through receptacles 41R and 42R.

Each of the receptacles 41R and 42R has a VBUS terminal, a CC1 terminal, a CC2 terminal, a D− terminal, a D+ terminal, and a GND terminal, and is configured to connect between the PD devices according to the first embodiment.

The VBUS terminal is connected to a power line POL used for bidirectional communications between the devices. One of the VBUS terminals is connected to a load (LOAD), and another of the VBUS terminals is connected to a variable power supply of approximately 5V to approximately 20V (MAX), for example. In this context, the variable power supply corresponds to the output voltage of the PD device according to the first embodiment. The GND terminal is a ground terminal (earth terminal).

The CC1 terminal and the CC2 terminal are communication terminals connected to a communication dedicated line COL used for bidirectional communications between the devices. The connecting configuration is set so that a constant voltage can be supplied to the CC1 terminal by a power supply VDD and impedance circuits Z1 and Z2, and data (BMC) is supplied from one of the CC1 terminals and then is received into the other of the CC1 terminals through a comparator, for example. The CC1 terminal may be connected to a constant current supply, instead of supplying the constant voltage. In this context, each of the impedance circuits Z1 and Z2 can be configured by including a parallel circuit including a current source and a resistance, and can select any one of the current source or the resistance. Moreover, a voltage control regulator (VCON) may be connected to one of the CC2 terminals, and a load (LOAD) may be connected to the other of the CC2 terminals.

The D− terminal and the D+ terminal are serial-data interface terminals for realizing a flipping function.

(Configuration Example of Inside of Receptacle)

Figure 35:
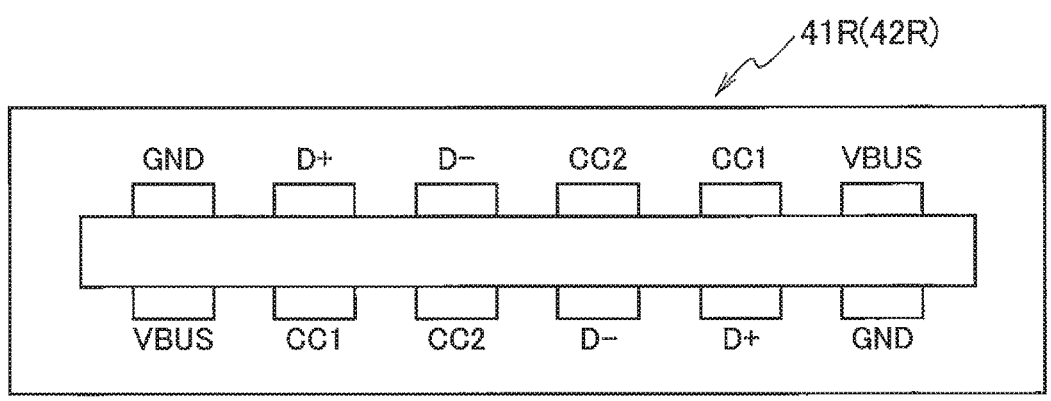
FIG. 35 is a schematic configuration diagram showing the inside of the receptacle applicable to the PD device according to the first embodiment.

FIG. 35 shows a schematic configuration of the inside of the receptacle 41R (42R) applicable to the PD device according to the first embodiment. In the internal configuration of the receptacle 41R (42R), the VBUS, CC1, CC2, D−, D+, and GND terminals are disposed on both sides of a substrate used for disposing terminals. Accordingly, there is no need to distinguish between the upper or lower surface (front or back surface) of the receptacle 41R (42R).

(Example of Connection Through Receptacle and Plug)

Figure 36:
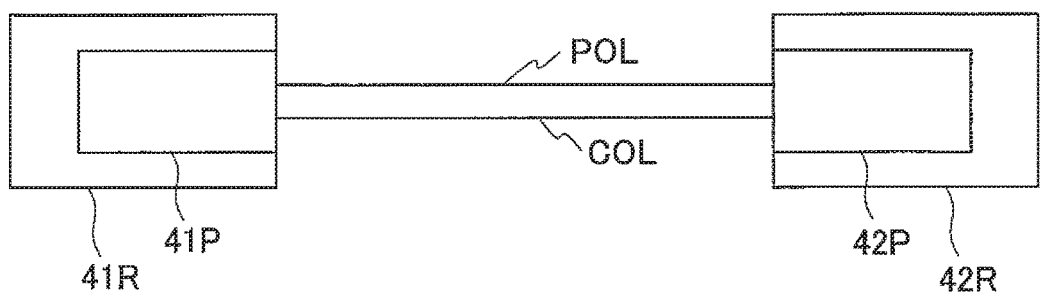
FIG. 36 is a schematic configuration diagram showing an aspect of connecting between the PD devices according to the first embodiment through receptacles and plugs.

FIG. 36 shows a schematic configuration of connecting between the PD devices according to the first embodiment through a receptacle 41R (42R) and a plug 41P (42P). As shown in FIG. 36, by inserting the plug 41P (42P) into the receptacle 41R (42R), an electric power supply becomes available through the power line POL, and data communications also become available through the communication dedicated line COL.

FIG. 37A shows a schematic configuration of connecting between the PD devices according to the first embodiment through the receptacles 41R and 42R, plugs 2, and a cable (POL/COL). In this context, the plug 2 corresponds to the plug 41P (42P) shown in FIG. 36.

The plug 2 has a shape corresponding to the shape of the receptacles 41R and 42R shown in FIG. 35, and includes an electrode on one side surface thereof, and has the VBUS, CC1, CC2, D−, D+, and GND terminals. Furthermore, the plug 2 also includes an electrode on a back surface side thereof, and has the GND, D+, D−, CC2, CC1, and VBUS terminals. Accordingly, the plug 2 can be called as an advanced USB plug, and the receptacle 41R (42R) can be called as an advanced USB receptacle.

A connecting relationship between the two receptacles 41R and 42R is expressed as shown in FIG. 37B. As shown in FIG. 37B, four kinds of connecting relationship between the two receptacles (41R, 42R) with respect to the plugs (41P, 42P) are available, i.e., a relationship between a normal connection N and a normal connection N, a relationship between a normal connection N and a reverse connection R, a relationship between a reverse connection R and a normal connection N, and a relationship between a reverse connection R and a reverse connection R.

(Connecting Relationship Between Power Circuits)

FIG. 38A shows a schematic block configuration for explaining a connecting relationship between the power output circuit 130 applicable to the PD device according to the first embodiment and a load circuit 134, and FIG. 38B shows a schematic circuit configuration corresponding to the configuration shown in FIG. 38A.

It can be assumed that the load circuit 134 is disposed in an external device which is externally connected through the connection between the receptacles 41R and 42R.

In the example shown in FIG. 38A, a plurality of VBUS outputs are included in the power output circuit 130, and the respective VBUS output are connected to the load circuit 134 through respective power lines POL1, POL2, and PLO3. As shown in FIG. 38B, the power output circuit 130 includes a plurality of switches (SWP, P1, P2, P3); the load circuit 134 includes a plurality of switches (SWP, P1, P2, P3) respectively connected to the power lines POL1, POL2, and PLO3, and is connected to loads 1-3. The power output circuit 130 and the load circuit 134 are bidirectionally connected to each other.

Figure 39A:
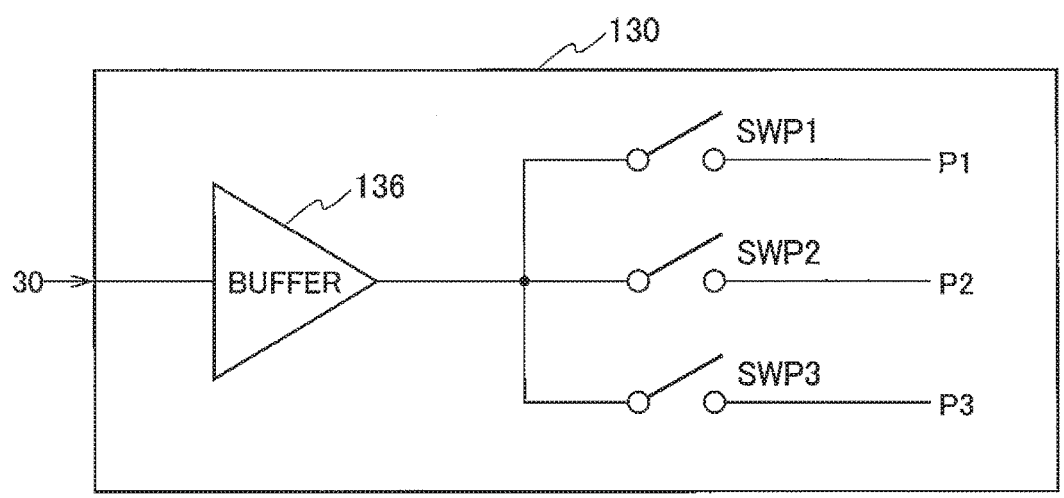
FIG. 39A shows a specific circuit configuration example of the power output circuit shown in FIG. 38B.
Figure 39B:
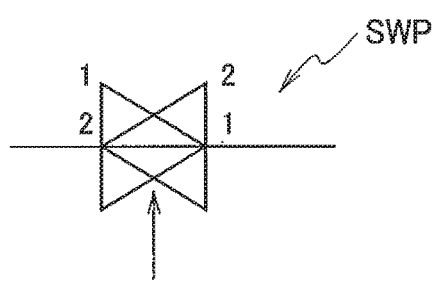
FIG. 39B is a configuration diagram showing a bidirectional switch applicable to the configuration shown in FIG. 39A.

A specific circuit configuration of the power output circuit 130 shown in FIG. 38B is expressed as shown in FIG. 39A. As shown in FIG. 39A, the power output circuit 130 is includes: a buffer 136 connected to the primary-side controller 30; and a plurality of switches (SWP1, SWP2, SWP3) connected to an output of the buffer 136. In this context, the plurality of switches (SWP1, SWP2, SWP3) can be configured to include bidirectional switches, for example, as shown in FIG. 39B.

Configuration of Power Output Circuit

Configuration Example 1

Figure 40:
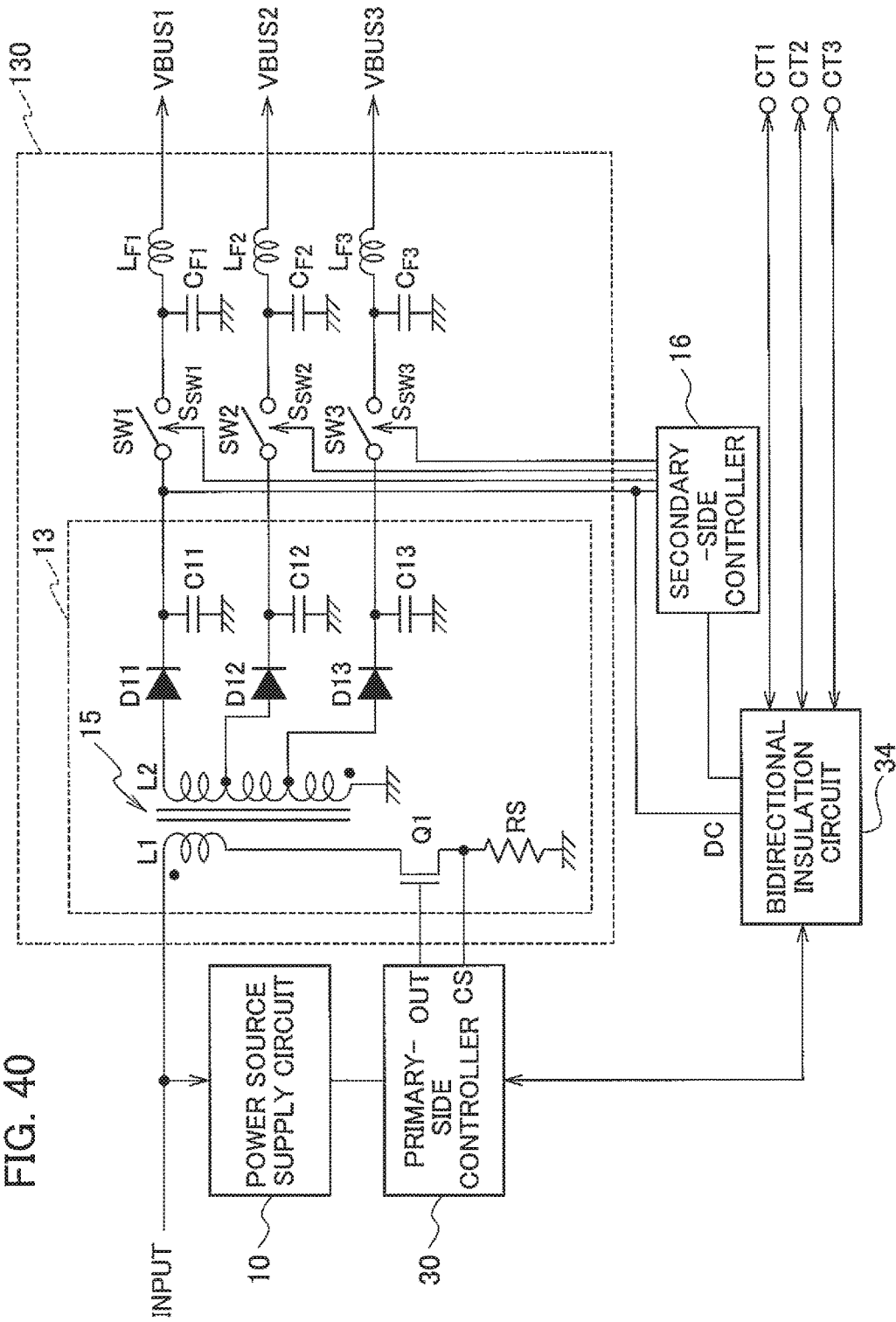
FIG. 40 is a schematic circuit configuration diagram showing the power output circuit (configuration example 1) applicable to the PD device according to the first embodiment.

FIG. 40 shows a schematic circuit configuration example 1 of the power output circuit 130 applicable to the PD device according to the first embodiment.

As shown in FIG. 40, the schematic circuit configuration example 1 of the power output circuit 130 applicable to the PD device according to the first embodiment includes a configuration of being branched from the secondary-side inductance L2 of the transformer 15 in the diode rectification type DC/DC converter 13. More specifically, a VBUS output VBUS1 is obtained from an output of a diode D11 and a capacitor C11 through a switch SW1 and a filter circuit LF1 and CF1; a VBUS output VBUS2 is obtained from an output of a diode D12 and a capacitor C12 through a switch SW2 and filter circuit LF2 and CF2; and a VBUS output VBUS3 is obtained from an output of a diode D13 and a capacitor C13 through a switch SW3 and a filter circuit LF3 and CF3.

Configuration Example 2

Figure 41:
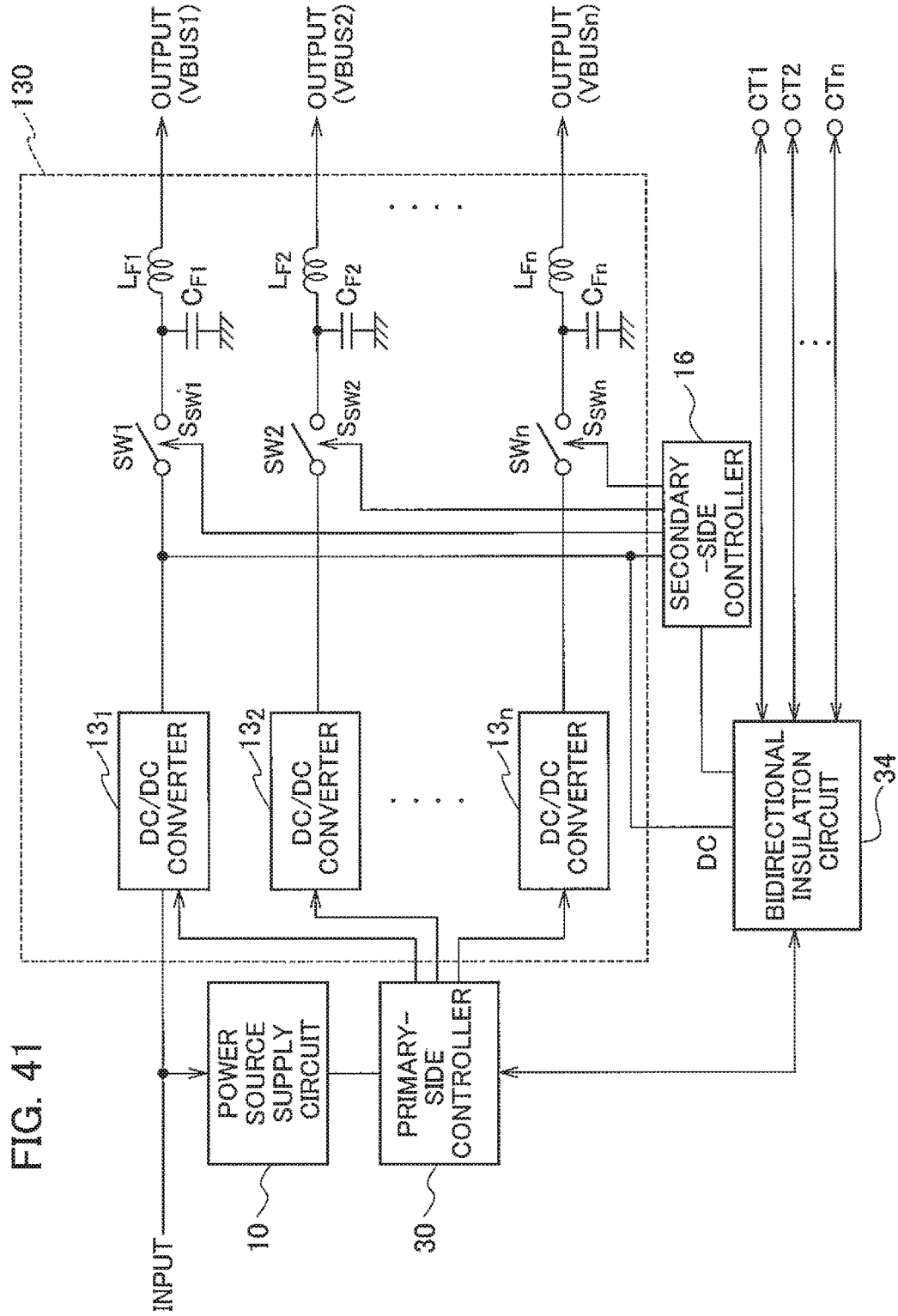
FIG. 41 is a schematic circuit configuration diagram showing the power output circuit (configuration example 2) applicable to the PD device according to the first embodiment.

FIG. 41 shows a schematic circuit configuration example 2 of the power output circuit 130 applicable to the PD device according to the first embodiment.

As shown in FIG. 41, the schematic circuit configuration example 2 of the power output circuit 130 applicable to the PD device according to the first embodiment includes a plurality of DC/DC converters $13_1$, $13_2$, . . . , $13_n$. More specifically, an VBUS output VBUS1 is obtained from an output of the DC/DC converter $13_1$ through a switch SW1 and a filter circuit LF1 and CF1; an VBUS output VBUS2 is obtained from an output of the DC/DC converter $13_2$ through a switch SW2 and a filter circuit LF2 and CF2; . . . ; and a VBUS output VBUSn is obtained from an output of the DC/DC converter $13_n$ through a switch SWn and a filter circuit LFn and CFn.

Configuration Example 3

Figure 42:
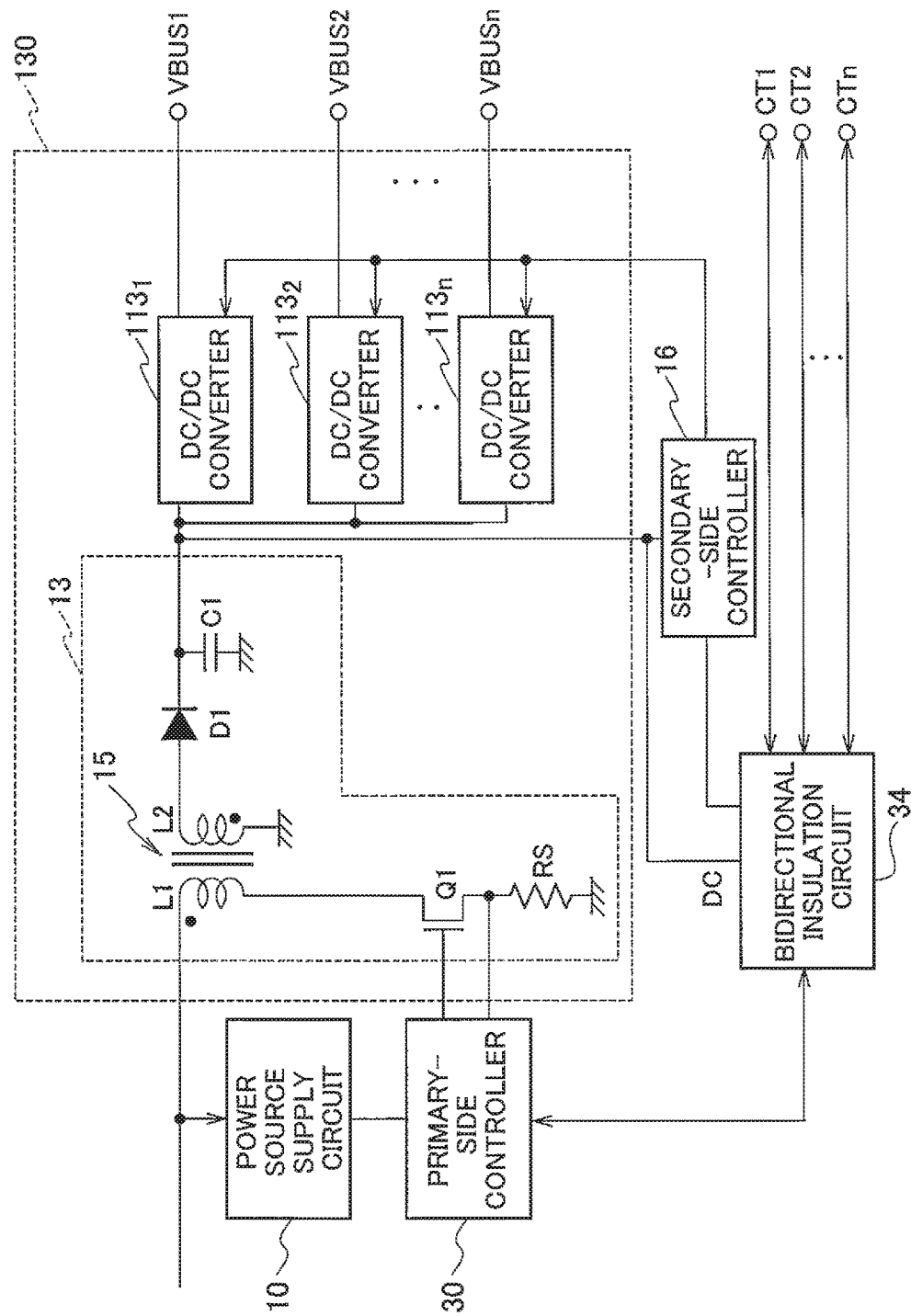
FIG. 42 is a schematic circuit configuration diagram showing the power output circuit (configuration example 3) applicable to the PD device according to the first embodiment.

FIG. 42 shows a schematic circuit configuration example 3 of the power output circuit 130 applicable to the PD device according to the first embodiment.

As shown in FIG. 42, the schematic circuit configuration example 3 of the power output circuit 130 applicable to the PD device according to the first embodiment includes: a diode rectification type DC/DC converter 13; and a plurality of DC/DC converters $113_1$, $113_2$, . . . , $113_n$ connected to an output of the diode rectification type DC/DC converter 13. More specifically, an VBUS output VBUS1 is obtained from an output of the DC/DC converter $113_1$ through a switch SW1 and a filter circuit LF1 and CF1; an VBUS output VBUS2 is obtained from an output of the DC/DC converter $113_2$ through a switch SW2 and a filter circuit LF2 and CF2; . . . ; and a VBUS output VBUSn is obtained from an output of the DC/DC converter $113_n$ through a switch SWn and a filter circuit LFn and CFn.

Configuration Example 4

Figure 43:
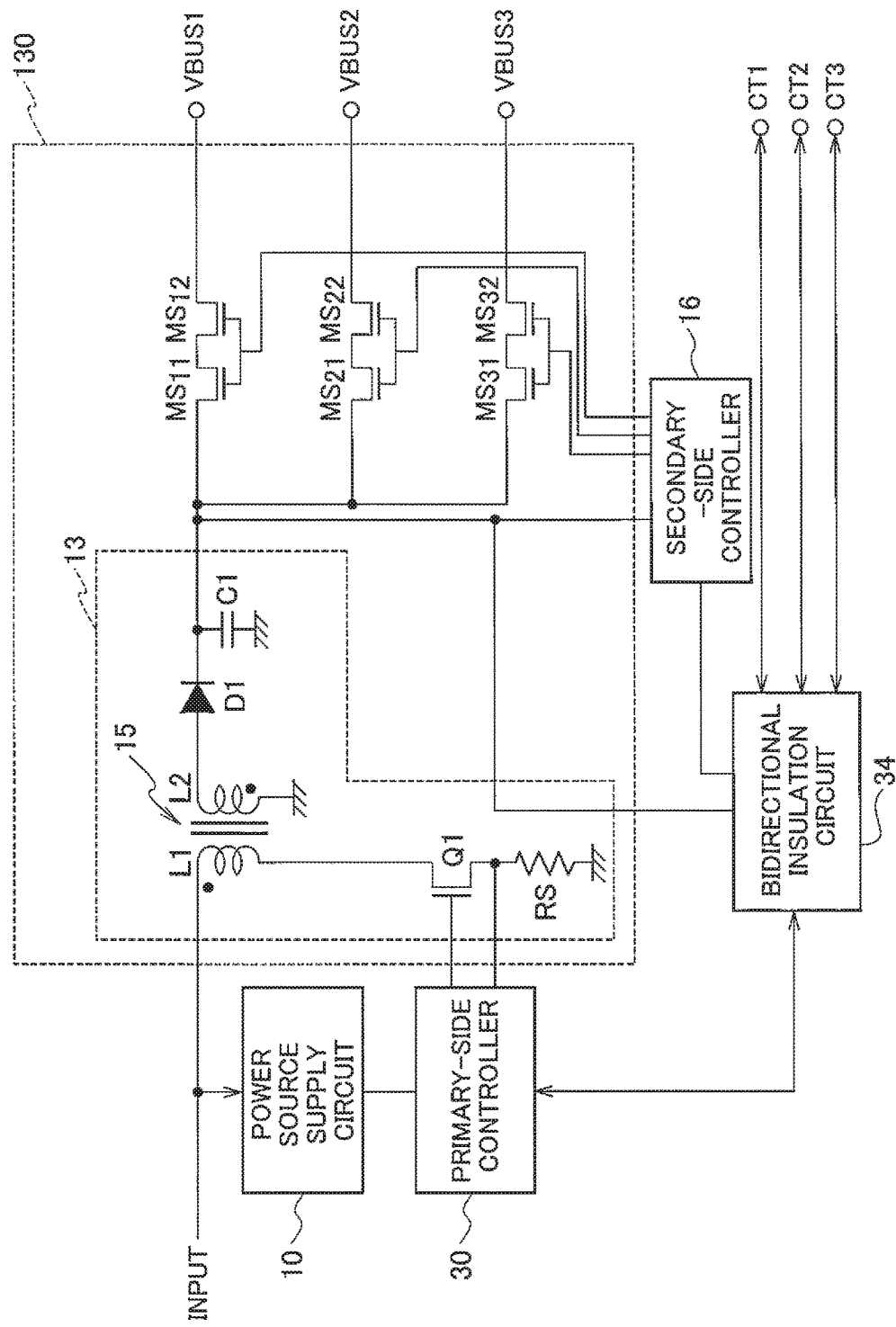
FIG. 43 is a schematic circuit configuration diagram showing the power output circuit (configuration example 4) applicable to the PD device according to the first embodiment.

FIG. 43 shows a schematic circuit configuration example 4 of the power output circuit 130 applicable to the PD device according to the first embodiment.

As shown in FIG. 43, the schematic circuit configuration example 4 of the power output circuit 130 applicable to the PD device according to the first embodiment includes: a diode rectification type DC/DC converter 13; and a plurality of MOS switches ($MS_{11}$ and $MS_{12}$), ($MS_{21}$ and $MS_{22}$), and ($MS_{31}$ and $MS_{32}$) connected to an output of the DC/DC converter 13, wherein conductive states of the MOS switches can be controlled by the secondary-side controller 16. More specifically, a VBUS output VBUS1, a VBUS output VBUS2, and a VBUS output VBUS3 are respectively obtained from outputs of the plurality of the MOS switches ($MS_{11}$ and $MS_{12}$), ($MS_{21}$ and $MS_{22}$), and ($MS_{31}$ and $MS_{32}$).
(AC Adapter/AC Charger)

The PD device 4 according to the first to eighth embodiments can be contained in AC adapters/AC chargers 3, as shown in FIGS. 44A to 44C, and FIGS. 45A to 45C.

Figure 44A:
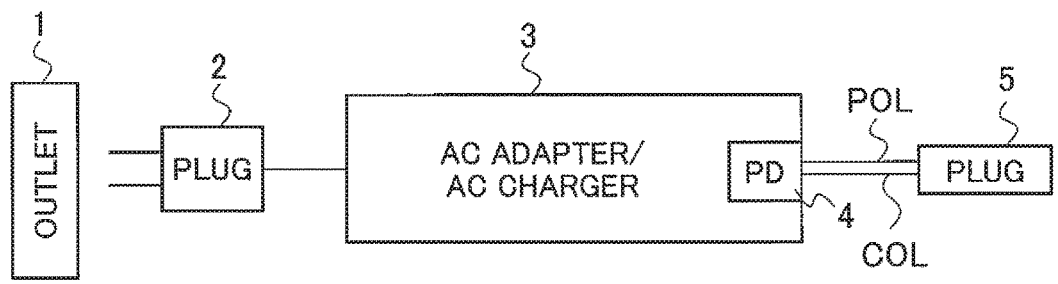
FIG. 44A shows an example of connecting the PD in an AC adapter/AC charger to an external plug, in an example of wire connection for connecting the AC adapter/AC charger to a plug capable of being connected to an outlet using a cable.

As shown in FIG. 44A, the AC adapter/AC charger 3 containing the PD device (PD) 4 according to the embodiments can be connected to the plug 2 connectable to the outlet 1 using a cable, and can be connected to the plug 5 disposed an outside of the AC adapter/AC charger 3. The PD device (PD) 4 and the plug 5 are connected to each other with the power line POL and the communication dedicated line COL. The power line POL and the communication dedicated line COL are directly connected to the PD device (PD) 4.

Figure 44B:
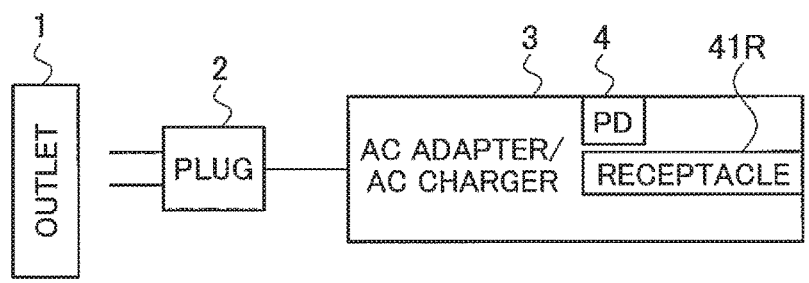
FIG. 44B shows an example of including a receptacle in the AC adapter/AC charger, in the example of wire connection for connecting the AC adapter/AC charger to the plug capable of being connected to the outlet using the cable.

Moreover, as shown in FIG. 44B, the AC adapter/AC charger 3 containing the PD device (PD) 4 according to the embodiments can be connected to the plug 2 connectable to the outlet 1 using a cable, and may also include a receptacle 41R.

Figure 44C:
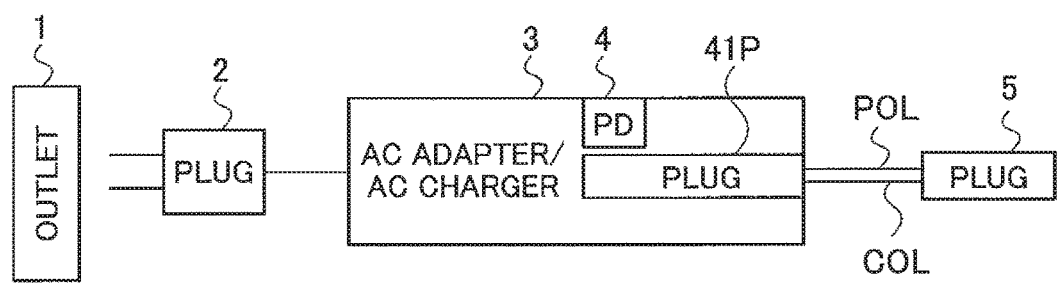
FIG. 44C shows an example of connecting a plug contained in the AC adapter/AC charger to the external plug, in the example of wire connection for connecting the AC adapter/AC charger to the plug capable of being connected to the outlet using the cable.

Moreover, as shown in FIG. 44C, the AC adapter/AC charger 3 containing the PD device (PD) 4 according to the embodiments can be connected to the plug 2 connectable to the outlet 1 using a cable, and may include a plug 41P. The plug 41P can be connected to the plug 5 disposed at the outside thereof. The plug 41P and the plug 5 are connected to each other by the power line POL and the communication dedicated line COL.

Figure 45A:
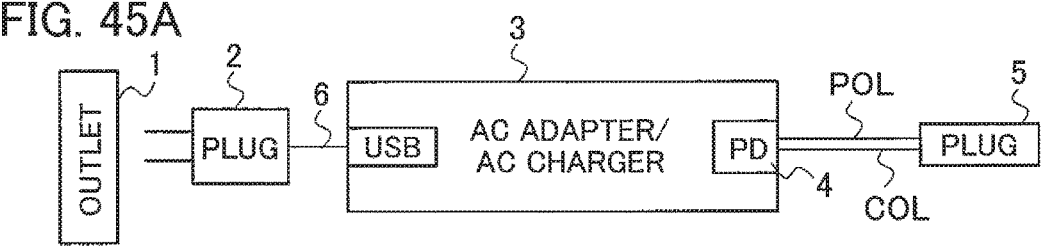
FIG. 45A shows an example of connecting the PD in the AC adapter/AC charger to the external plug, in an example of wire connection for connecting the AC adapter/AC charger to the plug capable of being connected to the outlet using a USB PD cable.

Moreover, as shown in FIG. 45A, the AC adapter/AC charger 3 containing the PD device (PD) 4 according to the embodiments can be connected to the plug 2 connectable to the outlet 1 using a USB PD cable 6, and can also be connected to the plug 5 disposed at the outside of the AC adapter/AC charger 3. The PD device (PD) 4 and the plug 5 are connected to each other with the power line POL and the communication dedicated line COL. The power line POL and the communication dedicated line COL are directly connected to the PD device (PD) 4.

Figure 45B:
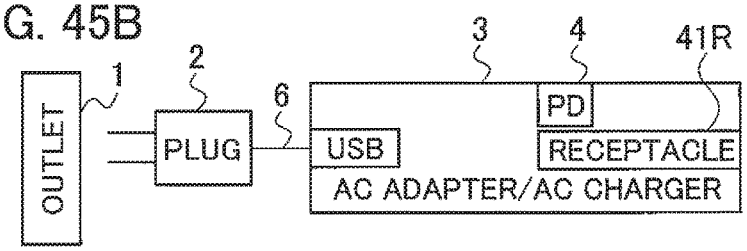
FIG. 45B shows an example of including a receptacle in the AC adapter/AC charger, in the example of wire connection for connecting the AC adapter/AC charger to the plug capable of being connected to the outlet using the USB PD cable.

Moreover, as shown in FIG. 45B, the AC adapter/AC charger 3 containing the PD device (PD) 4 according to the embodiments can be connected to the plug 2 connectable to the outlet 1 using the USB PD cable 6, and may also include a receptacle 41R.

Figure 45C:
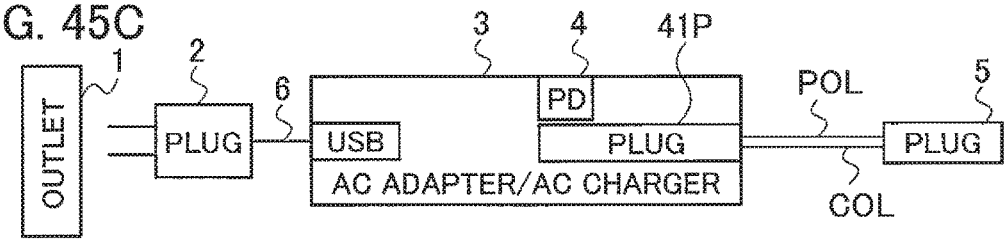
FIG. 45C shows an example of connecting a plug contained in the AC adapter/AC charger to the external plug, in the example of wire connection for connecting the AC adapter/AC charger to the plug capable of being connected to the outlet using the USB PD cable.

Moreover, as shown in FIG. 45C, the AC adapter/AC charger 3 containing the PD device (PD) 4 according to the embodiments may be connected to the plug 2 connectable to the outlet 1 using the USB PD cable 6, and may also include a plug 41P. The plug 41P can be connected to the plug 5 disposed at the outside thereof. The plug 41P and the plug 5 are connected to each other by the power line POL and the communication dedicated line COL.

Figure 46A:
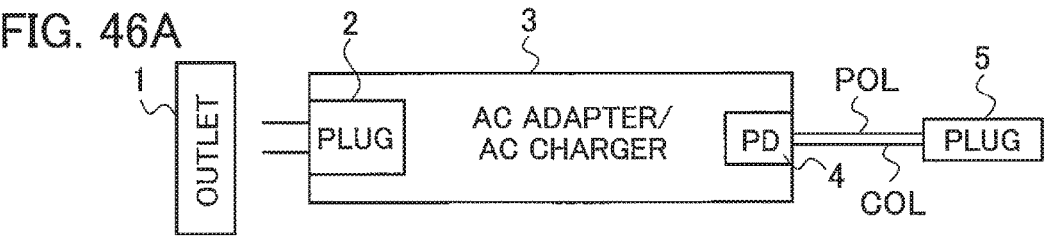
FIG. 46A shows an example of connecting the PD in the AC adapter/AC charger to the external plug, in an example of containing the plug capable of being connected to the outlet in the AC adapter/AC charger.
Figure 46B:
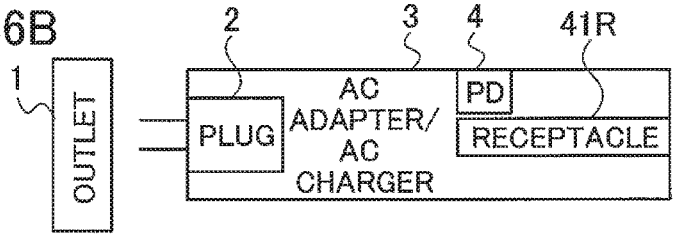
FIG. 46B shows an example of including the receptacle in the AC adapter/AC charger, in the example of containing the plug capable of being connected to the outlet in the AC adapter/AC charger.
Figure 46C:
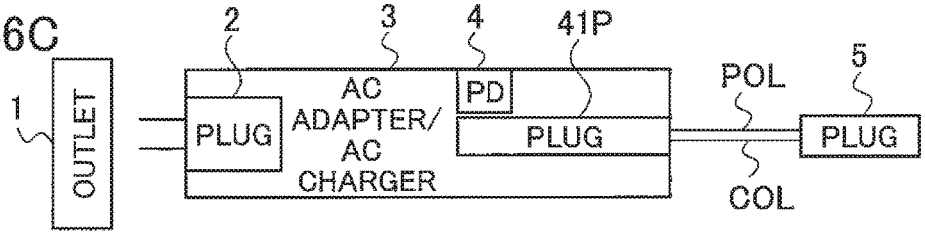
FIG. 46C shows an example of connecting the plug contained in the AC adapter/AC charger to the external plugs, in the example of containing the plug capable of being connected to the outlet in the AC adapter/AC charger.

Moreover, the plug 2 connectable to the outlet 1 may be contained in the AC adapter/AC charger 3 including the PD device (PD) 4 according to the embodiments, as shown in FIGS. 46A to 46C.

As shown in FIG. 46A, the AC adapter/AC charger 3 containing the PD device (PD) 4 according to the embodiments and the plug 2 can be connected to the plug 5 disposed at the outside thereof. The PD device (PD) 4 and the plug 5 are connected to each other with the power line POL and the communication dedicated line COL. The power line POL and the communication dedicated line COL are directly connected to the PD device (PD) 4.

Moreover, the AC adapter/AC charger 3 containing the PD device (PD) 4 according to the embodiments and the plug 2 may include the receptacle 41R, as shown in FIG. 46B.

Moreover, the AC adapter/AC charger 3 containing the PD device (PD) 4 according to the embodiments and the plug 2 may include the plug 41P, as shown in FIG. 46C. The plug 41P can be connected to the plug 5 disposed at the outside thereof. The plug 41P and the plug 5 are connected to each other by the power line POL and the communication dedicated line COL.

A plurality of the PD devices according to the embodiments can be contained in the AC adapter/AC charger 3, as shown in FIGS. 47A to 47C. Moreover, the plug 2 connectable to the outlet 1 is also contained therein.

As shown in FIG. 47A, the AC adapter/AC charger 3 containing a plurality of the PD devices (PD) 41 and 42 according to the embodiments and the plug 2 can be respectively connected to a plurality of the plugs 51 and 52 disposed at the outside thereof. The PD devices (PD) 41 and 42 and the plugs 51 and 52 are respectively connected to each other with the power line POL and the communication dedicated line COL. The power line POL and the communication dedicated line COL are directly connected to the PD devices (PD) 41 and 42.

Moreover, the AC adapter/AC charger 3 containing the plurality of the PD devices (PD) 41 and 42 according to the embodiments and the plug 2 may include receptacles 41R and 42R, as shown in FIG. 47B.

Moreover, the AC adapter/AC charger 3 containing the plurality of the PD devices (PD) 41 and 42 according to the embodiments and the plug 2 may include plugs 41P and 42P, as shown in FIG. 47C. The plugs 41P and 42P can be respectively connected to the plugs 51 and 52 disposed at the outside thereof. The plugs 41P and 42P and the plugs 51 and 52 are respectively connected to each other by the power line POL and the communication dedicated line COL.

(Electronic Apparatus)

As shown in FIGS. 48 to 49, the PD device according to the first to eighth embodiments can be contained in an electronic apparatus 7. As an electronic apparatus, there are applicable various apparatus, e.g. monitors, external hard disk drives, set top boxes, laptop PCs, tablet PCs, smartphones, battery charger systems, personal computers (PCs), docking stations, displays, printers, cleaners, refrigerators, facsimiles, telephones, car navigation systems, car computers, television sets, spectacles, head-mounted displays, fans, air-conditioners, laser displays, or wall outlets, for example.

FIG. 48A shows an example of including internal circuits 71 and 72 respectively containing the PD devices 41 and 42 and the receptacles 41R and 42R in electronic apparatus 7, in an example of wire connection for connecting the electronic apparatus 7 to the plug 2 capable of being connected to the outlet 1 using a cable.

Moreover, FIG. 48B shows an example of containing the plug 2 connectable to the outlet 1 in the electronic apparatus 7, and also including internal circuits 71 and 72 respectively containing the PD devices 41 and 42 and the receptacles 41R and 42R in the electronic apparatus 7.

In FIGS. 48A and 48B, the receptacles 41R and 42R are connected to each other by the power line POL and the communication dedicated line COL.

Figure 49A:
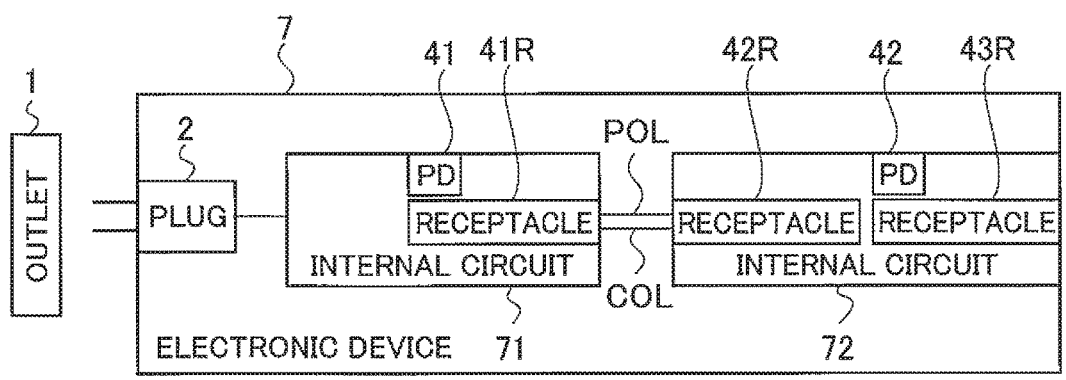
FIG. 49A shows in particular an example of including the receptacle connected to the outside in one internal circuit, in an example in which the plug capable of being connected to the outlet is included in the electronic apparatus, and the plurality of the internal circuits containing the receptacle therein are included in the electronic apparatus.

FIG. 49A shows an example of including the receptacle 43R connected to the outside thereof in one internal circuit 72, in an example of containing the plug 2 connectable to the outlet 1 in the electronic apparatus 7, and also including internal circuits 71 and 72 respectively containing the PD devices 41 and 42 and the receptacles 41R and 42R in the electronic apparatus 7.

Figure 49B:
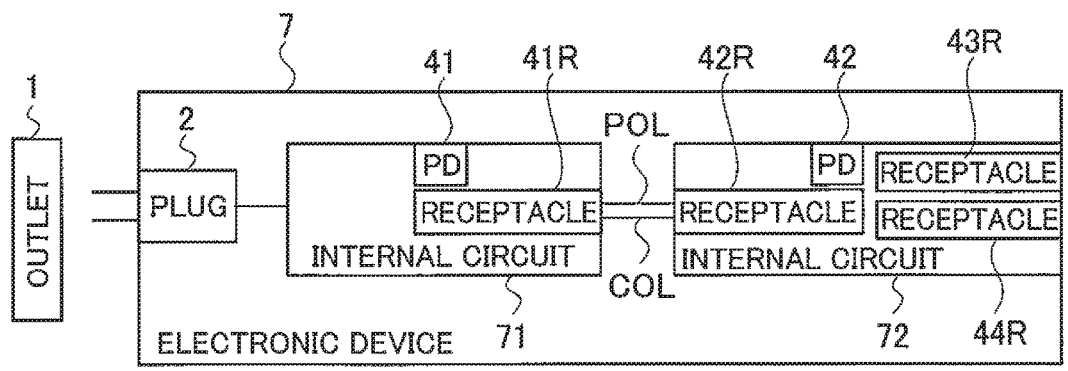
FIG. 49B shows in particular an example of including a plurality of the receptacles connected to the outside in one internal circuit, in an example in which the plug capable of being connected to the outlet is included in the electronic apparatus, and the plurality of the internal circuits containing the receptacle therein are included in the electronic apparatus.

Moreover, FIG. 49B shows an example of including a plurality of the receptacles 43R and 44R connected to the outside thereof in one internal circuit 72, in an example of containing the plug 2 connectable to the outlet 1 in the electronic apparatus 7, and also including internal circuits 71 and 72 respectively containing the PD devices 41 and 42 and the receptacles 41R and 42R in the electronic apparatus 7.

Also in FIGS. 49A and 49B, the receptacles 41R and 42R can be connected to each other by the power line POL and the communication dedicated line COL.

(Protection Function)

Figure 50A:
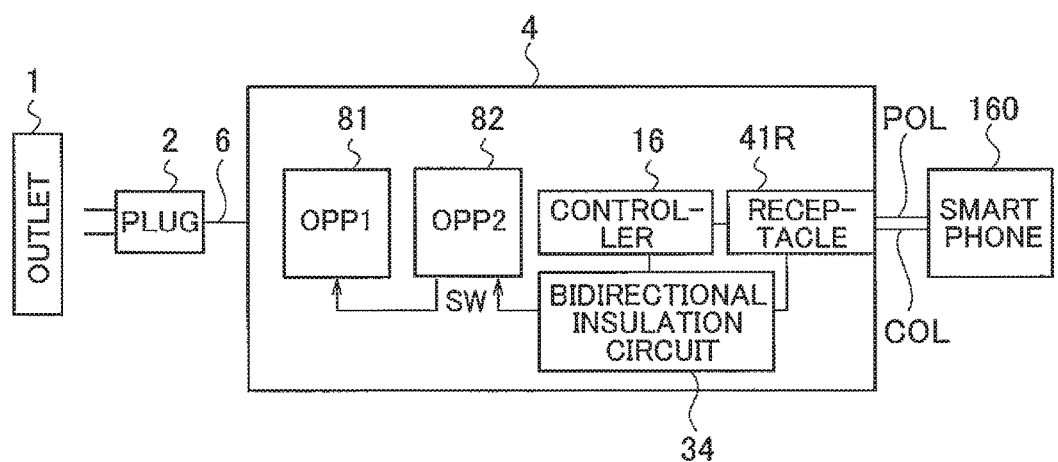
FIG. 50A is an explanatory diagram of a protection function of the USB PD device according to the embodiments in the case where a smart phone is used as a connecting target.
Figure 50B:
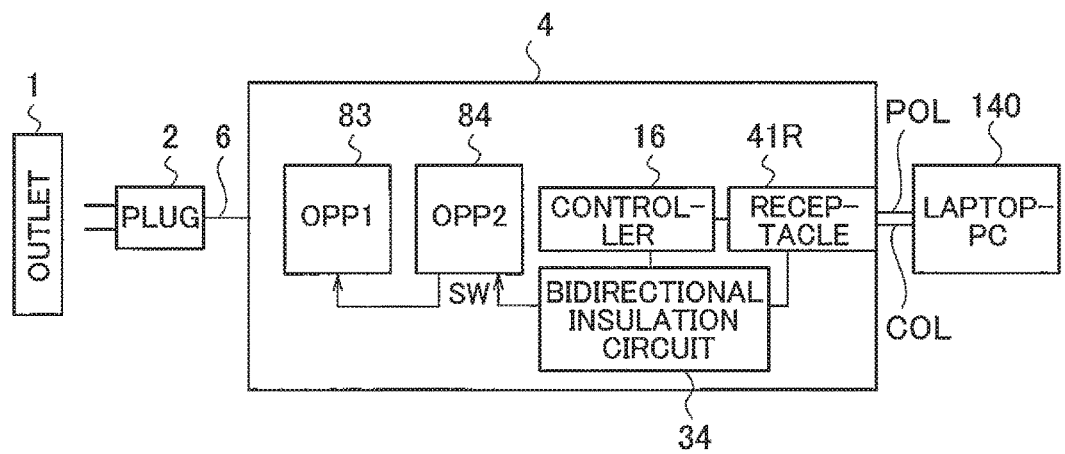
FIG. 50B is an explanatory diagram of a protection function of the USB PD device according to the embodiments in the case where a laptop PC is used as a connecting target.

FIG. 50A shows an explanatory diagram of a protection function for the PD device 4 according to the embodiments in a case of using a smartphone 160 as a connecting target, and FIG. 50B shows an explanatory diagram of the protection function for the PD device 4 according to the embodiments in a case of using a laptop PC 140 as a connecting target.

As shown in FIGS. 50A and 50B, the PD device 4 according to the embodiments may include: a primary-side OverPower Protecting circuit (OPP1) (81, 83); and a secondary-side OverPower Protecting circuit (OPP2) (82, 84) connected to the primary-side overpower protecting circuit (OPP1) (81, 83). The primary-side overpower protecting circuit (OPP1) (81, 83) is connected to a primary-side controller (not shown). Moreover, the primary-side overpower protecting circuit (OPP1) (81, 83) may be contained in the primary-side controller. The secondary-side overpower protecting circuit (OPP2) (82, 84) is connected to the bidirectional insulation circuit 34 and the secondary-side controller 16.

In accordance with target equipment (target sets) connected to the receptacle 41R, electric power information and communication control information in the receptacle 41R are transmitted to the secondary-side overpower protecting circuit (OPP2) (82, 84) from the bidirectional insulation circuit 34, and then the secondary-side overpower protecting circuit (OPP2) (82, 84) transmits the aforementioned electric power information and communication control information to the primary-side overpower protecting circuit (OPP1) (81, 83). Consequently, an overcurrent detecting set value can be changed in accordance with the target equipment (target sets) connected to the receptacle 41R, thereby executing power change of the DC/DC converter 13.

Any of the primary-side overpower protecting circuit (OPP1) 81 and the secondary-side overpower protecting circuit (OPP2) 82 may determine whether the electric power information and communication control information in the receptacle 41R exceeds the overcurrent detecting set value.

If it is determined that the electric power information and communication control information in the receptacle 41R exceed the overcurrent (overpower) detecting set value, the primary-side overpower protecting circuit (OPP1) (81, 83) transmits an overcurrent (overpower) protecting control signal to the primary-side controller (not shown), thereby executing the change for controlling the electric power in the DC/DC converter 13.

Various functions, e.g. Over Current Protection (OCP), Over Power Protection (OPP), Over Voltage Protection (OVP), Over Load Protection (OLP), and Thermal Shut Down (TSD), are applicable to the PD device 4 according to the embodiments.

The PD device 4 according to the embodiments includes a sensor (SENSOR) protection function for executing protection corresponding to the characteristics of a certain sensor element connected to the primary-side controller (not shown), for example.

When the overcurrent (overpower) detecting set value is changed in the PD device 4 according to the embodiments, the electric power information and communication control information in the receptacle 41R are transmitted to the primary-side overpower protecting circuit (OPP1) (81, 83) through the bidirectional insulation circuit 34 and the secondary-side overpower protecting circuit (OPP2) (82, 84), as mentioned above. Consequently, an overcurrent detecting set value can be changed in accordance with the target equipment (target sets) connected to the receptacle 41R, thereby executing power change of the DC/DC converter 13.

The electric power information and communication control information in the receptacle 41R may be directly transmitted to the primary-side overpower protecting circuit (OPP1) (81, 83) from the bidirectional insulation circuit 34, thereby directly changing the set value in the primary-side overpower protecting circuit (OPP1) (81, 83).

Moreover, the electric power information may be directly transmitted to the primary-side overpower protecting circuit (OPP1) (81, 83) from the outside of the PD device 4 according to the embodiments.

Thus, according to the PD device 4 according to the embodiments, it is possible to change the PD level in accordance with the target equipment (target sets) connected to the receptacle 41R, in the primary-side overpower protecting circuit (OPP1) (81, 83). Consequently, a destruction of the target equipment (target sets) can be prevented under an abnormal state.

When using a smartphone 160 as a connecting target, with respect to the smartphone 160 (the amount of power 5V·1 A=5 W), if the electric power information and communication control information of 7 W is transmitted to the secondary-side overpower protecting circuit (OPP2) 82 from the bidirectional insulation circuit 34, for example, the electric power information and communication control information of 7W is transmitted to the primary-side overpower protecting circuit (OPP1) 81 from the secondary-side overpower protecting circuit (OPP2) 82, and then the overcurrent (overpower) detecting set value is changed (SW) from 7 W up to 10 W in the primary-side overpower protecting circuit (OPP1) 81. Consequently, the electric power up to 10 W can be transmitted, in the DC/DC converter in the PD device 4 according to the embodiments.

When using a laptop PC 140 as a connecting target, with respect to the laptop PC 140 (the amount of power 20V·3 A=60 W), if the electric power information and communication control information of 80 W is transmitted to the secondary-side overpower protecting circuit (OPP2) 84 from the bidirectional insulation circuit 34, for example, the electric power information and communication control information of 80 W is transmitted to the primary-side overpower protecting circuit (OPP1) 83 from the secondary-side overpower protecting circuit (OPP2) 84, and then the overcurrent (overpower) detecting set value is changed (SW) from 80 W up to 100 W in the primary-side overpower protecting circuit (OPP1) 83. Consequently, the electric power up to 100 W can be transmitted, in the DC/DC converter in the PD device 4 according to the embodiments.

(Receptacle/Plug)

Figure 51:
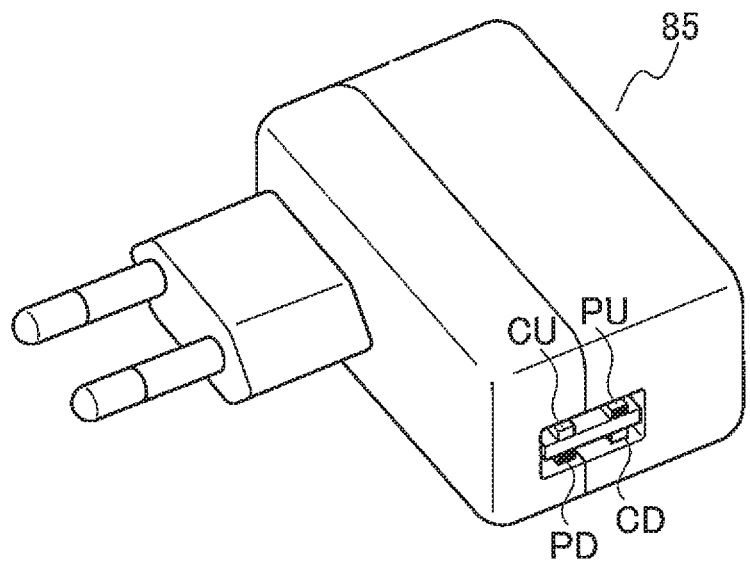
FIG. 51 shows a schematic bird's-eye view structure example of a PD device, in which a receptacle is mounted, according to the embodiments, applicable to the AC adapter, the AC charger, the electronic apparatus, and a docking station.
Figure 54:
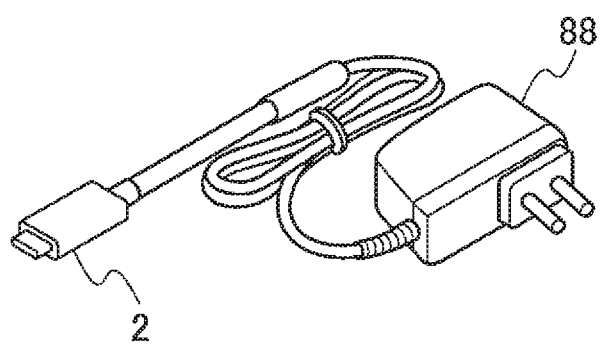
FIG. 54 shows a schematic bird's-eye view structure example of a PD device, in which a plug is mounted, according to the embodiments, applicable to the AC adapter, the AC charger, the electronic apparatus, and the docking station.

As shown in FIG. 51, the PD device 85 according to the embodiments applicable to the AC adapter, the AC charger, the electronic apparatus, and the docking station in which the receptacle is mounted can be connected an outlet having AC power sources 100V-115V, and a plug connected to the power line POL and the communication dedicated line COL can be inserted thereinto. An example of a plug structure is shown in FIG. 37A or 54.

The power line POL can be connected to any of an upper-side power terminal PU and a lower-side power terminal PD of the receptacle, and the communication dedicated line COL can be connected to any of an upper-side communication terminal CU and a lower-side communication terminal CD of the receptacle.

The electric power information can be transmitted through the power line POL, and the communication control information can be transmitted through the communication dedicated line COL. As shown in FIG. 54, the PD device 85 applicable to the AC adapter, the AC charger, the electronic apparatus, and the docking station in which the PD device according to the embodiments is mounted can be connected to any of the power terminals PU and PD and the communication terminals CU and CD; and there is no need to select the upper or lower side (front or back two surfaces) of the corresponding plug, and therefore convenience in use is effective. In the embodiments, an upper-side power terminal PU and a lower-side power terminal PD of the receptacle respectively correspond to an upper-side VBUS terminal and a lower-side VBUS terminal of the receptacle 41R (42R) shown in FIGS. 34 and 35. Moreover, an upper-side communication terminal CU and a lower-side communication terminal CD of the receptacle respectively correspond to an upper-side communication terminal CC1 (CC2) and a lower-side communication terminal CC1 (CC2) of the receptacle 41R (42R) shown in FIGS. 34 and 35. Note that an illustration of other terminals is omitted, for the purpose of simplified displaying.

Figure 52:
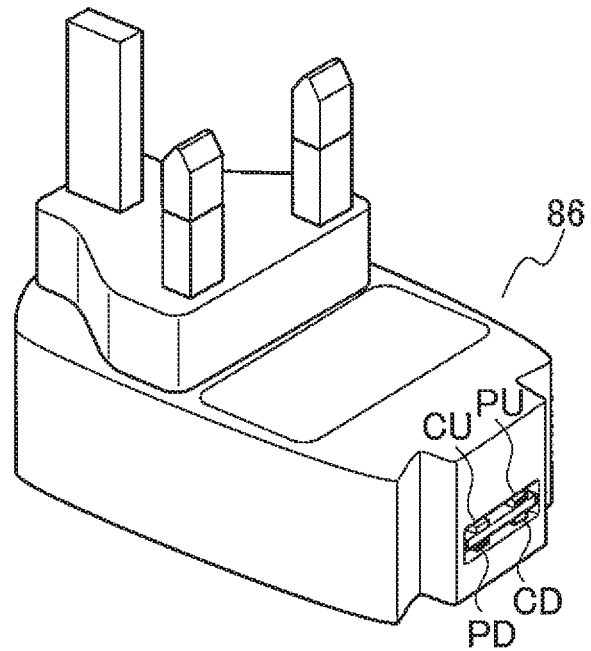
FIG. 52 shows a schematic bird's-eye view structure example of a PD device, in which a receptacle is mounted, according to the embodiments, applicable to the AC adapter, the AC charger, the electronic apparatus, and a docking station.

Moreover, as shown in FIG. 52, the PD device 86 according to the embodiments applicable to the AC adapter, the AC charger, the electronic apparatus, and the docking station in which the receptacle is mounted can be connected an outlet having AC power sources 230V, and a plug connected to the power line POL and the communication dedicated line COL can be inserted thereinto. An example of a plug structure is shown in FIG. 37A or 54.

Figure 53:
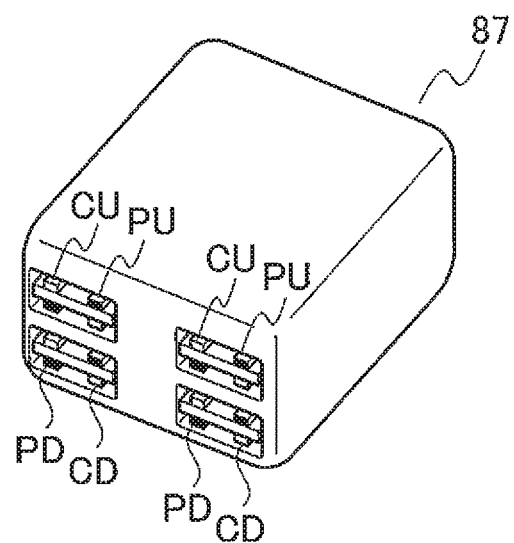
FIG. 53 shows a schematic bird's-eye view structure example of a PD device, in which a plurality of receptacles are mounted, according to the embodiments, applicable to the AC adapter, the AC charger, the electronic apparatus, and the docking station.

Moreover, as shown in FIG. 53, the PD device 87 according to the embodiments applicable to the AC adapter, the AC charger, the electronic apparatus, and the docking station in which the receptacle is mounted can be connected an outlet having AC power sources 100V-115V, and a plurality of plugs connected to the power line POL and the communication dedicated line COL can be inserted thereinto. An example of a plug structure is shown in FIG. 37A or 54.

One or a plurality of the bidirectional insulation circuit 34 can be contained in the AC adapter, the AC charger, the electronic apparatus, and the docking station. By such a signal conversion circuit and switching operation executed by the bidirectional insulation circuit 34, the number of extraction of the outputs of the PD devices 85, 86, and 87 can be variously selected. For example, it is possible to set a ratio of the number of extraction as 1:N, 1:1, or N:1, where N is an integer greater than or equal to 2. Moreover, it is also possible to use in conjunction with the USB PD receptacle.

Moreover, as shown in FIG. 54, the PD device 88 according to the embodiments applicable to the AC adapter, the AC charger, the electronic apparatus, and the docking station in which the plug 2 is mounted can be connected an outlet having AC power sources 100V-115V, and an outlet having AC power sources 230V. The plug 2 is synonymous with configurations shown in FIGS. 44A and 44C, FIGS. 45A and 45C, FIGS. 46A and 46C, and FIGS. 47A and 47C. Moreover, the plug 2 may be applicable also to the USB PD. Accordingly, in FIG. 54, the plug 2 can be called as an advanced USB plug.

(PD System)

In the PD system to which the PD device according to the embodiments can be applied, a source of electric power can be switched without changing a direction of the cable. For example, electric charging of a battery in a laptop PC from external devices and power transmission from the battery in the laptop PC to external devices (e.g., display etc.) can be achieved without replacement of the cable.

Moreover, power transmission and half-duplex data communications can be realized between two units through the power line POL and the communication dedicated line COL.

In the PD system to which the PD device according to the embodiments can be applied, DC power delivery (DC PD) (DC output VBUS) and data communications can be transmitted between the battery charger system and the laptop PC by using the power line POL and the communication dedicated line COL. In this case, the PD device according to the embodiments is mounted in the battery charger system and the laptop PC.

In the PD system to which the PD device according to the embodiments can be applied, DC power delivery (DC PD) (DC output VBUS) and data communications can be transmitted also between the smartphone and the laptop PC by using the power line POL and the communication dedicated line COL. In this case, the PD device according to the embodiments is mounted in the smartphone and the laptop PC.

Figure 55:
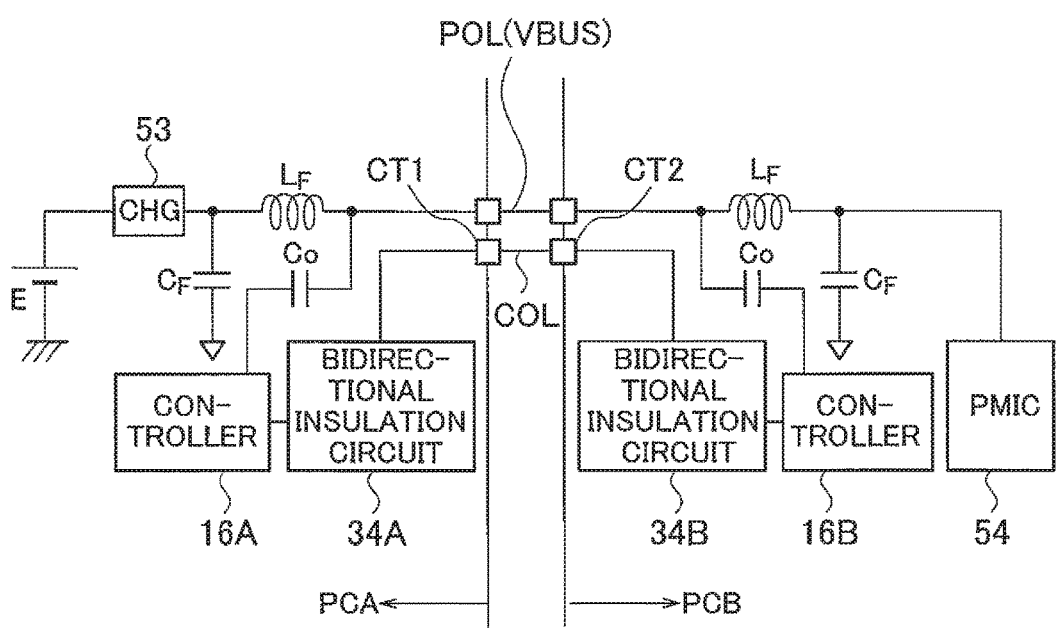
FIG. 55 is a schematic block configuration diagram for explaining the data communications and the PD between two PCs, in the PD system to which the PD device according to the embodiments can be applied.

FIG. 55 shows a schematic block configuration for explaining the data communications and the electric power supply between two personal computers (PCs) PCA and PCB, in the PD system to which the PD device according to the embodiments can be applied. In FIG. 55, illustration of the DC/DC converters is omitted, but the bidirectional insulation circuits 34A and 34B and the secondary-side controllers 16A and 16B are shown. The PD devices according to the embodiments are respectively mounted in the personal computers (PCs) PCA and PCB.

The personal computers (PCs) PCA and PCB are connected to each other through the power line POL and the communication dedicated line COL. The communication dedicated line COL is connected between the control terminals CT1 and CT2.

As shown in FIG. 27, the control terminal CT1 is connected to the bidirectional insulation circuit 34A, and the control terminal CT2 is connected to the bidirectional insulation circuit 34B. Each of the bidirectional insulation circuits 34A and 34B and each of the control terminals CT1, CT2 may be connected to each other through an AC coupling capacitor $C_C$. Moreover, a battery E and a battery charger IC (CHG) 53 connected to the battery E is mounted in the personal computer (PC) PCA, and a Power Management IC (PMIC) 54 is mounted in the personal computer (PC) PCB. In addition, the inductances LF and CF configuring the filter circuit can be respectively omitted.

In the PD system to which the PD device according to the embodiments can be applied, electric charging of the battery E from the personal computer PCB to the personal computer PCA, and power transmission of the battery E from the personal computer PCA to the personal computer PCB can achieved without replacement of any cable, for example.

Moreover, the bidirectional insulation circuits 34A and 34B are respectively connected to the communication dedicated lines COL, thereby respectively realizing half-duplex data communications between the personal computers (PCs) PCA and PCB. In the present embodiment, the carrier frequency is approximately 23.2 MHz, for example, and the FSK modulation/demodulation frequency is approximately 300 kbps, for example. In the present embodiment, the Bit Error Rate (BER) is approximately $1 \times 10^{-6}$, and an LSI for built-in self tests (BIST) may be included therein, for example.

Figure 56:
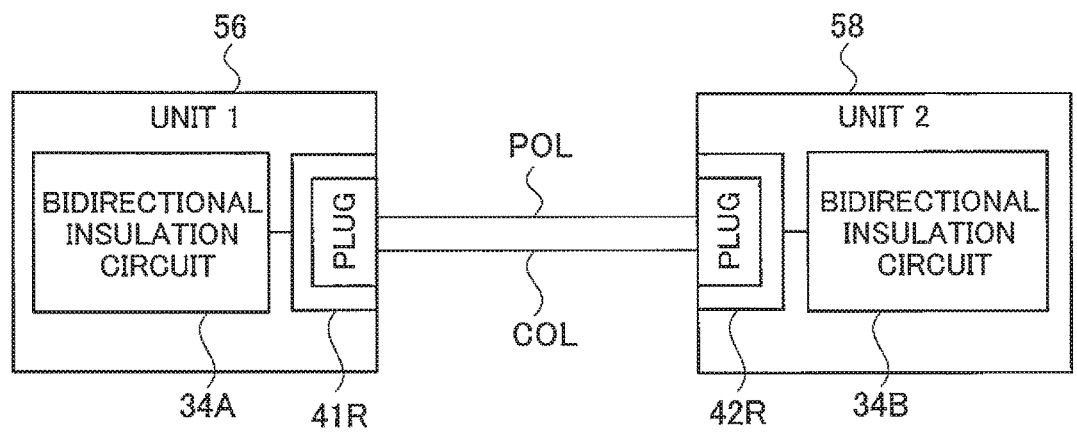
FIG. 56 is a schematic block configuration diagram for explaining the data communications and the PD between two units, in the PD system to which the PD device according to the embodiments can be applied.

FIG. 56 shows a schematic block configuration for explaining the data communications and the electric power supply between two units 56 and 58, in the PD system to which the PD device according to the embodiments can be applied.

The two units 56 and 58 are connected to each other by the power line POL and the communication dedicated line COL. The power line POL and the communication dedicated line COL is plug-connected to the receptacles 41R and 42R contained in the two units 56 and 58.

The two units 56 and 58 are arbitrary electronic apparatuses in which the PD devices according to the embodiments are respectively mounted. In FIG. 56, illustration of the DC/DC converters is omitted, but the bidirectional insulation circuits 34A and 34B are shown. Illustration of the AC coupling capacitor $C_C$ is also omitted.

Figure 57:
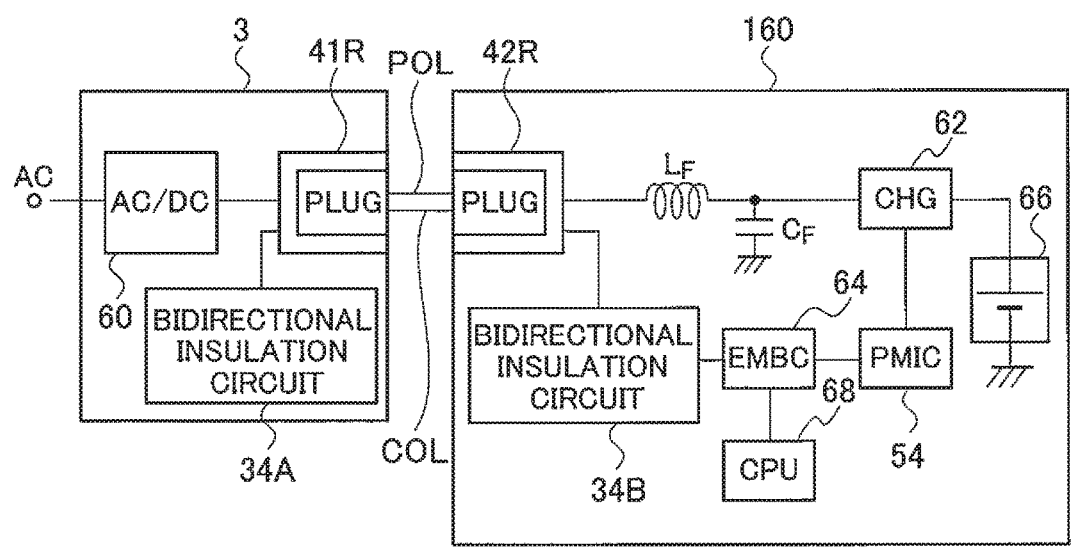
FIG. 57 is a schematic block configuration diagram showing a PD system including an AC adapter/AC charger and a smartphone each containing the PD device according to the embodiments.

FIG. 57 shows a schematic block configuration of a PD system including an AC adapter/AC charger 3 and a smartphone 160 each which contains the PD device according to the embodiments.

The AC adapter/AC charger 3 and the smartphone 160 are connected to each other by the power line POL and the communication dedicated line COL. The power line POL and the communication dedicated line COL are plug-connected to the receptacles 41R and 42R respectively contained in the AC adapter/AC charger 3 and the smartphone 160.

The PD devices according to the embodiments are respectively mounted in the AC adapter/AC charger 3 and the smartphone 160. In FIG. 57, illustration of the DC/DC converters is omitted, but the bidirectional insulation circuits 34A and 34B are shown.

The AC adapter/AC charger 3 includes the AC/DC converter 60, and the bidirectional insulation circuit 34A. The smartphone 160 includes the bidirectional insulation circuit 34B, an embedded type controller (EMBC) 64, a CPU 68, a PMIC 54, a battery 66, and a battery charger IC (CHG) 62. AC coupling capacitors $C_C$ may be respectively provided between the bidirectional insulation circuits 34A and 34B and the receptacles 41R and 42R. In addition, the inductances LF and CF configuring the filter circuit can be respectively omitted.

In the PD system to which the PD device according to the embodiments can be applied, electric charging of the battery 66 in the smartphone 160 from the AC adapter/AC charger 3, and power transmission to the external device from the battery 66 in the smartphone 160 can be achieved without replacement of the cable, for example.

Figure 58:
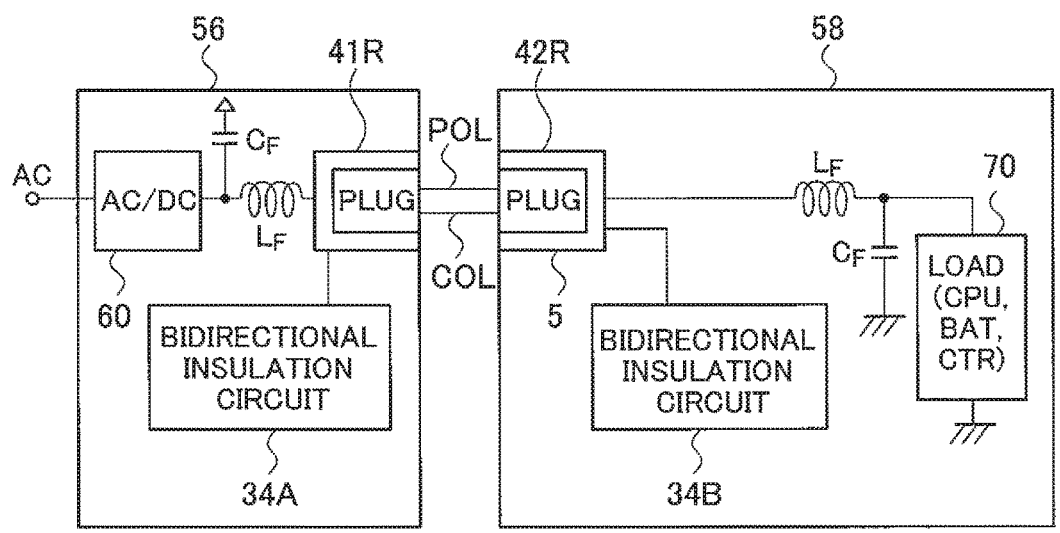
FIG. 58 is a schematic block configuration diagram of a PD system including two units each containing the PD device according to the embodiments.

FIG. 58 shows a schematic block configuration of a PD system including two units 56 and 58 each containing the PD device according to the embodiments.

The two units 56 and 58 are connected to each other by the power line POL and the communication dedicated line COL. The power line POL and the communication dedicated line COL is plug-connected to the receptacles 41R and 42R contained in the two units 56 and 58.

The PD devices according to the embodiments are respectively mounted in the two units 56 and 58. In FIG. 58, illustration of the DC/DC converters is omitted, but the bidirectional insulation circuits 34A and 34B are shown.

The unit 56 includes an AC/DC converter 60 and the bidirectional insulation circuit 34A, and the unit 58 includes the bidirectional insulation circuit 34B and a load 70. AC coupling capacitors $C_C$ may be respectively provided between the bidirectional insulation circuits 34A and 34B and the receptacles 41R and 42R. In this context, the load 70 can be composed of a CPU, a battery BAT, a controller CTR, etc. In addition, the inductances LF and CF configuring the filter circuit can be respectively omitted.

In the PD system to which the PD device according to the embodiments can be applied, power transmission from the unit 56 to the unit 58, and power transmission to external devices from the unit 58 can be achieved without replacement of the cable, for example.

Moreover, the bidirectional insulation circuits 34A and 34B are respectively connected to the communication dedicated lines COL, thereby realizing half-duplex data communications between the units 56 and 58.

Figure 59:
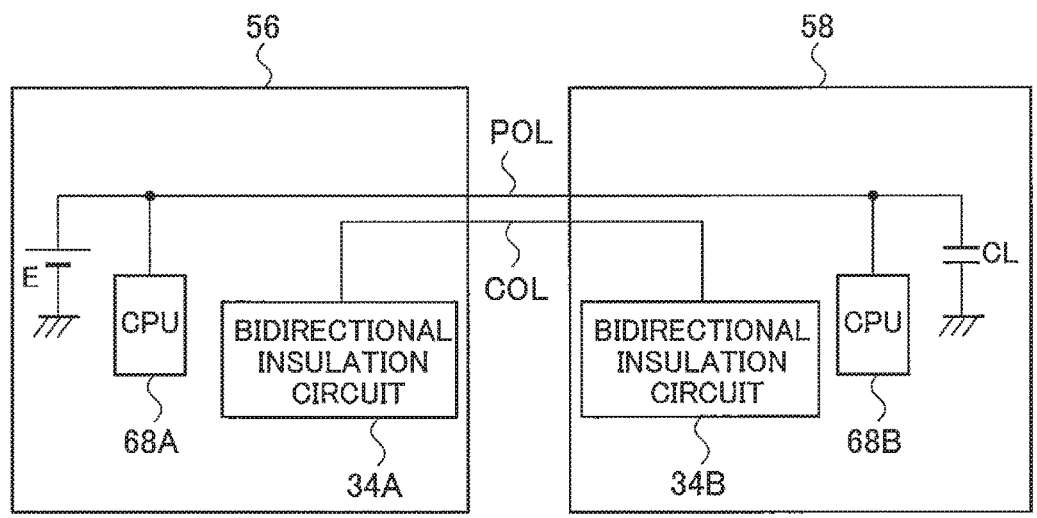
FIG. 59 is another schematic block configuration diagram showing a PD system, to which the PD device according to the embodiments can be applied, including two units different from those in FIG. 35.

In the PD system to which the PD device according to the embodiments can be applied, FIG. 59 shows a schematic block configuration composed of two units 56 and 58 different from the configuration shown in FIG. 58.

The unit 56 includes a battery E, a CPU 68A and the bidirectional insulation circuit 34A. The unit 58 includes a CPU 68B, the bidirectional insulation circuit 34B, and a load 70.

The two units 56 and 58 are connected to each other by the power line POL and the communication dedicated line COL. The power line POL and the communication dedicated line COL is plug-connected to the receptacles 41R and 42R (not shown) contained in the two units 56 and 58. The power line POL is connected between the battery E and the load CL, and the communication dedicated line COL is connected between the bidirectional insulation circuits 34A and 34B. The bidirectional insulation circuits 34A and 34B and the communication dedicated line COL may be respectively connected each other through the AC coupling capacitor $C_C$.

In the PD system to which the PD device according to the embodiments can be applied, power transmission from the unit 58 to the unit 56, and power transmission to the unit 58 from the battery E can be achieved without replacement of the cable, for example. Moreover, the half-duplex data communications, for example, can be realized between the units 56 and 58.

Figure 60:
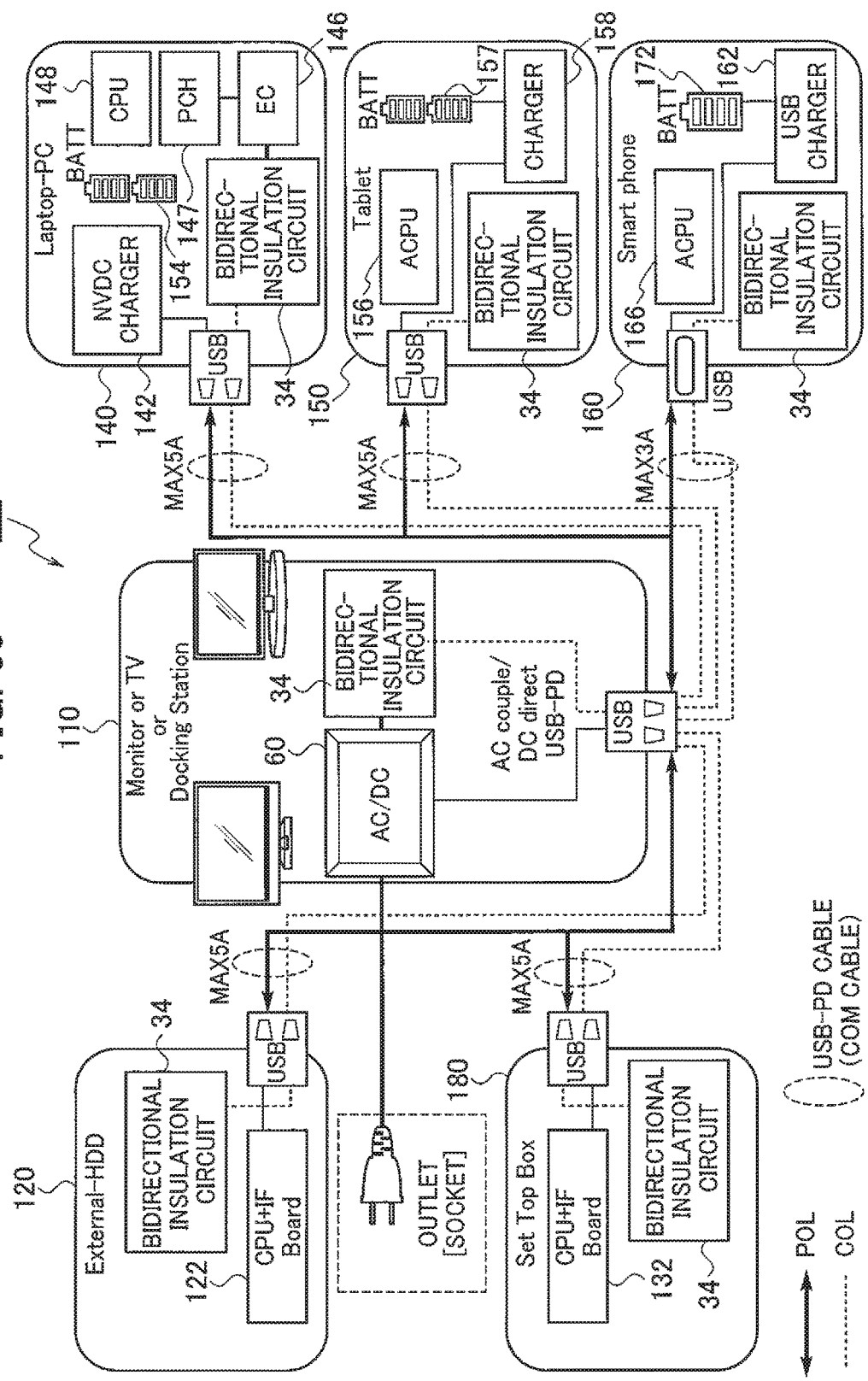
FIG. 60 is a schematic block configuration diagram showing a first PD system to which the PD device according to the embodiments can be applied.

As shown in FIG. 60, a first PD system 100 to which the PD device according to the embodiments can be globally applied includes: a monitor 110 connected to an outlet through a plug; and an external hard disk drive 120, a set top box 180, a laptop PC 140, a tablet PC 150, and a smart phone 160 each connected to the monitor 110. In this context, otherwise, the monitors 110 may be TV or a docking station.

Although the PD device 4 according to the embodiments is mounted in each configuring elements, illustration of the DC/DC converter is omitted, but the bidirectional insulation circuit 34 is illustrated in FIG. 60. Moreover, the AC coupling capacitor $C_C$ may be applied to the communication dedicated line COL.

Power transmission and communications data transmission can be executed using the power line POL and the communication dedicated line COL, between the monitor 110, and the external hard disk drive 120, the set top box 180, the laptop PC 140, the tablet PC 150 and the smartphone 160. The power line POL is illustrated with the thick solid line, and the communication dedicated line COL is illustrated with the dashed line. When applying the USB PD, the power line POL may be used therefor, instead of the communication dedicated line COL illustrated with the dashed line. Moreover, the communication dedicated line COL is connected to the bidirectional insulation circuit 34 through the AC coupling capacitor $C_C$ (not shown). Alternatively, the communication dedicated line COL may be directly connected to the bidirectional insulation circuit 34, without through the AC coupling capacitor $C_C$.

Portions illustrated with the circular dashed-line illustrate that the cable used for the power line POL and the cable used for communication dedicated line COL are separated. A USB PD cable can be applied to the cable for the power line POL, and a communication dedicated cable (COM) can be applied to the cable for the communication dedicated line COL. Moreover, an internal cable for changing between the power line POL and the communication dedicated line COL may be used therefor.

The AC/DC converter 60 and the bidirectional insulation circuit 34 are mounted in the monitor 110. A CPU+interface board 122, and the bidirectional insulation circuit 34 are mounted in the external hard disk drive 120. A CPU+interface board 132 and the bidirectional insulation circuit 34 are mounted in the set top box 180. A Narrow Voltage DC/DC (NVDC) charger 142, a CPU 148, a Platform Controller Hub (PCH) 147, an Embedded Controller (EC) 146, and the bidirectional insulation circuit 34 are mounted in the laptop PC 140. An Application CPU (ACPU) 156, a battery charger IC (CHG) 158, a battery 157, and the bidirectional insulation circuit 34 are mounted in the tablet PC 150. An Application CPU (ACPU) 166, a USB battery charger IC 162, a battery 172, and the bidirectional insulation circuit 34 are mounted in a smartphone 160.

Figure 61:
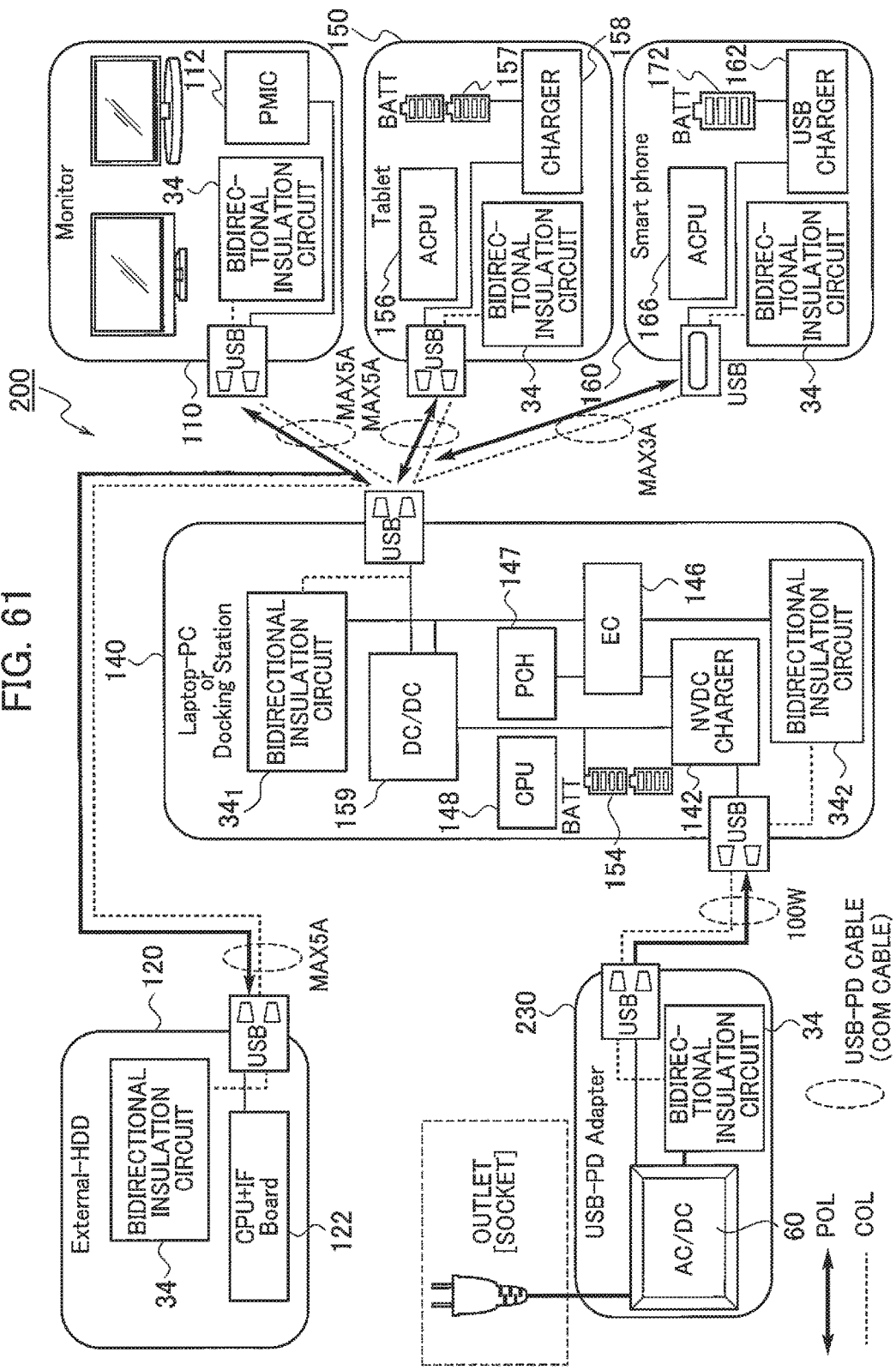
FIG. 61 is a schematic block configuration diagram showing a second PD system to which the PD device according to the embodiments can be applied.

As shown in FIG. 61, a second PD system 200 to which the PD device according to the embodiments can be globally applied includes: a USB PD adapter 230 connected to an outlet through a plug; a laptop PC 140 connected to the USB PD adapter 230; and an external hard disk drive 120, a monitor 110, a tablet PC 150, and a smartphone 160 connected to the laptop PC 140. In this context, otherwise, the laptop PC 140 may be a docking station.

Although the PD device 4 according to the embodiments is mounted in each configuring elements, illustration of the DC/DC converter is omitted, but the bidirectional insulation circuit 34 is illustrated in FIG. 61. Moreover, the AC coupling capacitor $C_C$ may be applied to the communication dedicated line COL.

Power transmission and communications data transmission can be executed using the power line POL and the communication dedicated line COL, between the laptop PC 140, and the USB PD adapter 230, the external hard disk drive 120, the monitor 110, the tablet PC 150 and the smartphone 160.

The AC/DC converter 60 and the bidirectional insulation circuit 34 are mounted in the USB PD adapter 230. An NVDC charger 142, a CPU 148, a PCH 147, an EC 146, a battery 154, a DC/DC converter 159, and bidirectional insulation circuits $34_1$ and $34_2$ are mounted in the laptop PC 140. A Power Management IC (PMIC) 112 and the bidirectional insulation circuit 34 are mounted in the monitor 110. Other configurations are the same as those of the first PD system 100 (FIG. 60).

Figure 62:
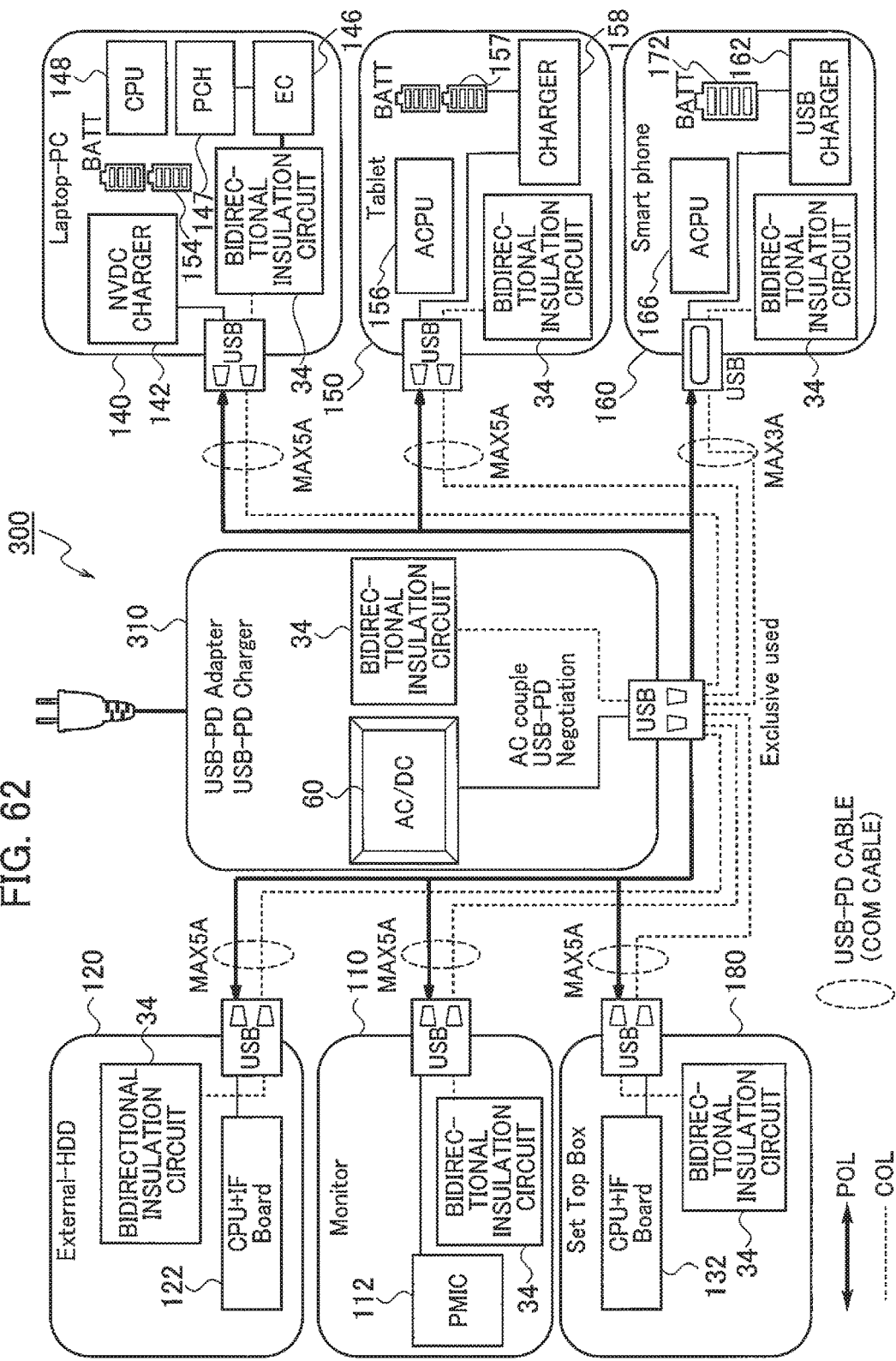
FIG. 62 is a schematic block configuration diagram showing a third PD system to which the PD device according to the embodiments can be applied.

As shown in FIG. 62, a third PD system 300 to which the PD device according to the embodiments can be globally applied includes: a USB PD adapter/charger 310 connected to an outlet through a plug; and an external hard disk drive 120, a monitor 110, a set top box 180, a laptop PC 140, a tablet PC 150, and a smartphone 160 each connected to the USB PD adapter/charger 310.

Although the PD device 4 according to the embodiments is mounted in each configuring elements, illustration of the DC/DC converter is omitted, but the bidirectional insulation circuit 34 is illustrated in FIG. 62. Moreover, the AC coupling capacitor $C_C$ may be applied to the communication dedicated line COL.

Power transmission and communications data transmission can be executed using the power line POL and the communication dedicated line COL, between the USB PD adapter/charger 310, and the external hard disk drive 120, the monitor 110, the set top box 180, the laptop PC 140, the tablet PC 150 and the smartphone 160.

The AC/DC converter 60 and the bidirectional insulation circuit 34 are mounted in the USB PD adapter/charger 310. Other configurations are the same as those of the first PD system 100 (FIG. 60) and the second PD system 200 (FIG. 61).

Figure 63:
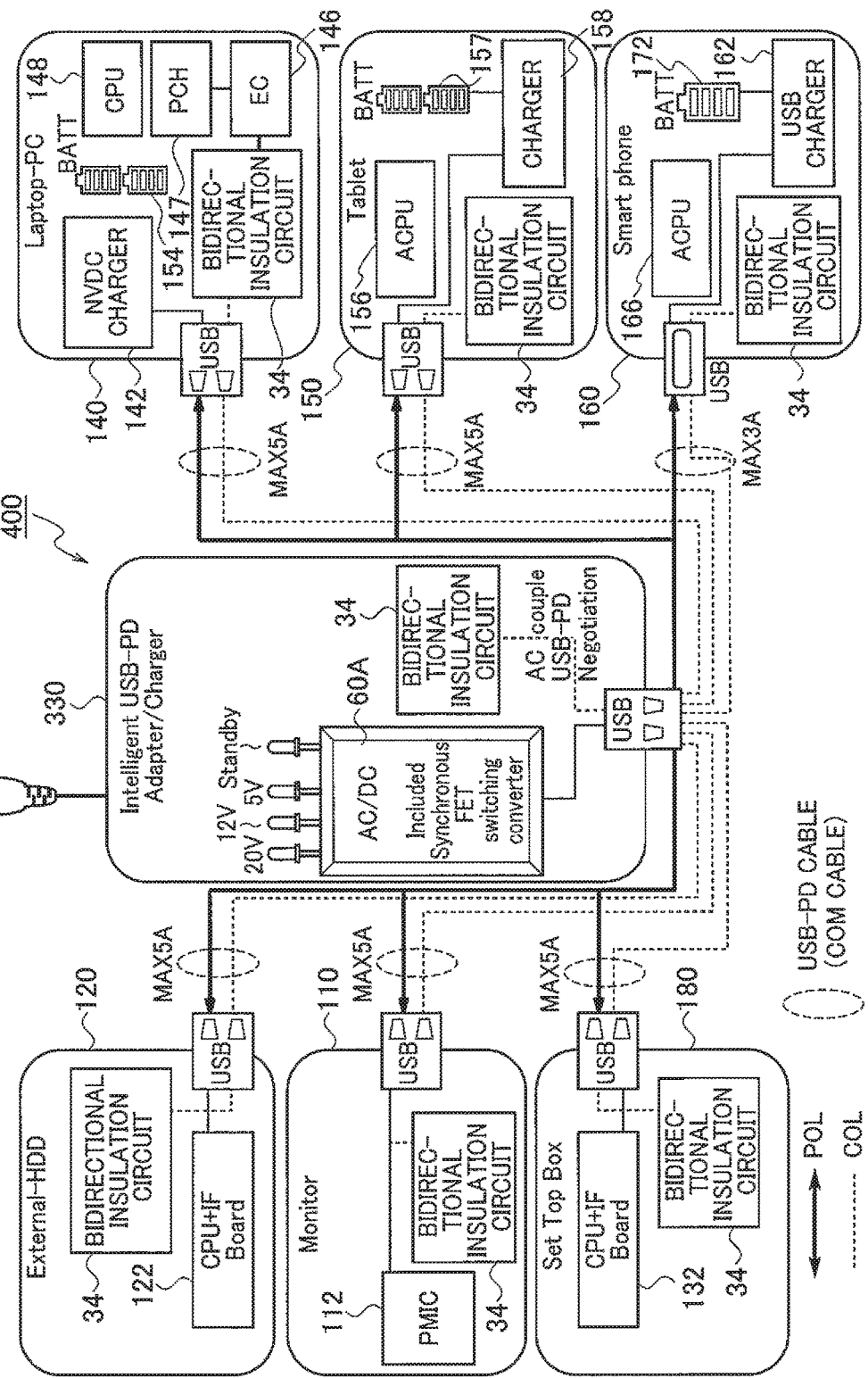
FIG. 63 is a schematic block configuration diagram showing a fourth PD system to which the PD device according to the embodiments can be applied.

As shown in FIG. 63, a fourth PD system 400 to which the PD device according to the embodiments can be globally applied includes: a high-performance USB PD adapter/charger 330 connected to an outlet through a plug; and an external hard disk drive 120, a monitor 110, a set top box 180, a laptop PC 140, a tablet PC 150, and a smartphone 160 each connected to the high-performance USB PD adapter/charger 330.

Although the PD device 4 according to the embodiments is mounted in each configuring elements, illustration of the DC/DC converter is omitted, but the bidirectional insulation circuit 34 is illustrated in FIG. 63. Moreover, the AC coupling capacitor $C_C$ may be applied to the communication dedicated line COL.

Power transmission and communications data transmission can be executed using the power line POL and the communication dedicated line COL, between the high-performance USB PD adapter/charger 330, and the external hard disk drive 120, the monitor 110, the set top box 180, the laptop PC 140, the tablet PC 150 and the smartphone 160.

The AC/DC converter 60A including a synchronous FET switching converter, and the bidirectional insulation circuit 34 are mounted in the high-performance USB PD adapter/charger 330. Other configurations are the same as those of the third PD system 300 (FIG. 62).

Figure 64:
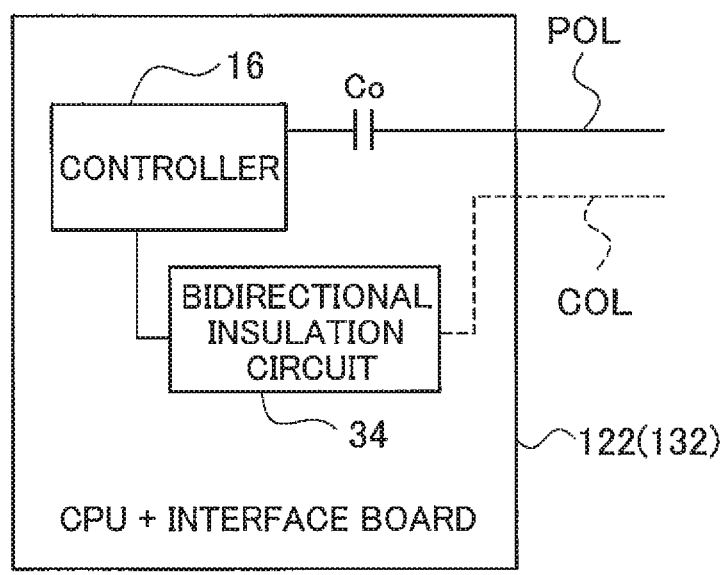
FIG. 64 is a schematic block configuration diagram showing a configuration in which a controller is contained in a CPU interface, in the PD system to which the PD device according to the embodiments can be applied.

FIG. 64 shows a schematic block configuration having a configuration in which the bidirectional insulation circuit 34 is contained in a CPU+interface board 122 (132), in the PD system to which the PD device according to the embodiments can be applied. More specifically, in the PD systems 100 to 400 respectively shown in FIGS. 60 to 63, the bidirectional insulation circuit 34 and the controller 16 may be contained in the CPU+interface board 122 (132). In this case, the power line POL and the communication dedicated line COL are used for the CPU+interface board 122, and thereby electric power and communications data can be transmitted. A chip in which the controller 16 is contained in such a CPU+interface board 122 (132) can also be configured as an integrated chip with a CPU including a controller, a DSP, and another controller.

As explained above, according to the embodiments, there can be provided the PD device, the AC adapter, the AC charger, the electronic apparatus, and the PD system, each in which no filter coil is required for an output side and the mounting space is reduced, and thereby capable of achieving miniaturization and cost reduction and capable of controlling the output voltage value and the available output current value (MAX value).

Other Embodiments

As explained above, the embodiments have been described, as a disclosure including associated description and drawings to be construed as illustrative, not restrictive. This disclosure makes clear a variety of alternative embodiments, working examples, and operational techniques for those skilled in the art.

Such being the case, the embodiments cover a variety of embodiments and the like, whether described or not.

INDUSTRIAL APPLICABILITY

The PD device, the AC adapter, the AC charger, the electronic apparatus, and the PD system according to the embodiments are applicable to electrical household appliances and electrical equipment, mobile computing devices, etc.

What is claimed is:

1. A power delivery device comprising:
   a DC/DC converter disposed between an input and a VBUS output;
   a primary-side controller configured to control an input current of the DC/DC converter;
   a bidirectional insulation circuit coupled to a control input, the bidirectional insulation circuit configured to receive a control input signal of the control input, and to feed the received control input signal back to the primary-side controller, the control input independent from the VBUS output;
   a switch disposed between an output of the DC/DC converter and the VBUS output, the switch SW configured to interrupt the output of the DC/DC converter, wherein the switch is not a component configuring the DC/DC converter;
   a secondary-side controller connected to the bidirectional insulation circuit, the secondary-side controller configured to execute on/off control of the switch; and
   a power output circuit connected to the primary-side controller, the power output circuit configured to supply output voltages to a plurality of VBUS outputs disposed in pairs with the plurality of the control inputs, wherein
   the primary-side controller varies an output voltage value and an available output current value of the DC/DC converter by controlling the input current on the basis of the control input signal fed back from the bidirectional insulation circuit;
   the bidirectional insulation circuit is coupled to a plurality of control inputs, and is structured execute signal conversion and switching of control input signals of the plurality of the control inputs.

2. The power delivery device according to claim 1, further comprising
   an output capacitor configured to couple the secondary-side controller and the VBUS output to each other.

3. The power delivery device according to claim 1, further comprising
   an AC coupling capacitor configured to couple the bidirectional insulation circuit and the control input.

4. The power delivery device according to claim 1, wherein
   the bidirectional insulation circuit comprises a plurality of unidirectional insulation circuits.

5. The power delivery device according to claim 4, wherein the bidirectional insulation circuit comprises
   a first unidirectional insulation circuit structured to provide DC coupling and provide AC coupling, and
   a second unidirectional insulation circuit structured to provide AC coupling.

6. The power delivery device according to claim 1, wherein
   the bidirectional insulation circuit is further structured to execute a signal conversion of an AC signal component of the VBUS output.

7. The power delivery device according to claim 1, wherein the power output circuit comprises a plurality of DC/DC converters.

8. The power delivery device according to claim 1, wherein the bidirectional insulation circuit comprises:
   a protocol conversion unit configured to execute a frequency conversion, and a communication circuit disposed between the protocol conversion unit and the control input, the communication circuit configured to execute a code conversion.

9. The power delivery device according to claim 1, wherein
the bidirectional insulation circuit comprises a switch configured to select between the secondary-side controller and the control input.

10. The power delivery device according to claim 1, wherein the bidirectional insulation circuit comprises
a first transceiver connected to the secondary-side controller, and
a switch controlled by the primary-side controller, the switch configured to select between the first transceiver and the control input.

11. The power delivery device according to claim 1, wherein
the bidirectional insulation circuit comprises a first transceiver configured to select between the secondary-side controller and the control input.

12. The power delivery device according to claim 1, wherein the bidirectional insulation circuit comprises
a first transceiver connected to the secondary-side controller,
a second transceiver connected to a control input, and
a switch configured to select between the first transceiver and the second transceiver.

13. An AC adapter comprising the power delivery device according to claim 1.

14. An AC charger comprising the power delivery device according to claim 1.

15. An electronic apparatus comprising the power delivery device according to claim 1.

16. A power delivery system comprising the power delivery device according to claim 1.

17. A power delivery device comprising:
a DC/DC converter disposed between an input and a VBUS output;
a primary-side controller configured to control an input current of the DC/DC converter;
a bidirectional insulation circuit coupled to a control input, the bidirectional insulation circuit configured to receive a control input signal of the control input, and to feed the received control input signal back to the primary-side controller, the control input independent from the VBUS output;
a switch disposed between an output of the DC/DC converter and the VBUS output, the switch SW configured to interrupt the output of the DC/DC converter, wherein the switch is not a component configuring the DC/DC converter;
a secondary-side controller connected to the bidirectional insulation circuit, the secondary-side controller configured to execute on/off control of the switch;
a monitor circuit configured to detect a primary-side signal of the DC/DC converter; and
a power output circuit connected to the primary-side controller, the power output circuit configured to supply output voltages to a plurality of VBUS outputs disposed in pairs with the plurality of the control inputs, wherein
the primary-side controller varies an output voltage value and an available output current value of the DC/DC converter by controlling the secondary-side controller through the bidirectional insulation circuit on the basis of the signal detected by the monitor circuit;
the bidirectional insulation circuit is coupled to a plurality of control inputs, and is structured execute signal conversion and switching of control input signals of the plurality of the control inputs.

18. A power delivery device comprising:
a DC/DC converter disposed between an input and a VBUS output;
a primary-side controller configured to control an input current of the DC/DC converter;
a bidirectional insulation circuit coupled to a control input, the bidirectional insulation circuit configured to receive a control input signal of the control input, and to feed the received control input signal to the primary-side controller, the control input independent from the VBUS output;
a switch disposed between an output of the DC/DC converter and the VBUS output, the switch SW configured to interrupt the output of the DC/DC converter, wherein the switch is not a component configuring the DC/DC converter;
a secondary-side controller connected to the bidirectional insulation circuit, the secondary-side controller configured to execute on/off control of the switch;
an error amplifier connected between the output of the DC/DC converter and the bidirectional insulation circuit; and
a power output circuit connected to the primary-side controller, the power output circuit configured to supply output voltages to a plurality of VBUS outputs disposed in pairs with the plurality of the control inputs, wherein
the primary-side controller receives a feedback signal received through the bidirectional insulation circuit on the basis of a detected signal of the error amplifier, and varies an output voltage value and an available output current value of the DC/DC converter by controlling the secondary-side controller through the bidirectional insulation circuit on the basis of the feedback signal;
the bidirectional insulation circuit is coupled to a plurality of control inputs, and is structured execute signal conversion and switching of control input signals of the plurality of the control inputs.

* * * * *